US009083772B2

(12) United States Patent
Lin et al.

(10) Patent No.: US 9,083,772 B2

(45) Date of Patent: Jul. 14, 2015

(54) EXCHANGING DATA ASSOCIATED WITH A COMMUNICATION SESSION WITHIN A COMMUNICATIONS SYSTEM

(75) Inventors: James M. Lin, San Diego, CA (US); Arvind V. Santhanam, San Diego, CA (US); Alejandro Barrientos, San Diego, CA (US); Thomas George, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 628 days.

(21) Appl. No.: 13/096,473

(22) Filed: Apr. 28, 2011

(65) Prior Publication Data

US 2012/0106327 A1 May 3, 2012

Related U.S. Application Data

(60) Provisional application No. 61/330,179, filed on Apr. 30, 2010.

(51) Int. Cl.
*G01R 31/08* (2006.01)
*H04L 29/06* (2006.01)
(Continued)

(52) U.S. Cl.
CPC ............ *H04L 65/4084* (2013.01); *H04L 12/66* (2013.01); *H04L 47/27* (2013.01);
(Continued)

(58) Field of Classification Search
USPC ................. 370/230, 331, 229, 236, 235, 332, 370/395.21; 455/436, 437
See application file for complete search history.

(56) References Cited

U.S. PATENT DOCUMENTS 6,049,537 A * 4/2000 Proctor et al. ................ 370/342
6,546,009 B1 * 4/2003 Begeja et al. ................. 370/389
(Continued)

FOREIGN PATENT DOCUMENTS

CN 1638494 A 7/2005
CN 1996823 A 7/2007
(Continued)

OTHER PUBLICATIONS

3rd Generation Partnershoip Project 2, "3GPP2": "cdma2000 High Rate Packet Data Air Interface Specification", 3GPP2 C.S0024-B, Version 3.0, Sep. 1, 2009, XP002645375, pp. 11-64, paragraph 11.3. 2.4-pp. 11-68.

(Continued)

*Primary Examiner* — Phuongchau Ba Nguyen
(74) *Attorney, Agent, or Firm* — Raphael Freiwirth

(57) ABSTRACT

In an embodiment, a communications device exchanges, between first and second access terminals, higher priority data in association with a communication session of a first type and also lower priority data in association with a communication session of a second type. If the communications device determines a transition of the first access terminal to a lower data-rate environment, the communication device reduces a size of data packets exchanged between the first access terminal and an application server for the communication session of the second type. If the communications device determines an upcoming data packet is a low-data packet (e.g., a silence packet), the low-data packet is suppressed. If the communications device determines that the first access terminal has attempted transmission of a set of last or near-last data packets in the sequence, the communications device re-transmits the set of last or near-last data packets without waiting for ACKs.

40 Claims, 28 Drawing Sheets

(51) Int. Cl.

| | |
|---|---|
| ***H04L 12/66*** | (2006.01) |
| ***H04W 4/18*** | (2009.01) |
| ***H04L 12/807*** | (2013.01) |
| ***H04L 29/08*** | (2006.01) |

(52) U.S. Cl.

CPC ............ *H04L65/1089* (2013.01); *H04L 67/14* (2013.01); *H04L 67/2828* (2013.01); *H04L 67/306* (2013.01); *H04L 67/322* (2013.01); *H04L 67/325* (2013.01); *H04W 4/18* (2013.01)

(56) References Cited

U.S. PATENT DOCUMENTS

| | | | |
|---|---|---|---|
| 7,151,758 | B2 * | 12/2006 | Kumaki et al. ............... 370/331 |
| 7,288,145 | B2 * | 10/2007 | Xiao et al. ............... 106/287.11 |
| 7,401,118 | B1 | 7/2008 | Yokota et al. |
| 7,535,857 | B2 | 5/2009 | Dorenbosch et al. |
| 7,688,764 | B2 | 3/2010 | Dorenbosch et al. |
| 7,835,761 | B2 | 11/2010 | Gill et al. |
| 7,983,198 | B2 | 7/2011 | Chow et al. |
| 8,099,482 | B2 | 1/2012 | Clark et al. |
| 8,213,295 | B2 | 7/2012 | Ginde |
| 8,331,876 | B2 | 12/2012 | Lee et al. |
| 8,346,220 | B2 | 1/2013 | Mate et al. |
| 8,514,711 | B2 | 8/2013 | Lee et al. |
| 2002/0191562 | A1 * | 12/2002 | Kumaki et al. ............... 370/331 |
| 2004/0125760 | A1 | 7/2004 | Newberg et al. |
| 2005/0288050 | A1 | 12/2005 | Gill et al. |
| 2006/0069808 | A1 | 3/2006 | Mitchell et al. |
| 2006/0168123 | A1 | 7/2006 | Krstulich |
| 2006/0259585 | A1 | 11/2006 | Keohane et al. |
| 2006/0291419 | A1 | 12/2006 | McConnell et al. |
| 2006/0294245 | A1 | 12/2006 | Raguparan et al. |
| 2007/0049314 | A1 | 3/2007 | Balachandran et al. |
| 2007/0115823 | A1 | 5/2007 | Shen |
| 2007/0150815 | A1 | 6/2007 | Smith et al. |
| 2007/0250571 | A1 | 10/2007 | Griffin, Jr. |
| 2008/0107111 | A1 | 5/2008 | Ban et al. |
| 2008/0146252 | A1 | 6/2008 | Razdan et al. |
| 2008/0318610 | A1 | 12/2008 | Bhaskaran et al. |
| 2009/0003208 | A1 | 1/2009 | Payyappilly et al. |
| 2009/0080396 | A1 | 3/2009 | Song et al. |
| 2009/0164607 | A1 | 6/2009 | Clark et al. |
| 2009/0241133 | A1 | 9/2009 | Lineberger |
| 2009/0290553 | A1 | 11/2009 | Matsukura et al. |
| 2010/0070588 | A1 | 3/2010 | Sinn et al. |
| 2010/0103925 | A1 | 4/2010 | Birch et al. |
| 2010/0174805 | A1 | 7/2010 | Jones |
| 2011/0116475 | A1 * | 5/2011 | Jeyatharan et al. ........... 370/331 |
| 2011/0209079 | A1 | 8/2011 | Tarte et al. |
| 2011/0264758 | A1 | 10/2011 | Pope et al. |
| 2012/0102131 | A1 | 4/2012 | Lin et al. |
| 2012/0106327 | A1 * | 5/2012 | Lin et al. ....................... 370/230 |
| 2012/0110115 | A1 | 5/2012 | Lin et al. |
| 2013/0028089 | A1 * | 1/2013 | Ramakrishnan .............. 370/235 |

FOREIGN PATENT DOCUMENTS

| | | | |
|---|---|---|---|
| CN | 101167378 | A | 4/2008 |
| EP | 0813159 | A2 | 12/1997 |
| EP | 1841167 | A2 | 10/2007 |
| JP | H1074206 | A | 3/1998 |
| JP | H10124413 | A | 5/1998 |
| JP | 2000244463 | A | 9/2000 |
| JP | 2006042356 | A | 2/2006 |
| JP | 2007223927 | A | 9/2007 |
| JP | 2007274367 | A | 10/2007 |
| JP | 2007274577 | A | 10/2007 |
| JP | 2008300936 | A | 12/2008 |
| JP | 2009124731 | A | 6/2009 |
| WO | 0207395 | A1 | 1/2002 |
| WO | 2006002217 | | 1/2006 |
| WO | 2006065863 | A2 | 6/2006 |
| WO | 2007048138 | A1 | 4/2007 |
| WO | 2007142488 | A1 | 12/2007 |
| WO | 2008126260 | A1 | 10/2008 |

OTHER PUBLICATIONS

International Search Report and Written Opinion—PCT/US2011/034432—ISA/EPO—Oct. 11, 2011.

Networking explained Gallo, Michael A: Hancock, William M; Published 2001, Publisher: Digital press, Second Edition, pp. 47-56.

Partial European Search Report—EP13169916—Search Authority—Munich—Aug. 12, 2013.

RFC 3261-SIP: "Session Initiation Protocol", J.Rosenberg, H. Schulzrinne, Columbia U., G. Ericsson, A. Johnston, Worldcom, J. Peterson, Neustar, R. Sparks, dynamicsoft, M. Handly. Icer, E, Schooler, AT&T, Jun. 2002, pp. 1-20; 141-143.

SIP Basics: CSG VoIP Workshop, Dennis Baron, Jan. 5, 2005, Massachusetts Institute of Technology, pp. 6-17.

TCP Performance over UMTS-HSDPA Systems, Mohamad Assaad and Djamal Zeghiache, Auerbach Publications, 2006, pp. 115-138.

European Search Report—EP13169916—Search Authority—Munich—Dec. 11, 2013.

OSI model Reference Guide, About.com retrevied Jul. 20, 2014, p. 1.

Rosenberg, J., et al., "SIP: Session Initiation Protocol ; RFC 3261" Request for Comments: 3261, Jun. 2002, p. 1, 176,177,184-193, XP002423186.

Rosenberg J., et al., "SIP: Session Initiation Protocol, RFC 3261" Request for Comments: 3261, Jun. 2002, pp. 8, 18-19, 122-124.

* cited by examiner

EXCHANGING DATA ASSOCIATED WITH A COMMUNICATION SESSION WITHIN A COMMUNICATIONS SYSTEM

CLAIM OF PRIORITY UNDER 35 U.S.C. §119

The present application for patent claims priority to Provisional Application No. 61/330,179 entitled "EXCHANGING DATA ASSOCIATED WITH A COMMUNICATION SESSION WITHIN A COMMUNICATIONS SYSTEM", filed Apr. 30, 2010, and assigned to the assignee hereof and hereby expressly incorporated by reference herein.

BACKGROUND OF THE INVENTION

1. Field of the Invention

Embodiments of the present invention are directed to exchanging data associated with a communication session with a communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The 3$^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, a communications device exchanges, between first and second access terminals, higher priority data in association with a communication session of a first type and also lower priority data in association with a communication session of a second type. If the communications device determines a transition of the first access terminal to a lower data-rate environment, the communication device reduces a size of data packets exchanged between the first access terminal and an application server for the communication session of the second type. If the communications device determines an upcoming data packet is a low-data packet (e.g., a silence packet), the low-data packet is suppressed. If the communications device determines that the first access terminal has attempted transmission of a set of last or near-last data packets in the sequence, the communications device re-transmits the set of last or near-last data packets without waiting for ACKs.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

Figure 1:
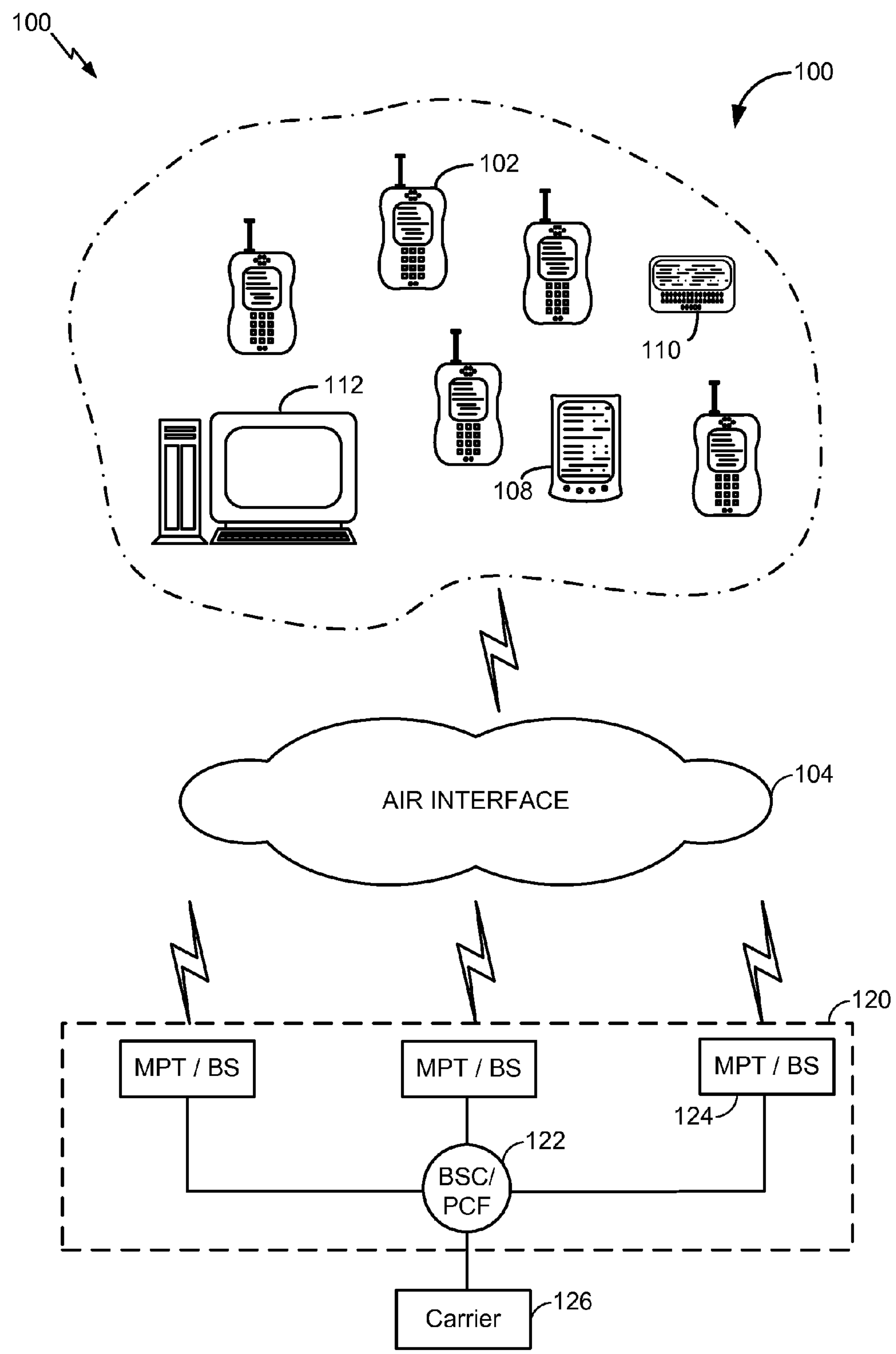
FIG. 1 is a diagram of a wireless network architecture that supports access terminals and access networks in accordance with at least one embodiment of the invention.

Each of FIGS. 9A through 9D illustrate a different content-based communicative process associated with a file-transfer session in accordance with embodiments of the invention.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words “exemplary” and/or “example” are used herein to mean “serving as an example, instance, or illustration.” Any embodiment described herein as “exemplary” and/or “example” is not necessarily to be construed as preferred or advantageous over other embodiments. Likewise, the term “embodiments of the invention” does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, “logic configured to” perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms “access terminal”, “wireless device”, “client device”, “mobile terminal” and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data serving node 100 (“PDSN”) and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single “hybrid” module having the functionality of both the BSC/PCF 122 and the MPT/BS 124.

Figure 2A:
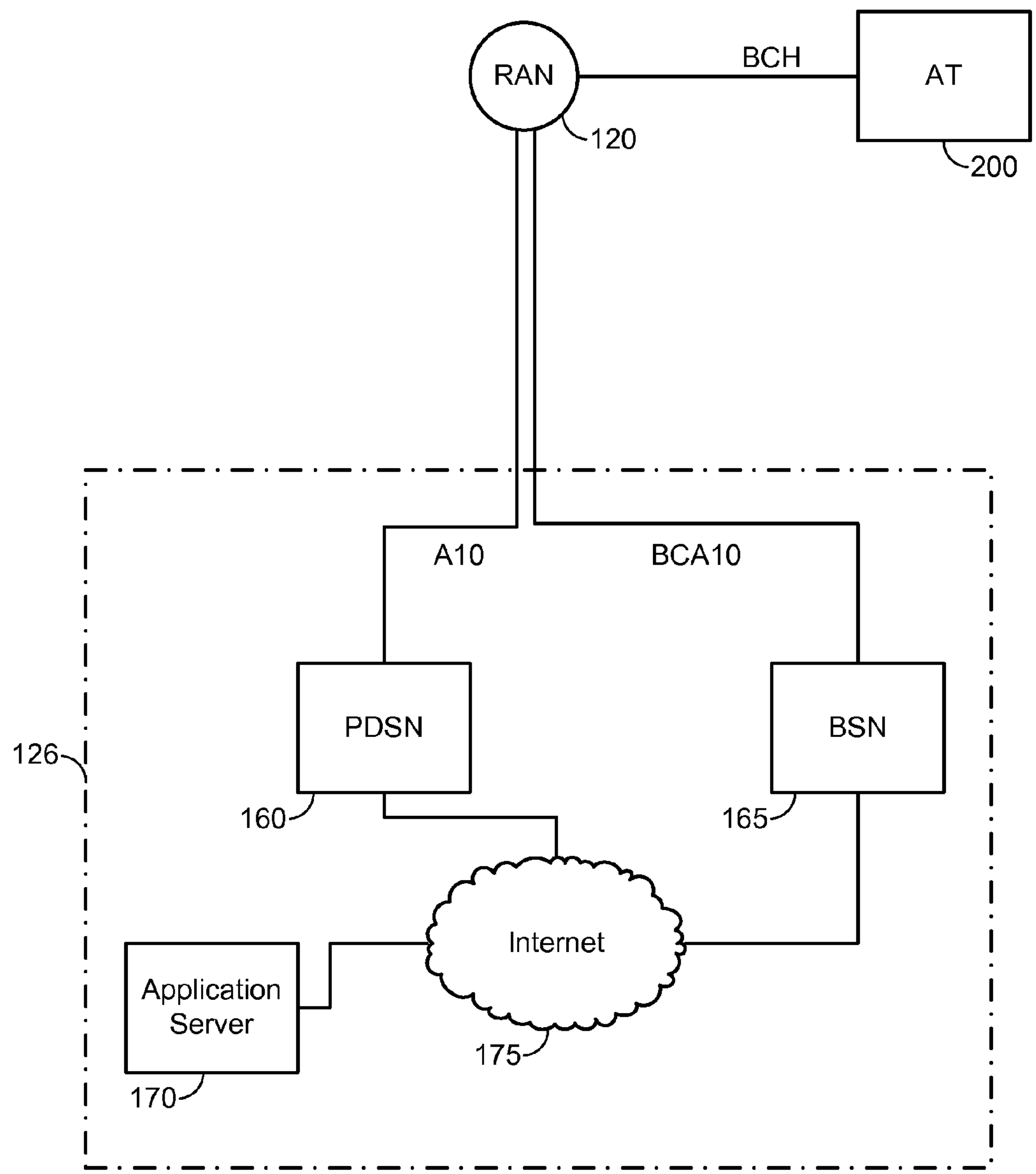
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
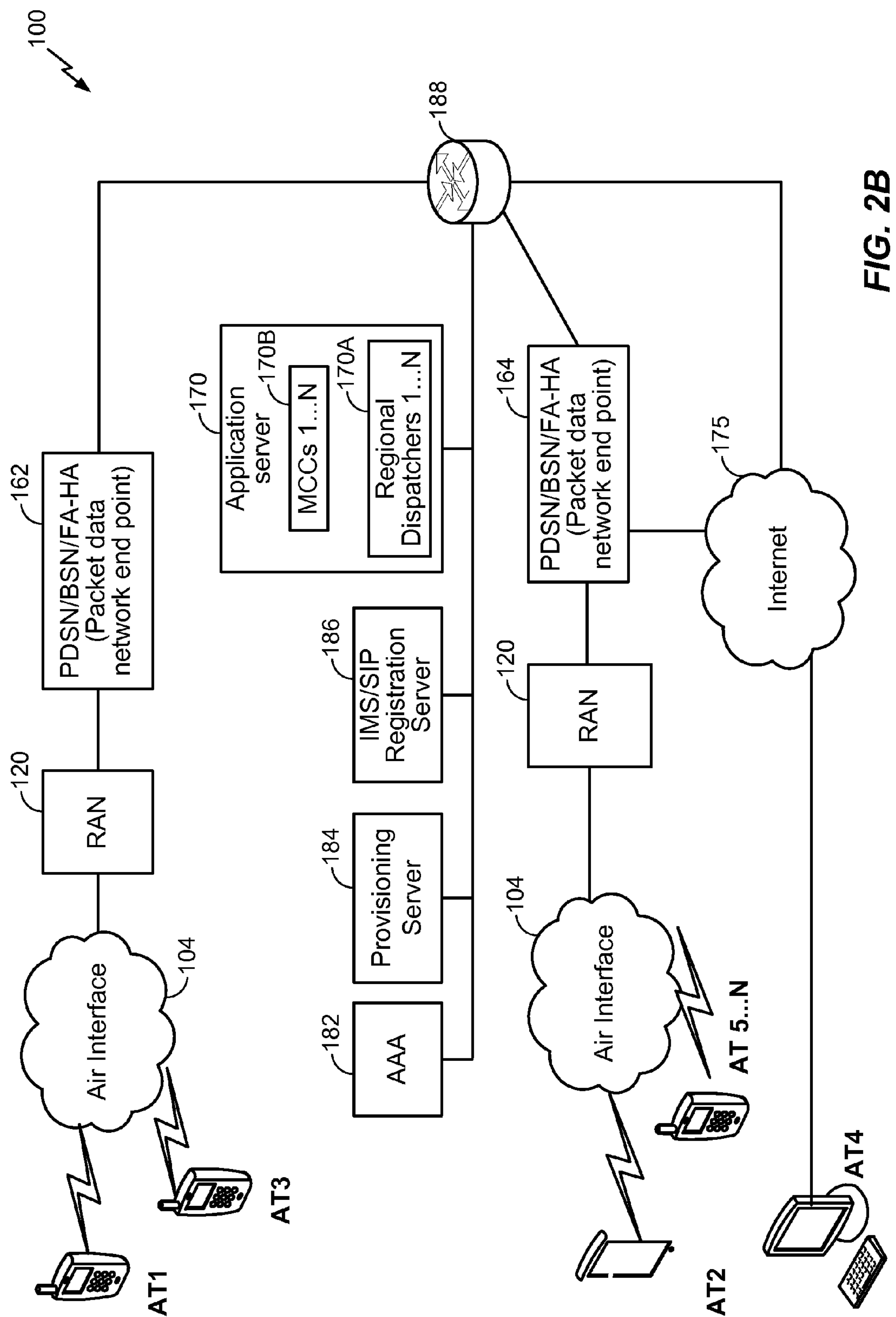
FIG. 2B illustrates an example of the wireless communication of FIG. 1 in more detail.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA server 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session. Accordingly, in another embodiment of the invention, the MCCs 170B may be referred to as PTT application servers and/or PTT media-distribution servers, assuming the arbitrated communication sessions correspond to PTT calls.

Figure 3:
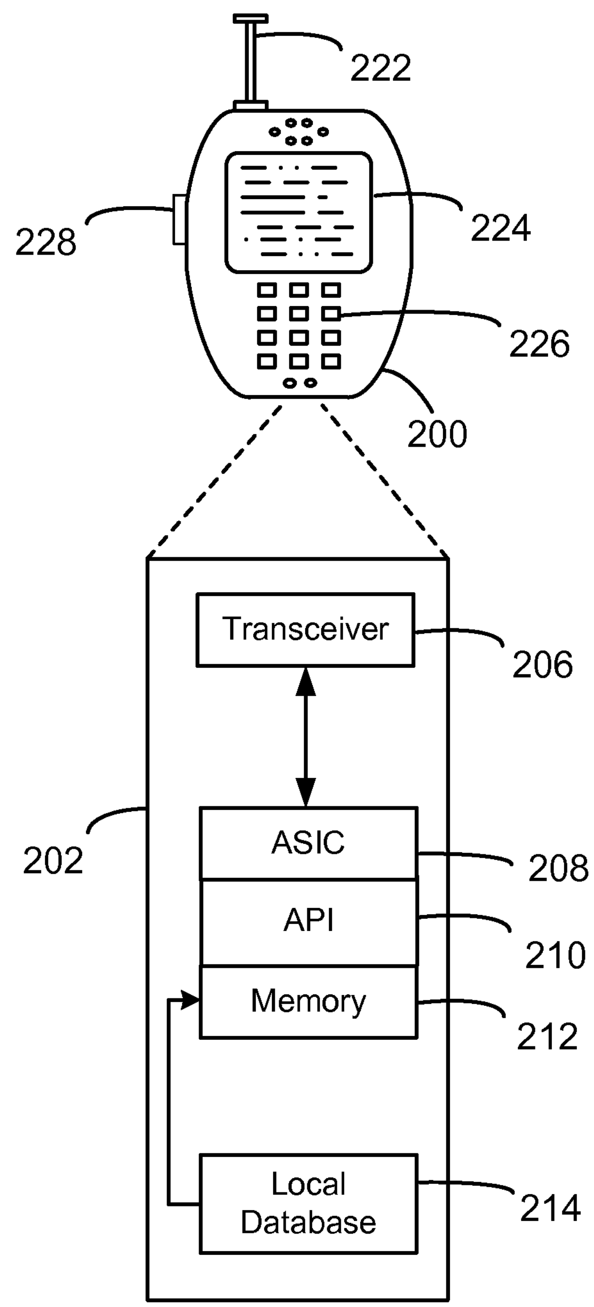
FIG. 3 is an illustration of an access terminal (AT) in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

If a given access terminal (AT) has a large amount of data to send to a particular target, the set-up time of the file-transfer session is of relatively low importance because the time related to the file-transfer session will be relatively high as compared to the set-up time of the file-transfer session. However, the set-up time for file-transfer sessions where a relatively small amount of data is exchanged can be disproportionately high as compared to the duration of the session itself.

Figure 4A:
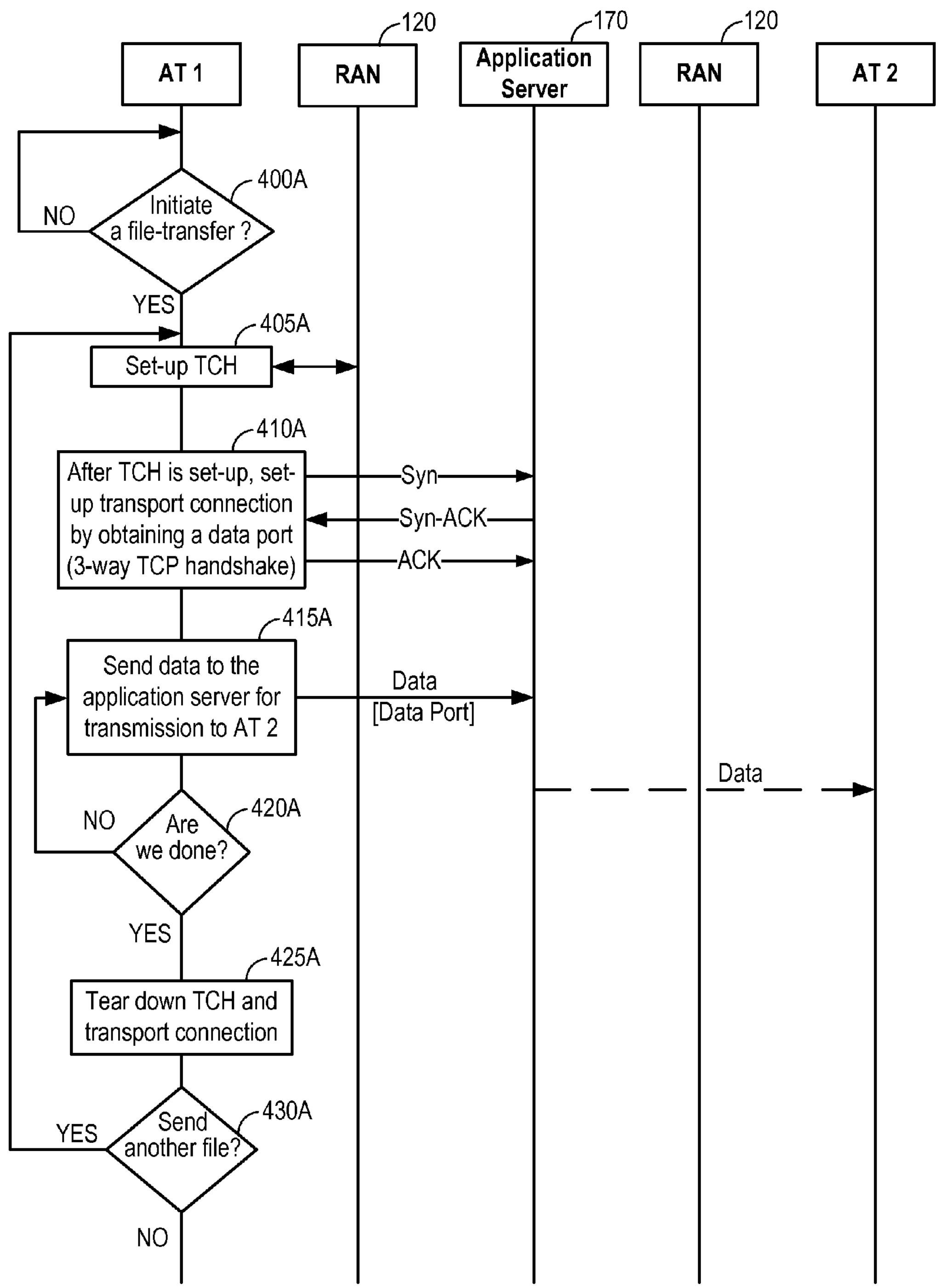
FIG. 4A illustrates a conventional manner by which a file can be exchanged between ATs in a communication system.

FIG. 4A illustrates a conventional manner by which a file can be exchanged between ATs in a communication system. In particular, FIG. 4A illustrates a conventional example of how a transmitting AT sends a file to a target AT when the transmitting AT is already engaged in a communication session.

Referring to FIG. 4A, a given AT ("AT 1") determines whether to initiate a file-transfer session, 400A. If AT 1 determines not to initiate the file-transfer session, then AT 1 does not set-up resources for a communication session and the process remains in 400A.

Otherwise, if AT 1 determines to initiate the file-transfer session, AT 1 sets up a TCH with the RAN 120 for the file-transfer session, 405A. Then, once obtaining the TCH for the file-transfer session, AT 1 sets-up its transport connection for the file-transfer session by engaging in a 3-way TCP handshake in order to obtain a data-port for exchanging data during the file-transfer session with the application server 170, 410A. TCP is well-known in the art and uses standard network layering protocols. Generally, before a client such as AT 1 attempts to connect with a server such as the application server 170, the server must first bind to a port to open the client up for connections, which is referred to a 'passive open'. Once the passive open is established, a client may initiate an 'active open'. To actually establish the transport or TCP connection, the three-way (or 3-step) handshake occurs whereby the active open is performed by the client sending a SYN to the server, the server replies with a SYN-ACK and the client sends an ACK back to the server. At this point the client, which is AT 1 in this case, has activated its transport connection with the application server 170 and has a data port with which to tag messages to the application server 170. While not shown explicitly in FIG. 4A, the above-described TCP-handshake also occurs at the target-side for the communication session. The set-up that occurs at the target side is described below with respect to FIG. 4B.

After setting up the transport connection, AT 1 can set-up the application that handles the file-transfer session at AT 1 and can begin sending application-layer data (i.e., the file to be transferred) to the application server 170 for transmission to AT 2, 415A. The AT 1 can periodically determine whether the file(s) to be transferred during the file-transfer session have been successfully sent to the application server 170 for transmission to AT 2, 420A. If AT 1 determines that one or more files or file-portions have not yet completed their transmission in 420A, the process returns to 415A and AT 1 continues to send file(s) or file-portions to the application server 170 for transmission to AT 2 using the resources obtained in 405A and 410A. Otherwise, the process advances to 425A after the transfer of all files for the file-transfer session of 415A complete their transmission In 425A, AT 1 releases the session resources obtained for the data transmission of 415A, such that the TCH from 405A is torn-down and the transport connection of 410A is terminated. At some later point in time, AT 1 determines whether to send any additional files to AT 2, 430A. If so, the process returns to 405A so that AT 1 can again obtain session resources (e.g., a TCH, a transport connection, etc.) and send one or more file(s) during another file-transfer session to AT 2.

Figure 4B:
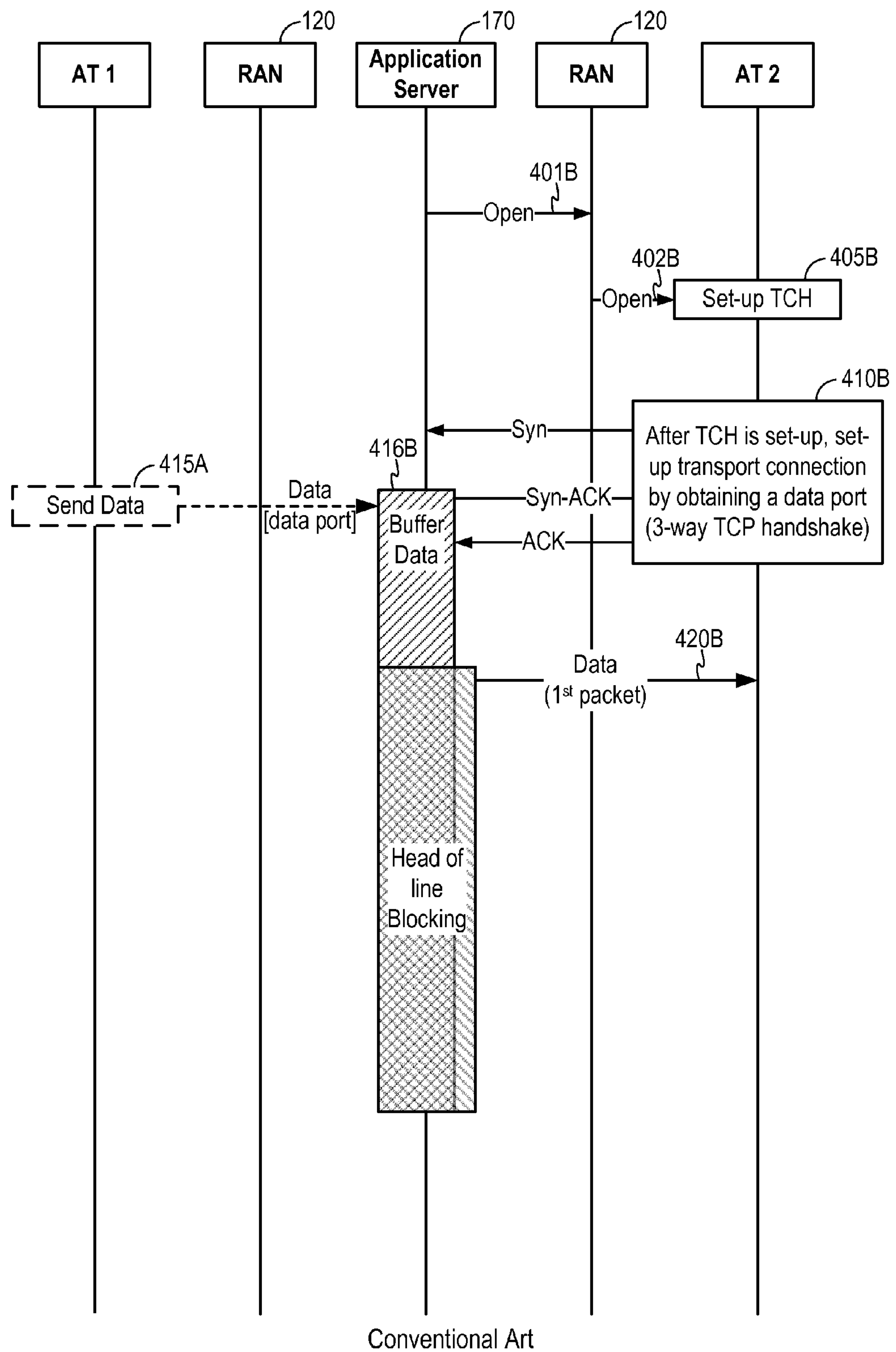
FIG. 4B illustrates another conventional manner by which a file can be exchanged between ATs in a communication system.

FIG. 4B illustrates a conventional manner by which a file can be exchanged between ATs in a communication system. In particular, FIG. 4A illustrates a conventional example of how a target AT receives a file from a transmitting AT. FIG. 4B shows a process that can occur at the target AT or AT 2 during the process of FIG. 4A, in an example.

Referring to FIG. 4B, after the application server 170 is notified that AT 1 will be sending data to be forwarded to AT 2, the application server 170 sends an Open message (e.g., a page message) to the RAN 120, 401B, which is then transmitted by the RAN 120 to AT 2, 402B. AT 2 receives the Open message and begins to set-up a traffic channel (TCH), 405B. Next, in 410B, AT 2 sets up a transport connection via a TCP handshake, similar to the process that occurs at AT 1 in 410A.

At some point during this process, AT 1 begins sending data in 415A to the application server 170 via its established data port for the communication session. The application server 170 begins buffering the data from AT 1 in 416B because the TCP handshake with AT 2 is not yet complete and/or the application server 170 is required to send data packets in-sequence and the packets can arrive out-of-order. Once AT 2 completes the TCH-handshake by ACKing the SYN-ACK message, the application server 170 can begin forwarding the buffered data to AT 2, 420B. However, it will be appreciated that the buffering of 416B does not necessarily end the instant the ACK is received, and can continue for a period of time.

As will be appreciated, the data packets that arrive at the application server 170 in 415A may be out of order or out of sequence due to loss in the wireless link. Therefore, the application server 170 will buffer all the packets in 416B. After the data port is established with AT 2, the application server 170 can begin to deliver the buffered data packets to AT 2, 420B. Conventionally, only consecutive packets from 1 to p can be delivered to AT 2 even if n−1 packets are available because packet p+1 is still missing. This is known in the art as 'head-of-line blocking' and is a problem in conventional TCP. As will be described below in more detail, in at least one embodiment of the invention, head-of-line blocking can be reduced and/or eliminated. Thus, delays associated with FIGS. 4A and/or 4B occur in part because files in TCP enforces that files be delivered in order or in sequence.

As will be appreciated, a relatively long time can occur between the time AT 1 determines to initiate the file-transfer session in 400A to the time when AT 1 is able to begin sending data packets for the file-transfer session in 415A. For example, it can take approximately 300 ms to set-up the TCH, and it can then take additional time to set-up the transport connection. Accordingly, embodiments of the invention are directed to permitting an AT to begin transmitting data for a file-transfer session more quickly when the AT is concurrently engaged in a previously-established communication session (e.g., a VoIP session, etc.).

Figure 4C:
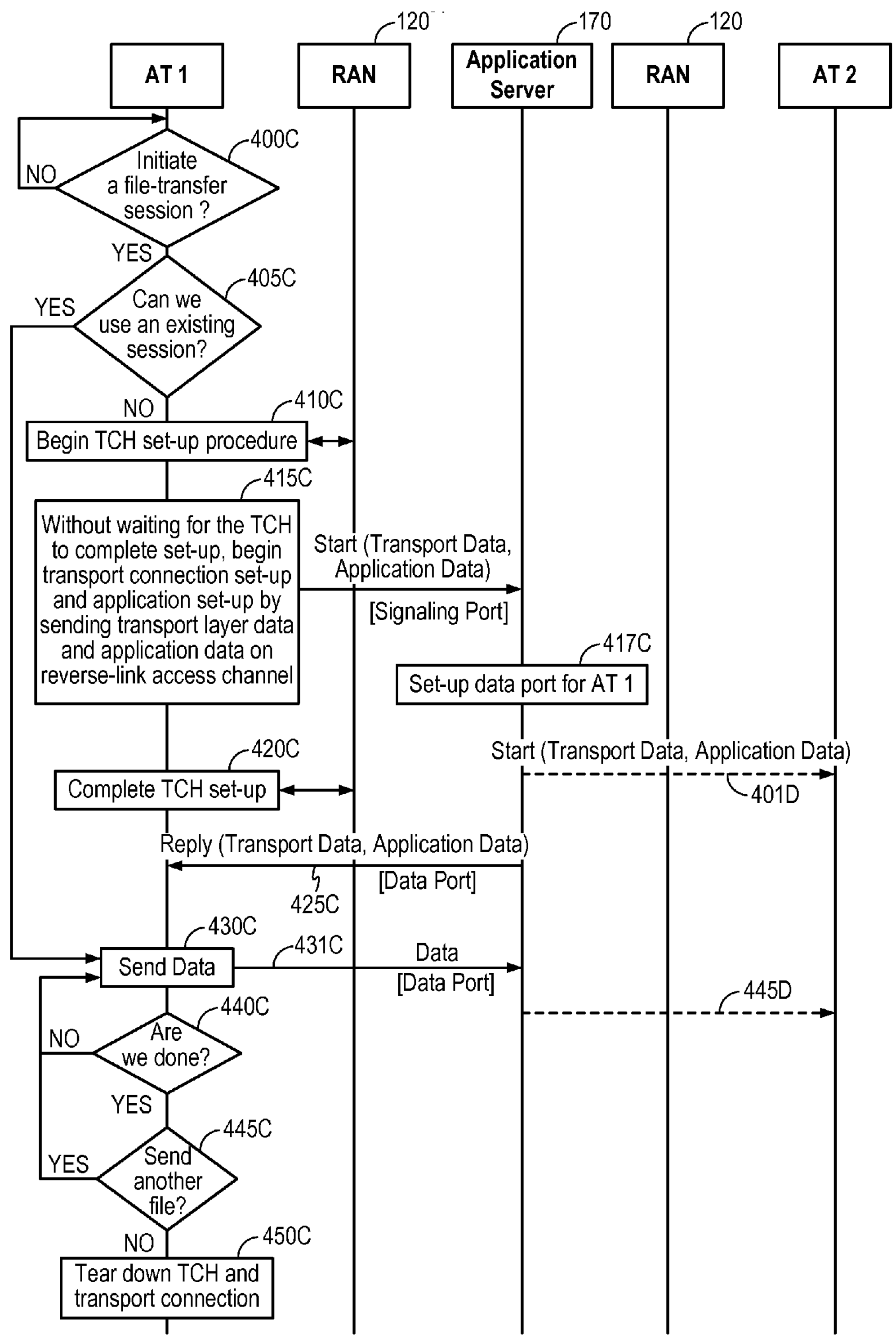
FIGS. 4C and 4D illustrate signaling associated with set-up of a file-transfer session between an originating AT and a target AT in accordance with an embodiment of the invention.
Figure 4D:
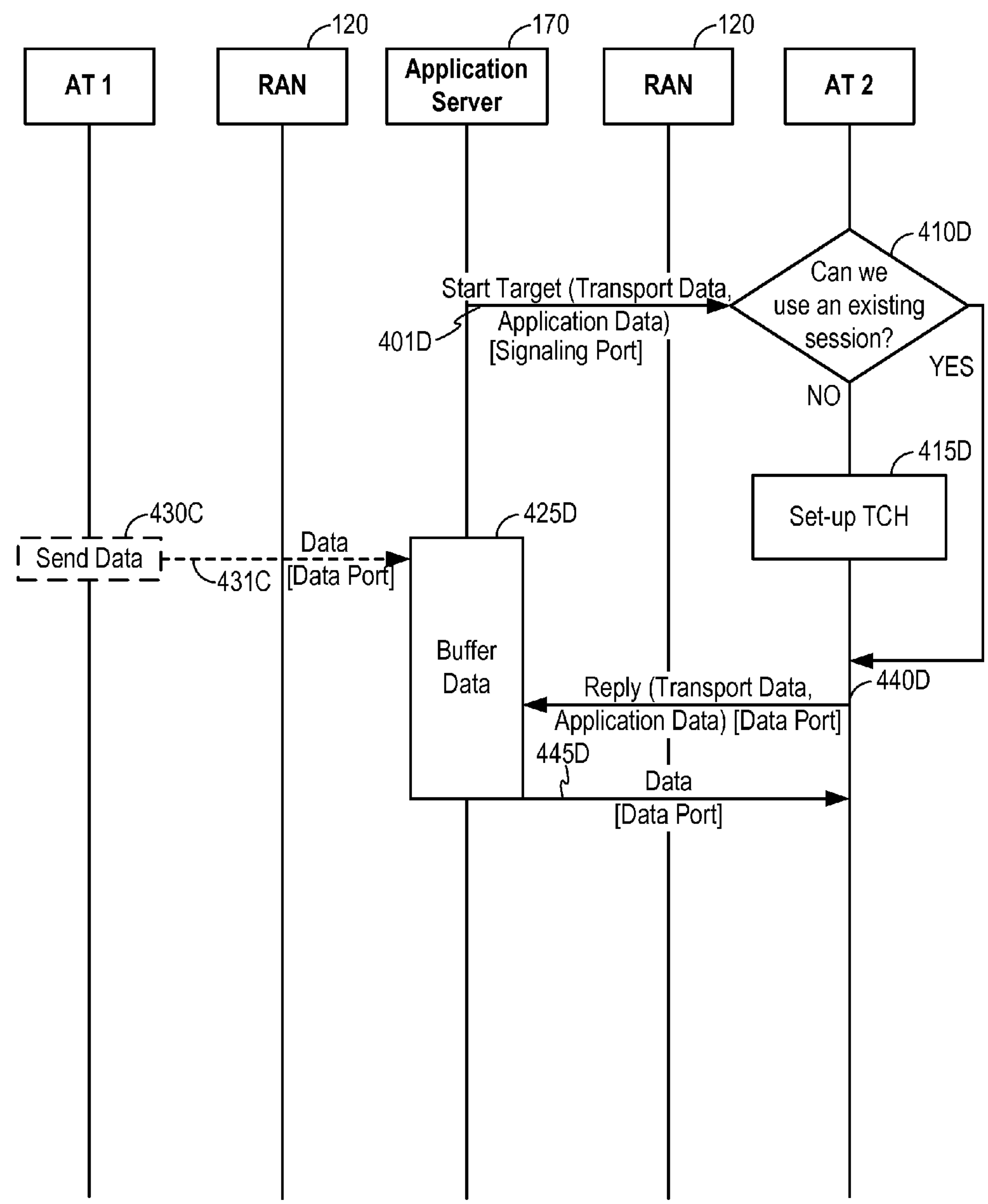

FIGS. 4C and 4D illustrate signaling associated with set-up of a file-transfer session between an originating AT 1 and a target AT 2 in accordance with an embodiment of the invention. Specifically, FIG. 4C focuses upon the signaling that occurs between AT 1 and the application server 170 during the set-up of the file-transfer session, and FIG. 4D focuses upon the signaling that occurs between the application server 170 and AT 2 during the set-up of the file-transfer session.

Referring to FIG. 4C, a given AT ("AT 1") determines whether to initiate a file-transfer session, 400C. If AT 1 determines not to initiate the file-transfer session, then the process remains in 400C. Otherwise, if AT 1 determines to initiate the file-transfer session, AT 1 determines whether a communication session that has already been established by AT 1 has access to session resources that are currently available for the transmission of the file(s) for the file-transfer session, 405C.

For example, if AT 1 is already engaged in another file-transfer session in 405C, then AT 1 can simply use the TCH and transport connection of the other file-transfer session for the newly initiated file-transfer session. Otherwise, if existing session resources are not available for the file-transfer session, the process advances to 410C.

Referring to FIG. 4C, AT 1 begins setting-up a TCH with the RAN 120 for the file-transfer session, 410C. Unlike FIG. 4A, in 415C, instead of waiting for the TCH to complete set-up, AT 1 instead preemptively begins set-up of the transport connection and application-layer connection by configuring a data-over-signaling (DoS) message to include transport data and application data, and then sending the DoS message on a reverse link access channel to the RAN 120, which forwards the DoS message to the application server 170. In an example, the DoS message transmitted in 415C can use a signaling or DoS port that has already been set-up for signaling messages of AT 1. For example, certain ATs can be preconfigured with DoS ports by a service provider (e.g., Sprint, Verizon, etc.) before being provisioned to end-users of the ATs. Thereafter, the ATs are permitted to use their associated DoS port so long as coverage can be provided by the RAN 120.

Accordingly, AT 1 leverages the previously established signaling port to set-up the transport and application-layer connections for the file-transfer session in 415C. The application server 170 recognizes specific information (e.g., a message being delivered on a different port than the port that is being used to send the data, such as the signaling port) the contained in the DoS message in 415C, determines AT 1 is attempting to set-up a transport connection in order to send data to AT 2 during a file-transfer session. Accordingly, the application server 170 uses the transport-layer parameters contained in the DoS message from 415C to select a data port for AT 1 to use during the file-transfer session, 417C.

The application server 170 sends a Start message to AT 2 in 401D to instruct AT 2 to prepare for the file-transfer session. 401D is discussed in more detail below with respect to FIG. 4D, which covers signaling between the application server 170 and the target AT 2 in more detail.

At some later point in time, assume that AT 1 completes its TCH set-up, 420C. AT 1 also receives a reply, from the application server 170, to the DoS message of 415C on the data port that is set-up for AT 1 in 417C, 425C. At this point, AT 1 begins sending data to the application server 170 to be forwarded to AT 2 on the data port, 430C. As will be appreciated, the initial data message, 431C, that is sent on the data port over the TCH to the RAN 120 to be forwarded to the application server 170 functions as an ACK to the reply message from 425C, such that AT 1 need not send an explicit ACK to the reply message. The application server 170 forwards the data from AT 1 to AT 2 in 445D (e.g., after buffering the data for a period of time until AT 2 is prepared to receive the data), which is discussed in more detail below with respect to FIG. 4D.

As discussed above, the DoS message of 415C can function as a SYN message. Thereafter, the Reply message of 425C can function as a SYN-ACK message, and AT 1 can complete set-up of the data port by sending data on the data port in 430C and 431C, which functions to ACK the reply message. Accordingly, 415C, 425C and 431C collectively correspond to a different manner of performing the TCP-handshaking that is shown in 415A of FIG. 4A, whereby the transport connection can begin set-up before a TCH is obtained.

In an example, the TCP SYN message (e.g., shown in 410A of FIG. 4A) can be embedded within the DOS message of 415C. The key contents of the TCP SYN message include the source and destination ports and the initial sequence number. The application server 170 can respond with a SYN_ACK message (e.g., which can be embedded in the reply message of 425C, which is discussed below in more detail) or can encode the key contents of the SYN ACK message (e.g., the source and destination ports and the initial sequence number) in another message sent to AT 1, such as an ACK to a call request message (e.g., a Call-ACK message over user datagram protocol (UDP)). In either case, the TCP transport connection for AT 1's file-transfer session leverages the signaling session parameters that are typically used for an application-layer communication session (e.g., a multimedia session between two or more participants). By initiating set-up of the transport connection in 415C, the SYN message can be communicated more quickly to the application server 170, and consequently the set-up of the TCP connection can occur more quickly for an end-to-end call between participants. In other words, delay associated with performing the 3-way handshake for setting up the TCP connection (as in 410A of FIG. 4A) is reduced in the embodiment of FIG. 4C.

The reply message of 425C is sent on the data port instead of the signaling port, and after the reply message (e.g., containing information similar to a SYN-ACK message) is sent in 425C, AT 1 can begin to use the data port for transmissions of data during the file-transfer session. Accordingly, by concurrently initiating processes for bringing up the TCH and obtaining a transport connection for the file-transfer session, AT 1 can more quickly begin sending application-layer data for the file-transfer session. As noted above with respect to FIG. 4C, the data packets sent in 430C and 431C may arrive at the application server 170 out of order due to loss in the wireless link. The application server 170 will buffer all the packets in this case. Conventionally, only consecutive packets from 1 to p can be delivered to AT 2 even if n−1 packets are available because packet p+1 is still missing. This is known in the art as 'head-of-line blocking' and is a problem in conventional TCP. As will be described below in more detail, in at least one embodiment of the invention, head-of-line blocking can be reduced and/or eliminated (e.g., when the data port corresponds to UDP, blocking is eliminated altogether). For example, as will be discussed below in more detail, buffering may only continue until a reply message is received from target AT 2 at 440D of FIG. 4D, as compared to conventional FIGS. 4A and 4B whereby buffering occurs until a given file completes its transfer.

AT 1 can periodically determine whether the file(s) to be transferred during the file-transfer session have been successfully sent to the application server 170 for transmission to AT 2, 440C. If AT 1 determines that one or more files or file-portions have not yet completed their transmission in 440C, the process returns to 430C and AT 1 continues to send file(s) or file-portions to the application server 170 for transmission to AT 2. Otherwise, the process advances to 445C after the transfer of all files for the file-transfer session of 430C complete their transmission. In 445C, AT 1 determines whether to send any additional files to AT 2. If so, the process returns to 430C, and AT 1 re-uses the session resources established during 410C through 435C for the previous file-transfer session to send one or more file(s) during another file-transfer session to AT 2. Otherwise, if AT 1 determines no more data requires transmission to AT 2 in 445C, AT 1 releases the session resources obtained for the data transmission of 430C and 431C, such that the TCH from 410C and 420C is torn-down and the transport connection (i.e., data port) is terminated.

As will be appreciated from a review of FIG. 4C, the signaling port is used to send the SYN-message (or equivalent information), and thereafter data is sent to the application server 170 via the data port. Thus, the transport connection is set-up on a different port than the port being set-up for the actual session.

FIG. 4D illustrates operations that occur between the application server 170 and the target AT 2 during the process of FIG. 4C in accordance with an embodiment of the invention. In particular, FIG. 4D illustrates the signaling between the application server 170 and the target AT 2 between 401D and 445D of FIG. 4C.

Referring to FIG. 4D, upon receiving the Start message from AT 1 in 415C of FIG. 4C, the application server 170 identifies and locates each intended target for the file-transfer session, and then sends a Start message to each identified and located target, 401D. In FIG. 4D, for convenience of explanation, a single target AT 2 is shown. The Start message(s) of 401D includes transport data, such as timer delays and message window sizes, along with some application data such as a designation of a port upon which the application server 170 expects to receive data from AT 2. As will be appreciated, the data port(s) allocated to the target(s) of the file-transfer session need not be the same as the data-port allocated to AT 2. The Start message of 401D is sent over a signaling port, such as a DoS port. Accordingly, the Start message can correspond to a mobile-termination (MT)-DoS message, contrasted with a mobile-originated (MO) DoS message as in 415C from AT 1.

Upon receiving the Start message, AT 2 determines whether AT 2 is already engaged in an existing communication session, such that AT 2 already has a TCH, 410D. If AT 2 determines that AT 2 does not yet have a TCH in 410D, AT 2 brings up a TCH in 415D.

Turning back to AT 1, after AT 1 obtains a data port (e.g., after AT 1 receives the reply message in 425C of FIG. 4C), AT 1 begins sending data to the application server 170 on the data port, 430D. In FIG. 4D, 431C corresponds to the initial data packet sent over the data port from AT 1, and 431C of FIG. 4D also corresponds to the like-numbered signal discussed above with respect to FIG. 4C.

In the embodiment of FIG. 4D, it is assumed that data from AT 1 intended for AT 2 begins arriving at the application server 170 on AT 1's data port before AT 2 is prepared to receive the data. Accordingly, the application server 170 begins buffering the data from AT 1 in 425D, and the application server 170 continues to buffer the data in 425D at least until AT 2 indicates its readiness to download the data from the application server 170.

After setting up the TCH in 415D or confirming that AT 2 already had a TCH in 410D, AT 2 sends a reply message to the application server 170, 440D. The reply message of 440C includes information such as the port AT 2 is using for the file-transfer session. Upon receiving the reply message from AT 2, the application server 170 knows the data port used by AT 2 for the file-transfer session, and thereby begins sending the buffered data of 425C to AT 2, 445D.

While not shown in FIG. 4D, it is possible that the reply message of 440D can arrive at the application server 170 before the data from AT 1 arrives at the application server 170 in 431C. For example, if AT 1 starts the process of FIG. 4C without a TCH and AT 2 starts the process of FIG. 4D with a TCH, AT 2 may be able to respond to the Start message more quickly than AT 1 can set up its own TCH and start sending data. In this case, the application server 170 need not perform the buffering of 425D, and rather can begin forwarding the data from AT 1 to AT 2 as soon as the data from AT 1 begins to arrive at the application server 170.

While FIGS. 4C-4D relate to how a file-transfer session can be set-up, another aspect to file-transfer sessions in wireless communication systems is the interaction between different functional layers of an originating or target access terminal. In FIGS. 5A through 5D, references are made to functional layers "1", "2" and "3" of AT 1. These different functional layers correspond to a combination of software and/or hardware that is responsible for performing a particular function at different layers. However, while the embodiments described below focus upon three (3) functional layers for convenience of explanation, it will be appreciated that the embodiments are not restricted to 3 functional layers and can instead include any number of functional layers.

In an example, functional layer 1 can be referred to as a MAC layer, functional layer 2 can be referred to as a transport-layer, and functional layer 3 can be referred to as an application-layer. Functional layer 1 is characterized as having a transmission window or transmission queue that holds data packets queued for transmission on a reverse-link physical layer channel to the RAN 120. Functional layer 2 can request certain packets to be added to the transmission window of functional layer 1, and these packets can actually be generated at a higher-level or higher-layer by functional layer 3.

In an example, functional layer 3 can correspond to an application-layer interface such as a session initiation protocol (SIP) client or any other multimedia application layer interface process. A SIP client for instance, may be responsible for managing application-layer functionality of a media application (e.g., a VoIP application, a PTT application, etc.), a transport layer protocol, and a lower-layer controller (e.g., a controller of a radio link control (RLC) layer in W-CDMA systems, a controller of a radio link protocol (RLP) layer in EV-DO systems, etc.).

Generally, when functional layer 3 has data to send to another session participant (e.g., AT 2), functional layer 3 requests functional layer 2 to send the data, which in turn requests functional layer 1 to send the data on the physical-channel. However, because functional layer 3 does not have direct control with regard to when the data is actually transmitted, functional layer 3 cannot determine when the data is sent on the physical-channel by functional layer 1. Thus, the functional layer 3 typically tracks when it issues data-packet transmission commands to functional layer 2, but does not track when functional layer 1 transmits the actual data packet on the physical layer (i.e., over the wireless interface 104).

Figure 5A:
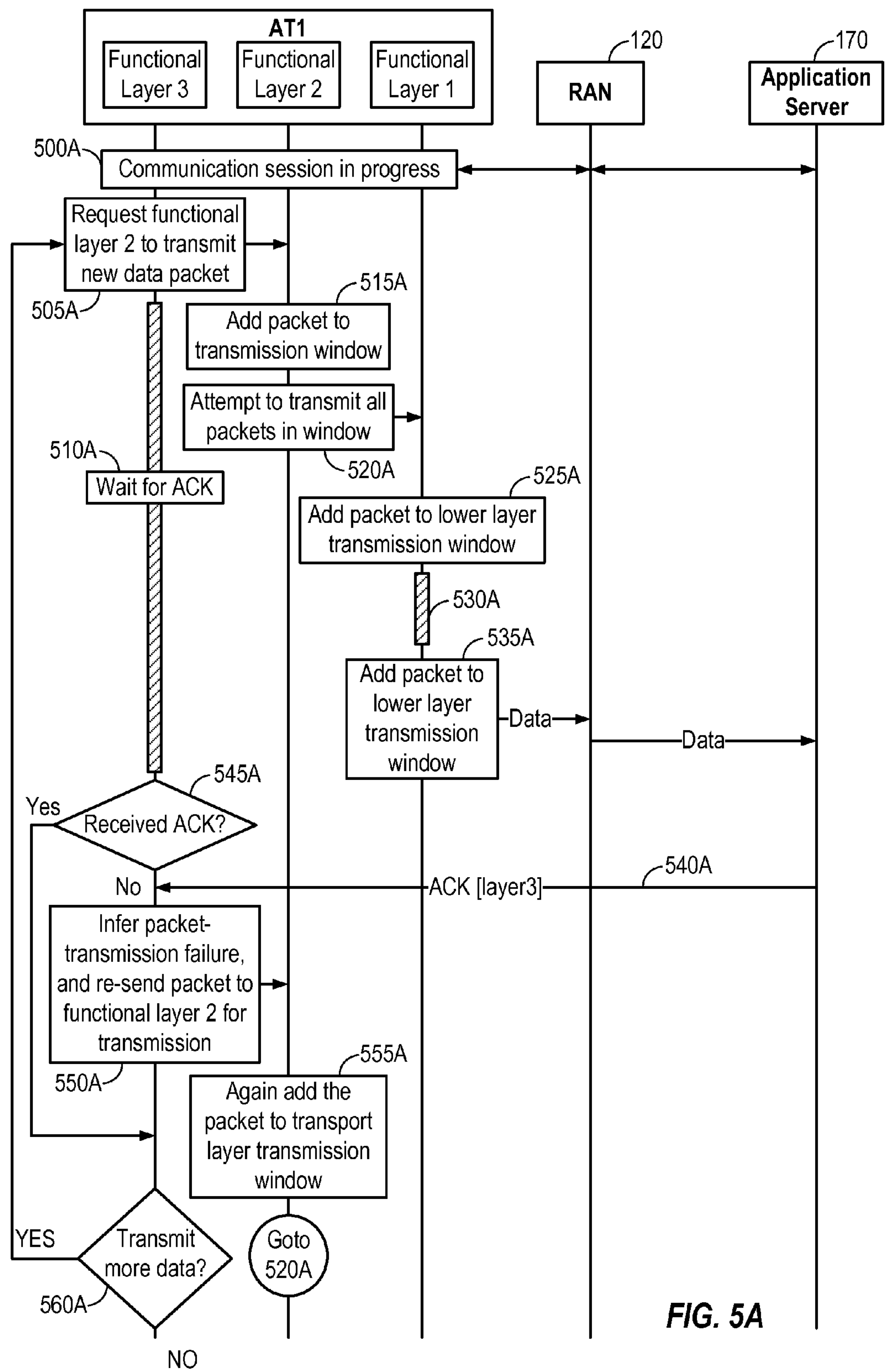
FIGS. 5A through 5D illustrate different embodiments of interactions between different functional layers of an originating or target access terminal during a communication session.

Referring to FIG. 5A, assume AT 1 sets up and begins participation in a communication session (e.g., a streaming media session, a file-transfer session, etc.) with at least one other session participant, 500A. Next, functional layer 3 issues a request to functional layer 2 to transmit a new data packet for the communication session be sent to the application server 170 and then to the at least one other session participant, 505A. After requesting functional layer 2 to transmit the new data packet, functional layer 3 starts an expiration timer having a given expiration period. While the expiration timer is running, functional layer 3 waits to receive an ACK of the transmitted data packet, whereby functional layer 3 will infer that the transmission of the data packet was not successful if no ACK is received before the expiration timer expires, 510A.

Functional layer 2 receives the request for transmission of the new data packet and adds the data packet to a transmission queue or window maintained by functional layer 2, 515A, after which functional layer 2 instructs functional layer 1 to attempt to transmit all of the data packets that are currently scheduled in the transmission window of functional layer 2, 520A. As will be appreciated, not all embodiments of the invention require the functional layer 2 to have its own transmission window or queue. If functional layer 2 did not have such a transmission window, functional layer 2 could simply add the data packet requested for transmission in 505A into the transmission window of functional layer 1 each time a new data packet is requested for transmission by functional layer 3. Accordingly, while functional layer 2 does not necessarily have its own transmission queue, the embodiments of FIGS. 5A through 5D are described under the assumption that functional layer 2 has access to its own transmission queue. It will be readily appreciated by one of ordinary skill in the art how FIGS. 5A through 5D can be modified to accommodate the lack of a transmission queue at functional layer 2 in other embodiments of the invention.

Functional layer 1 receives the transmission order from functional layer 2, and then adds the data packets from the transmission window of functional layer 2 to its own transmission window, 525A. At 530A, functional layer 1 makes one or more attempts to transmit the data packets contained in the transmission window of functional layer 1. In 530A, when a transmission attempt of one of the data packets in the transmission window of functional layer 1 is not successful, functional layer 1 adds the unsuccessfully transmitted data packets back to the transmission window of functional layer 1 a given number of times until the data packet(s) are sent successfully. Accordingly, 535A shows the data packet being added back to the transmission window of functional layer 1 resulting in its successful transmission. As will be appreciated by one of ordinary skill in the art, functional layer 3 is not notified with regard to whether these individual attempts to send the data packet are successful or unsuccessful. After the successful transmission of the data packet in 535A, the Application Server 170 acknowledges the successful receipt of the data packet by sending a function layer-3 ACK message back to AT 1, 540A.

While the above-described data packet transmission process is ongoing at functional layer 1, functional layer 3 is not actually aware of the actions taking place at functional layer 1, and functional layer 3 simply monitors whether an ACK to the data packet requested for transmission in 505A has been received at functional layer 3. Accordingly, in 545A, functional layer 3 determines whether an ACK to the requested data packet from 505A has been received before the expiration timer expires. If functional layer 3 determines that the data packet has been successfully ACKed in 545A, the process advances to 560A. Otherwise, if functional layer 3 determines that the data packet has not been successfully ACKed in 545A, functional layer 3 infers transmission failure for the data packet, and issues another request to the transport layer protocol for transmitting the data packet again, 550A. In the embodiment of FIG. 5A, the ACK in 540A is received after the expiration of the expiration timer, such that functional layer 3 has already determined that its data packet has not been ACKed successfully in 545A.

Accordingly, functional layer 2 receives the new request for the transmission of the data packet, and again adds the data packet to the transmission window of functional layer 2, 555A. At this point, the process returns to 520A and repeats for the new request for transmission of the data packet by functional layer 1. As will be appreciated, even though functional layer 1 has continued to attempt to send the data packet, functional layer 3 is only aware that the expiration timer has expired which triggers the new request for the data packet's transmission. This will then require functional layer 1 to send the data packet to the application server 170 twice (i.e., once for each packet transmission request issued by functional layer 3 in 505A).

In the embodiment of FIG. 5A, when functional layer 3 determines that one of the data packets it has requested for transmission has been successfully ACKed by the application server 170 in 545A, functional layer 3 then determines whether more data is to be requested for transmission to the application server 170, 560A. If functional layer 3 determines to transmit more data to the application server 170 in 560A, the process returns to 505A and repeats for the transmission of one or more additional data packets. Otherwise, the process of FIG. 5A terminates, although the communication session of 500A could continue with AT 1 receiving data packets without sending data packets for a period of time.

An embodiment of the invention directed to a mechanism by which functional layer 3 and functional layer 1 can exchange information related to the status of a packet awaiting transmission at functional layer 1 will now be described with respect to FIG. 5B.

Figure 5B:
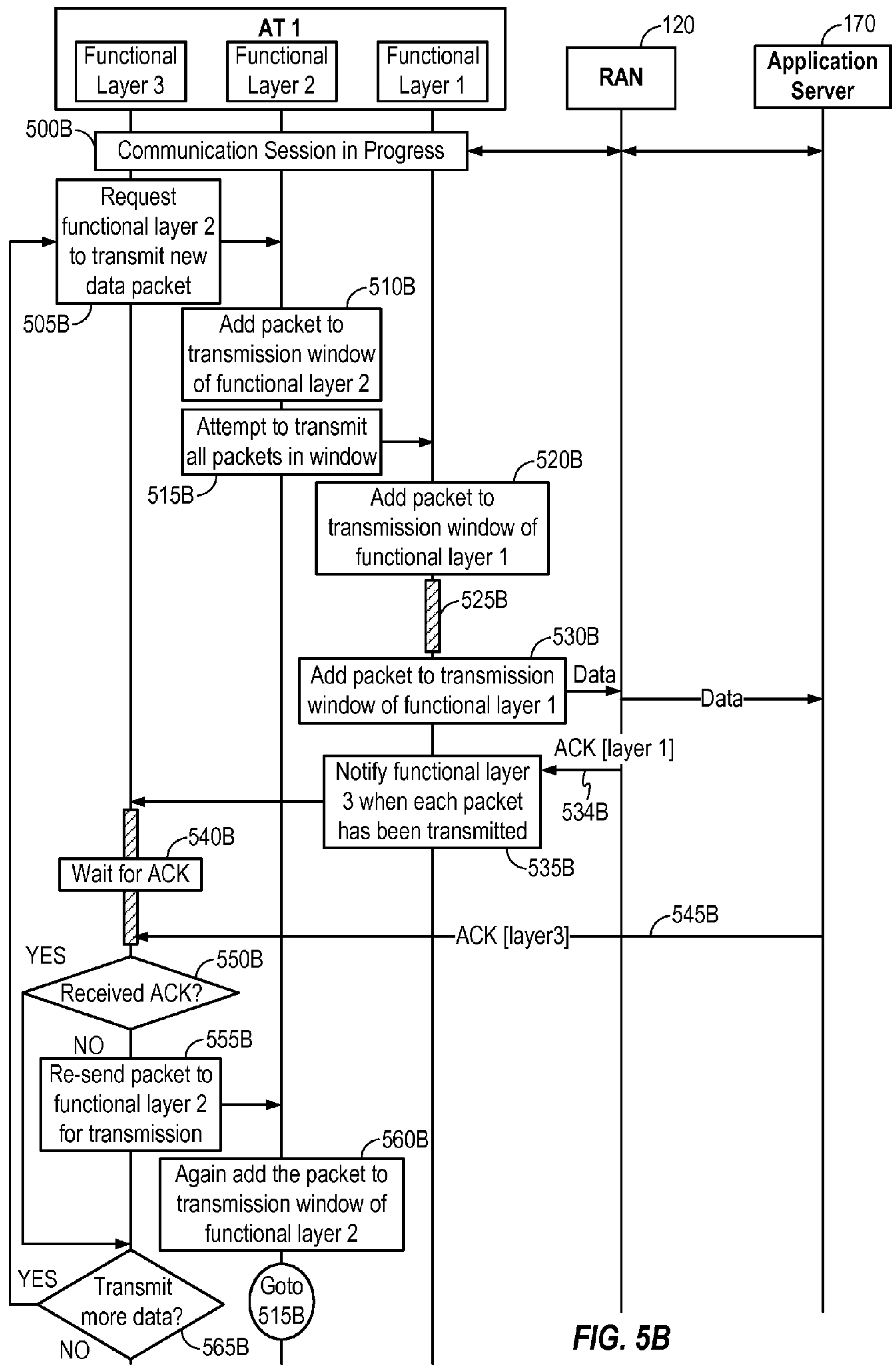

Referring to FIG. 5B, assume AT 1 sets up and begins participation in a communication session with at least one other session participant, 500B. Next, functional layer 3 requests that a new data packet for the communication session be sent to functional layer 2 for transmission to the application server 170 and then to the at least one other session participant, 505B. However, unlike FIG. 5A, after requesting functional layer 2 to send the new data packet in 505B, functional layer 3 does not yet start the expiration timer that defines a time period during which functional layer 3 will wait for the ACK to the data packet.

Next, 510B through 530B of FIG. 5B generally correspond to 515A through 535A, respectively, of FIG. 5A, and as such will not be described in further detail for the sake of brevity. After functional layer 1 successfully transmits the data packet to the RAN 120 on the physical-layer in 530B, the RAN 120 sends a layer 1-ACK to functional layer 1 of AT 1, 534B, after which functional layer 1 sends a notification message to functional layer 3 that indicates that the data packet requested for transmission in 505B has been transmitted from AT 1, 535B. For example, the notification message from functional layer 1 to functional layer 3 may be implemented as a call-back API. While not shown explicitly in FIG. 5B, the notification of 535B can be performed for each data packet that has been requested for transmission by functional layer 3 when the respective data packets are transmitted from AT 1 at functional layer 1.

Functional layer 3 conventionally starts the expiration timer when functional layer 3 itself requests the data packet transmission, which does not take into account delays at functional layers 2 and/or 1 before the data packet can be transmitted from AT 1. In the embodiment of FIG. 5B, upon receiving the notification of data packet transmission at functional layer 3 in 535B, functional layer 3 starts the expiration timer in 540B, instead of when the data packet transmission request is issued in 505B. As will be appreciated by one of ordinary skill in the art, starting the expiration period at this later point in time reduces the chance that functional layer 3 will re-issue requests to transmit the same data packet due to delays at functional layers 2 and/or 1 of AT 1 that occur prior to the transmission of the data packet. Also, throughput need not be degraded except in an edge scenario. Further, it will be appreciated that while the expiration timer started in 540B is shown as running for a shorter period of time than the expiration timer in 510A, the actual expiration periods for the times of 510A and 540B can be the same. However, because the expiration timer in 540B starts at a later point in time, the expiration timer of 540B can run for a shorter period because an ACK will be more quickly received subsequent to the start of the timer.

Turning back to functional layer 1, after the successful transmission of the data packet in 530B, the Application Server 170 acknowledges the successful receipt of the data packet by sending a layer-3 or SIP-layer ACK message back to AT 1, 545B.

In 550B, functional layer 3 determines whether an ACK to the requested data packet from 505B and transmitted from AT 1 at 530B has been received before the expiration timer expires. Again, the expiration timer in FIG. 5B starts after the notification of 535B instead of earlier when the actual data packet transmission request is issued from functional layer 3 at 505B, which generally means the expiration timer of FIG. 5B will grant the Application Server 170 a longer timer to ACK an initial data packet's transmission before a repeat-transmission is requested by functional layer 3. If functional layer 3 determines that the data packet has been successfully ACKed in 550B, the process advances to 565B. Otherwise, if functional layer 3 determines that the data packet has not been successfully ACKed in 550B, functional layer 3 infers transmission failure for the data packet, and issues another request to functional layer 2 for transmitting the data packet again, 555B. Functional layer 2 receives the new request for the transmission of the data packet, and again adds the data packet to the transmission window of functional layer 2, 560B. At this point, the process returns to 515B and repeats for the new request for transmission of the data packet. In the example of FIG. 5B, it will be appreciated that the decision block of 550B evaluates to the ACK from the Application Server 170 being received within the expiration period based at least in part to functional layer 3 starting the expiration timer responsive to the notification of 535B instead of the transmission request of 505B.

Accordingly, FIG. 5B is one example embodiment the demonstrates how the number of unnecessary repeated data packet transmission requests from functional layer 3 can be reduced by implementing a mechanism by which functional layer 1 can notify functional layer 3 with regard to when a data packet transmission over the wireless or physical layer to the RAN 120 is successful. Accordingly, while FIGS. 5A-5B illustrate benefits associated with an early notification to functional layer 3 of the successful physical-layer transmission of a given data packet, FIGS. 5C-5D illustrate benefits associated with an early notification to functional layer 3 of the unsuccessful physical-layer transmission of a given data packet.

Figure 5C:
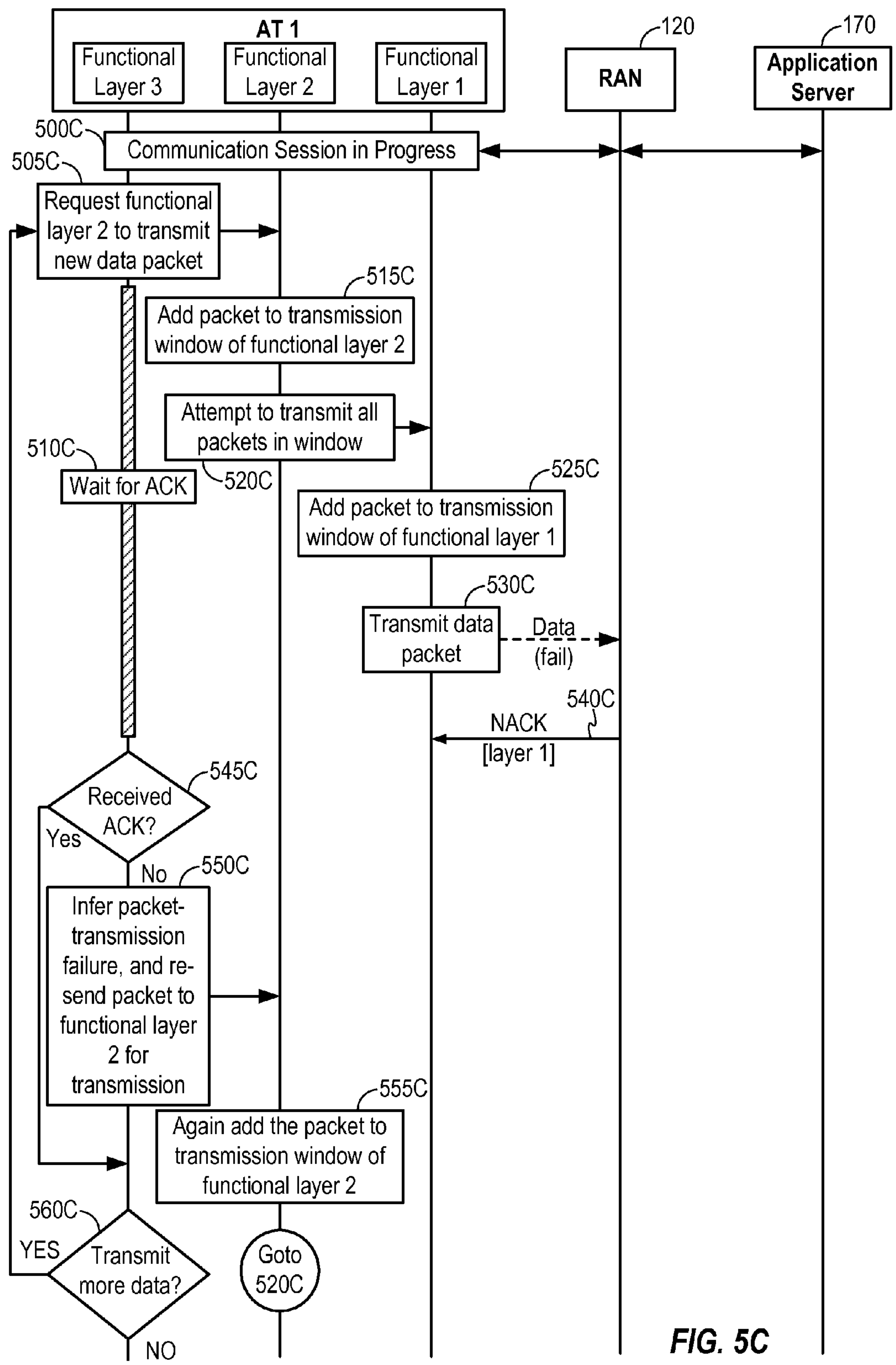
Figure 5D:
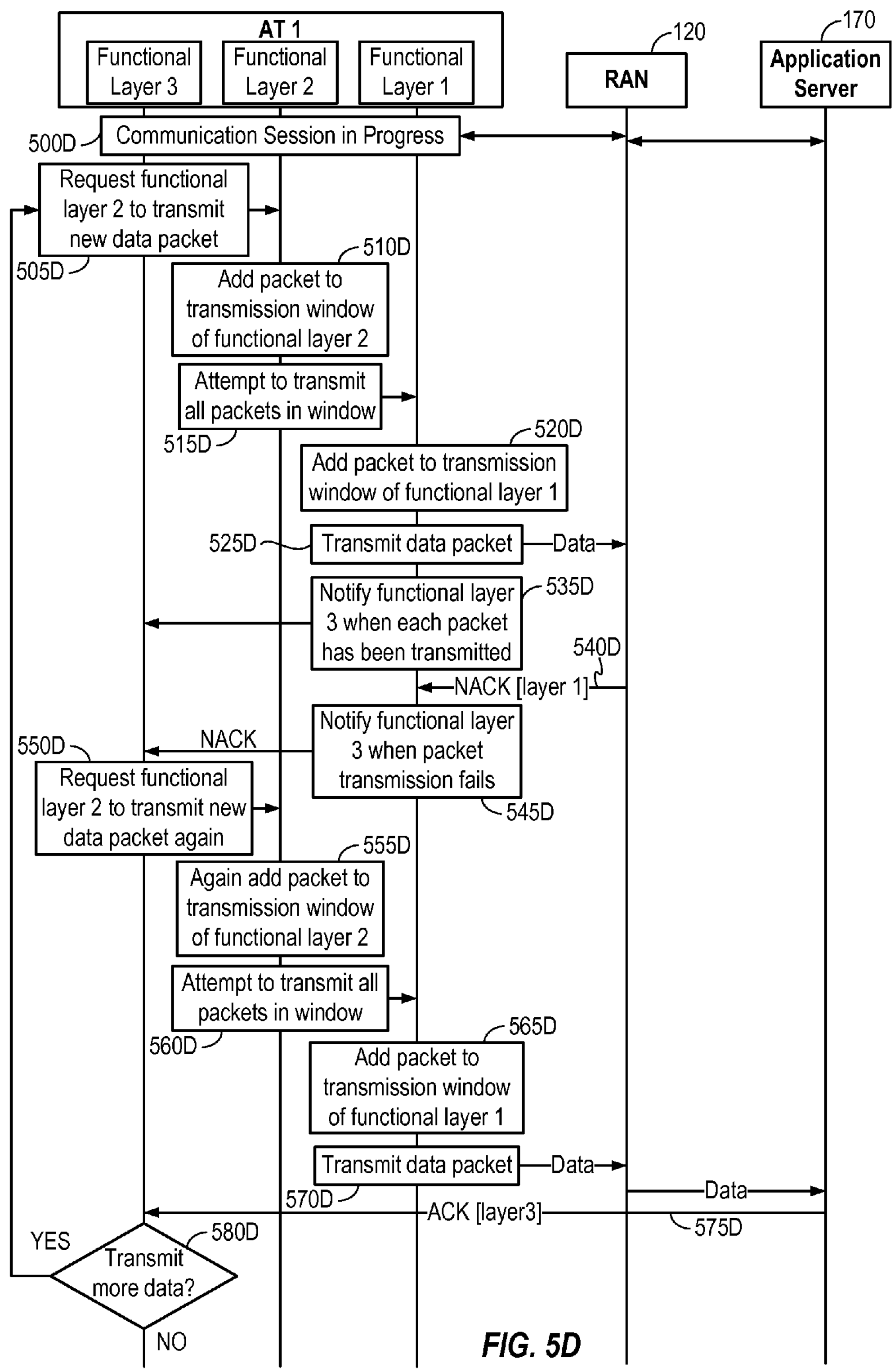

Referring to FIG. 5C, assume AT 1 sets up and begins participation in a communication session (e.g., a streaming media session, a file-transfer session, etc.) with at least one other session participant, 500C. Next, functional layer 3 issues a request to functional layer 2 for transmission of a new data packet to the application server 170 and then to the at least one other session participant, 505C. After requesting functional layer 2 to send the new data packet, functional layer 3 starts an expiration timer having a given expiration period, as in 510A of FIG. 5A. While the expiration timer is running, functional layer 3 waits to receive an ACK of the transmitted data packet, whereby functional layer 3 will infer that the transmission of the data packet was not successful if no ACK is received before the expiration timer expires, 510C.

Functional layer 2 receives the request for transmission of the new data packet and adds the data packet to a transmission window of functional layer 2, 515C, after which functional layer 2 instructs functional layer 1 to attempt to transmit all of the data packets that are currently scheduled in the transmission window of functional layer 2, 520C. Functional layer 1 receives the transmission order from functional layer 2, and then adds the data packets from the transmission window of functional layer 2 to its own transmission window, 525C. At 530C, functional layer 1 makes one or more attempts to transmit the data packets contained in the transmission window of functional layer 1. In 530C, when a transmission attempt of one of the data packets in the transmission window of functional layer 1 is not successful, functional layer 1 adds the unsuccessfully transmitted data packets back to the transmission window of functional layer 1 a given number of times until the data packet(s) are sent successfully the number of repeated transmission attempts exceeds a threshold. Accordingly, 530C shows an unsuccessful attempt to transmit the data packet to the application server, whereby the data packet is not sent successfully to the RAN 120.

Because the RAN 120 could not complete the transmission of the data packet to the application server 170, the RAN 120 sends a layer-1 negative ACK (NACK) to functional layer 1 of AT 1, 540C. Alternatively, an explicit NACK need not be sent by the RAN 120, in which case functional layer 1 will simply infer failure of the data packet's transmission on the physical layer after a threshold period of time without an ACK being received from the RAN 120 (i.e., ACK-timeout). However, while functional layer 1 receives the NACK-frame or infers packet-loss when no ACK is received, functional layer 1 does not notify functional layer 3 that the attempted transmission of the data packet has already failed.

In the embodiment of FIG. 5C, while the above-described data packet transmission process is ongoing at functional layer 1, functional layer 3 is not actually aware of the actions taking place at functional layer 1, and functional layer 3 simply monitors whether an ACK to the data packet requested for transmission in 505C has been received at functional layer 3. Accordingly, in 545C, functional layer 3 determines whether an ACK to the requested data packet from 505C has been received before the expiration timer expires. If functional layer 3 determines that the data packet has been successfully ACKed in 545C, the process advances to 560C. Otherwise, if functional layer 3 determines that the data packet has not been successfully ACKed in 545C, functional layer 3 infers transmission failure for the data packet, and issues another request to functional layer 2 for transmitting the data packet, 550C. Functional layer 2 receives the new request for the transmission of the data packet, and again adds the data packet to the transmission window of functional layer 2, 555C. At this point, the process returns to 520C and repeats for the new request for transmission of the data packet.

As will be appreciated, even though functional layer 1 determined packet-failure or packet-loss in 540C (e.g., either from an explicit NACK or a failure to receive an ACK from the RAN 120), functional layer 3 assumes the transmission failure only upon expiration of the expiration timer in 545C. Accordingly, relying upon the expiration timer in FIG. 5A caused an unnecessary repeat-transmission of the data packet when the ACK arrived late, and relying upon the expiration timer in FIG. 5C caused an unnecessary delay before ordering a repeat-transmission of the data packet when the transmission attempt actually fails.

Turning back to FIG. 5C, when functional layer 3 determines that one of the data packets it has requested for transmission has been successfully ACKed by the application server 170 in 545C, functional layer 3 then determines whether more data is to be requested for transmission to the application server 170, 560C. If functional layer 3 determines to transmit more data to the application server 170 in 560C, the process returns to 505C and repeats for the transmission of one or more additional data packets. Otherwise, the process of FIG. 5C terminates, although the communication session of 500C could continue with AT 1 receiving data packets without sending data packets for a period of time.

An embodiment of the invention directed to a mechanism by which functional layers 1 and 3 can exchange information related to the status of a packet awaiting transmission at functional layer 1 will now be described with respect to FIG. 5D.

Referring to FIG. 5D, assume AT 1 sets up and begins participation in a communication session with at least one other session participant, 500D. Next, functional layer 3 requests that a new data packet for the communication session be sent to functional layer 2 for transmission to the application server 170 and then to the at least one other session participant, 505D. However, unlike FIG. 5C, after requesting functional layer 2 to send the new data packet in 505D, functional layer 3 does not yet start the expiration timer that defines a time period during which functional layer 3 will wait for the ACK to the data packet.

Next, 510D through 530D of FIG. 5D generally correspond to 515C through 535C, respectively, of FIG. 5C, and as such will not be described in further detail for the sake of brevity. If functional layer 1 was able to successfully transmit any data packets to the RAN 120 in 530B, functional layer 1 sends a notification message to functional layer 3 that indicates that the data packet requested for transmission in 505D has been transmitted from AT 1, 535D, similar to 535B of FIG. 5B. However, soon after 535D, assume that the RAN 120 either sends a layer-1 NACK for the data packet to functional layer 1 of AT 1, or alternatively functional layer 1 infers packet-failure or packet-loss when the RAN 120 fails to ACK the data packet, 540D. In FIG. 5C, the indication of packet-transmission failure at 540C resulted in the cessation of subsequent transmission attempts for the data packet. However, in FIG. 5D, of indication of packet-transmission failure at 540D also results in a notification to functional layer 3 that the attempt to transmit the data packet, which was indicated to functional layer 3 in 535D, has failed in 545D. Similar to the notifications of 535B of FIG. 5B and/or 535D of FIG. 5D, the notification message from functional layer 1 to functional layer 3 in 545D may be implemented as a call-back API.

While not shown in FIG. 5D, functional layer 3 can start the expiration timer upon receipt of the transmission-notification in 535D. However, upon the subsequent receipt of the notification of transmission-failure in 545D, functional layer 3 need not wait for this expiration timer to expire and rather can infer upon that the data packet requires re-transmission via the notification from functional layer 1.

Accordingly, responsive to the transmission-failure notification from functional layer 1, functional layer 3 issues another request to the functional layer 2 for transmitting the data packet, 550D (e.g., irrespective of whether an expiration timer corresponding to a period to refrain from re-issuing the data request transmission, or to wait for the ACK, has expired). Functional layer 2 receives the new request for the transmission of the data packet, and again adds the data packet to the transmission window of functional layer 2, 555D. Functional layer 2 then instructs functional layer 1 to attempt to transmit all of the packets in the transmission window of functional layer 2, 560D. Functional layer 1 receives the transmission order from functional layer 2, and then adds the data packets from the transmission window of functional layer 2 to its own transmission window, 565D. At 570D, assume that functional layer 1 successfully transmits the data packet to the RAN 120, and that the RAN 120 successfully forwards the data packet to the application server 170. Accordingly, the Application Server 170 acknowledges the successful receipt of the data packet by sending a layer-3 ACK message back to AT 1, 575D.

Upon receiving the ACK, functional layer 3 determines whether to transmit another data packet, 580D. If functional layer 3 determines to transmit another data packet, the process returns to 505D. Otherwise, if functional layer 3 determines not to transmit another data packet in 580D, the process of FIG. 5D terminates, although the communication session of 500D could continue with AT 1 receiving data packets without sending data packets for a period of time.

While not shown explicitly in FIG. 5D in order to simplify the signaling diagram, it will be appreciated that the repeated attempt to transmit the data packet between 550D and 575D could also be associated with the notifications of 535D and 545D, as appropriate. These notification messages are omitted for clarity, but it will be appreciated that a transmission-notification could be sent from functional layer 1 to functional layer 3 after 570D, for example, which could result in the expiration timer being started at functional layer 3.

In a further example, referring to FIG. 5D, when using Enhanced Multi-flow Packet Application, the RLP layer (e.g., functional layer 1) performs the framing and de-framing of maximum transmission units (MTUs). If an RLP NACK is received at functional layer 1, the RLP layer upon retransmitting the packet a threshold number of times can indicate to the higher layer (e.g., functional layer 3) whether the MTU was transmitted successfully or not (e.g., as in 535B of FIG. 5B or 535D of FIG. 5D). In case RLP NACKs are disabled but a MTU is fragmented over multiple RLP packets which are further segmented over Physical Layer packets, then the loss of a segment can be inferred by Physical Layer NACKs. A RLP packet can be inferred as successful based on these Physical Layer NAKs. However, if even one of the physical layer segments is completely lost, then the MTU is lost and this information can be utilized by the higher layer to invoke retransmission of the MTU (e.g., in other words, a NACK or packet transmission-failure to any packet 'segment' can be used to infer a failure of the transmission of the whole packet). Similar procedures can be accomplished in WCDMA physical layers if the loss is deduced by the RLC layer. Accordingly, the NACK or packet-transmission failure of 540D could be a NACK or packet-transmission failure to any particular segment.

Figure 6A:
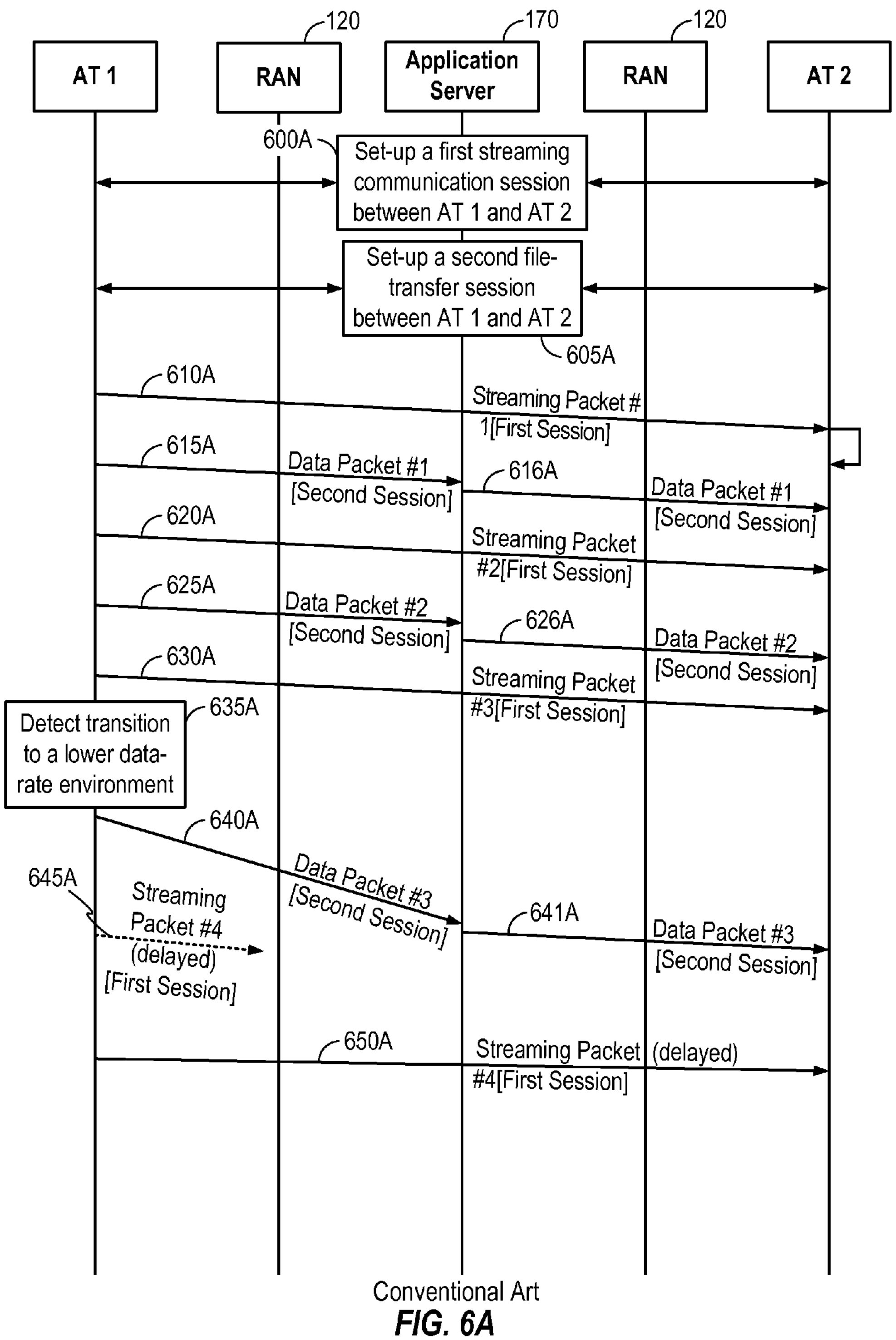
FIG. 6A illustrates a conventional mechanism of supporting a file-transfer session concurrently with a streaming or real-time communication session.

FIG. 6A illustrates a conventional mechanism of supporting a file-transfer session concurrently with a streaming or real-time communication session. Accordingly, referring to FIG. 6A, assume that the application server 170 sets up a first session corresponding to a streaming communication session (e.g., a VoIP session) between AT 1 and AT 2, 600A, and that the application server 170 then sets-up a second session corresponding to a file-transfer session to facilitate the transfer of one or more files from AT 1 to AT 2, 605A. It may be further assumed that the first session of 600A has a higher degree of Quality of Service (QoS) as compared to the second session of 605A (e.g., which may have no QoS at all).

Further assume, at this point, that AT 1 is positioned in a relatively 'fast' network that is capable of supporting AT 1's real-time media transmissions for the first session (i.e., the streaming communication session) and is also capable of concurrently supporting AT 1's packet transmissions at a given payload-size for the second session (i.e., the file-transfer session).

Accordingly, AT 1 transmits streaming packet #1 for the first session, 610A, and AT 1 then transmits data packet #1 for the second session, 615A and 616A. AT 1 then transmits streaming packet #2 for the first session, 620A, and AT 1 then transmits data packet #2 for the second session, 625A and 626A. AT 1 then transmits streaming packet #3 for the first session, 630A.

Below, references are made to a 'lower' data-rate environment and a 'higher' data-rate environment. As will be appreciated, based on the type of data being transferred (and how much data is being simultaneously or concurrently transferred), there is some expectation of time for the user to have a 'good' user experience. In this case, a nominal data rate can be determined whereby most users would be expected to consider their experience-level to be satisfactory. The nominal data-rate can vary between different network technologies (e.g., EV-DO, LTE, WiFi, etc.) and also can even vary based on individual user-performance expectations and/or other factors. Accordingly, as used herein, a lower data-rate environment is associated with a lower expected or actual data-rate as compared to a higher data-rate environment. Also, as used herein, the lower-data rate environment is associated with an actual or expected data rate that is lower than the relevant nominal data-rate, and the higher-data rate environment is associated with an actual or expected data rate that is greater than or equal to the relevant nominal data-rate.

At this point, assume that AT 1 transitions to a lower data-rate environment (e.g., via a handoff from an EV-DO to a 1x system, due to a deterioration in network conditions without a handoff to another network, due to the same physical-channel resources being shared by multiple sessions or applications, etc.), 635A. Accordingly, AT 1 still sends data packet #3 for the second session as scheduled, 640A, and the application server 170 sends data packet #3 to AT 2, 641A. However, due to the lower data-rate environment, the transmission of data packet #3 takes a longer amount of time and overlaps, in part, with the slot during which streaming packet #4 for the first session. Accordingly, streaming packet #4 for the first session is dropped or delayed in 645A during its scheduled slot so that data packet #3 for the second session can complete its transmission. Streaming packet #4 for the first session is then re-scheduled for transmission for a slot after the transmission of data packet #3 for the second session in 650A.

As will be appreciated, in FIG. 6A, even though the first session is generally more susceptible delays in packet-transmission, the lower data-rate environment causes the transmission of data packet #3 to delay the transmission of the next streaming packet for the first session. For example, because functional layer 1 already has a certain number of packets in its transmission queue, it can be difficult to maintain packets of the first session prioritized over packets of the second session begin the second session's packets are already in the queue.

Figure 6B:
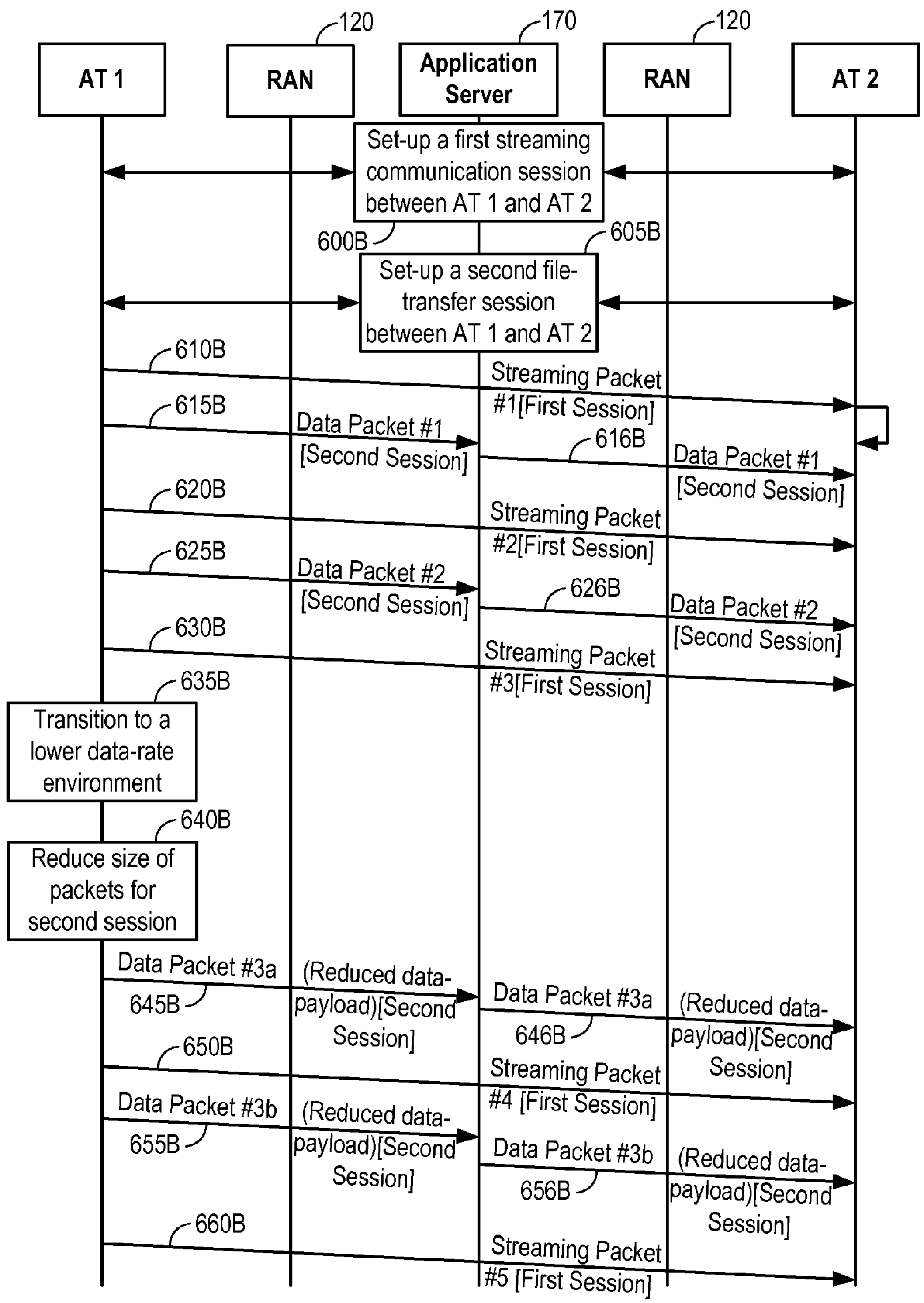
FIG. 6B illustrates an embodiment of the invention whereby the size of data packets for non-streaming sessions, such as file-transfer sessions, are dynamically modified such that delays to packet transmissions of real-time or streaming sessions are reduced and/or avoided.

Accordingly, FIG. 6B illustrates an embodiment of the invention whereby the size of data packets for non-streaming sessions, such as file-transfer sessions, are dynamically modified such that delays to packet transmissions of real-time or streaming sessions are reduced and/or avoided entirely. Referring to FIG. 6B, 600B through 630B substantially correspond to 600A through 630A of FIG. 6A, respectively, and as such will not be described further for the sake of brevity.

In 635B, AT 1 detects that it has transitioned to a lower data-rate environment (e.g., in 635A, AT 1 does not necessarily make this detection during the transition). In an example, the detection of the lower data-rate environment can correspond to entering a 1x, General Packet Radio Service (GPRS), an Evolution-Data Optimized (EV-DO) Rel. 0 Network or Rev. A network with QoS not available to the handset, etc.

After transitioning to a lower data-rate environment in 635B, AT 1 dynamically reduces the size of the data payload within packets for the second session, 640B. For example, the payload-size reduction of 640B can be calculated based on a network to which AT 1 has transitioned (e.g., a first payload-size is used for file-transfer sessions over EV-DO networks, a second payload-size is used for file-transfer sessions over 1x networks, etc.). Alternatively, the payload-size reduction of 640B can be calculated based on any other type of estimation for the lower data-rate environment such that data packets of the second session will not cause delays or rescheduling of the streaming data packets of the first session. Alternatively, the application server 170 can calculate the size that can be allocated to the next data packet without incurring delays to the next streaming data packet, and the application server 170 can convey the acceptable data-packet size to AT 1 (e.g., in an ACK packet, etc.).

Accordingly, AT 1 transmits data packet #3$a$ for the second session, 645B and 646B. As noted above, the payload-portion of data packet #3$a$ is smaller than the payload-portions of data packets #1 and/or #2 of 615B and 616B and/or 625B and 626B. Next, AT 1 transmits streaming packet #4 for the first session, 650B. Unlike 645B and 646B, the streaming packet #4 for the first session can be sent on time and as a full-payload packet because packets for the second session instead of the first session are reduced in order to conform to AT 1's lower data-rate environment. The sessions continue whereby AT 1 transmits data packet #3$b$ for the second session with the reduced payload-portion, 655B and 656B, and then AT 1 transmits another streaming data packet #5, 660B, without rescheduling and at a full data-rate.

Accordingly, by prioritizing a streaming communication session over a file-transfer session, AT 1 can reduce the occurrence of rescheduling or delaying real-time packets for the streaming communication session in the event that AT 1 transitions to a lower data-rate environment.

Further, while FIG. 6B illustrates a particular example whereby AT 1 transitions from a high data-rate environment or network to a low data-rate environment or network, it will be appreciated that FIG. 6B is more broadly representative of a dynamic rate control algorithm (DRCA). For example, the DRCA can schedule high priority, delay-sensitive streamed data at regular intervals (per the cadence of the application, as in the first session of FIG. 6B) and can transmit non-QoS data (e.g., the second session in FIG. 6B) in a volume-regulated manner in the time interval between successive transmissions of the streamed data. For example, depending on the network type, the amount of data of the non-QoS application can be limited to a fixed value.

Alternatively, the amount of data of the non-QoS application (i.e., the second session from FIG. 6B) can be adjusted in every successive time-interval based on one adaptive or probing algorithms such as starting with a conservative value, increasing the MTU size if the voice/QoS packet is not impacted by the delay and reducing the amount of data transmitted if the voice packet is impacted by some delay. E.g., learning algorithms such as reward-penalty algorithms can be used. In another alternative example, the amount of data of the non-QoS application (i.e., the second session from FIG. 6B) can be adjusted in every successive time-interval based on precise information functional layer 1 with regard to the number of slots required to transmit QoS streaming data as well as past non-QoS streaming data, in which case the amount of data scheduled for the next time-interval can be calculated by the handset (e.g., or the application server 170, which can then convey this information to the handset or AT 1).

Thus, FIG. 6B explicitly shows data payload 'reduction' upon entry into a lower data-rate environment. In an alternative example, FIG. 6B could be modified to accommodate an AT that transitions from the lower data-rate environment to a higher-data rate environment. In this alternative example, the payload is increased upon entry into the higher data-rate environment and many different mechanisms of computing the actual payload for the next non-QoS packet could be used.

Figure 6C:
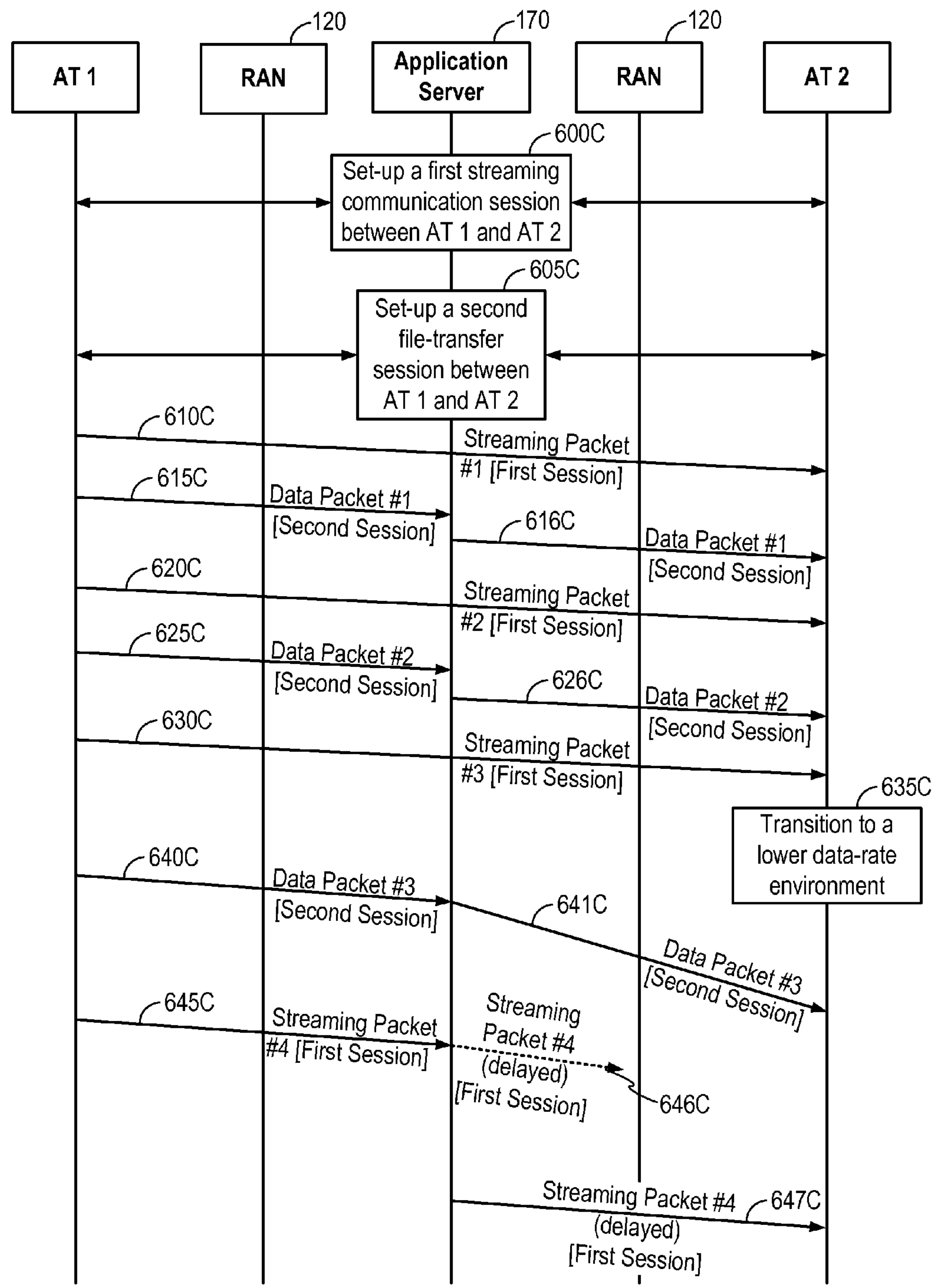
FIG. 6C illustrates another conventional mechanism of supporting a file-transfer session concurrently with a streaming or real-time communication session.

FIG. 6C illustrates another conventional mechanism of supporting a file-transfer session concurrently with a streaming or real-time communication session. In particular, FIG. 6C is similar in some respects to FIG. 6A, except the target AT 2 transitions to the lower data-rate environment instead of the transmitting AT 1. Referring to FIG. 6C, 600C through 630C substantially correspond to 600A through 630A of FIG. 6A, respectively, and/or 600B through 630B of FIG. 6B, respectively, and as such will not be described further for the sake of brevity.

At this point, assume that AT 2 transitions to a lower data-rate environment (e.g., via a handoff from an EV-DO to a 1x system, due to a deterioration in network conditions without a handoff to another network, etc.), 635C. Accordingly, AT 1 still sends data packet #3 for the second session as scheduled, 640C, and the application server 170 begins the transmission of data packet #3 to AT 2, 641C. Before data packet #3 completes its transmission to AT 2, AT 1 sends streaming packet #4 for the first session to the application server 170 for transmission to AT 2. The application server 170 delays the forwarding of the streaming packet #4 to AT 2, 646C. In other words, due to the lower data-rate environment of AT 2, the transmission of data packet #3 from the application server 170 to AT 2 takes a longer amount of time and overlaps, in part, with the slot during which streaming packet #4 for the first session is scheduled. Accordingly, streaming packet #4 for the first session is delayed in 646C. Streaming packet #4 for the first session is then re-scheduled for transmission for a slot after the transmission of data packet #3 for the second session in 647C.

As will be appreciated, in FIG. 6C, even though the first session is generally more susceptible to delays in packet-transmission, the lower data-rate environment causes the transmission of data packet #3 to delay the transmission of the next streaming packet for the first session.

Figure 6D:
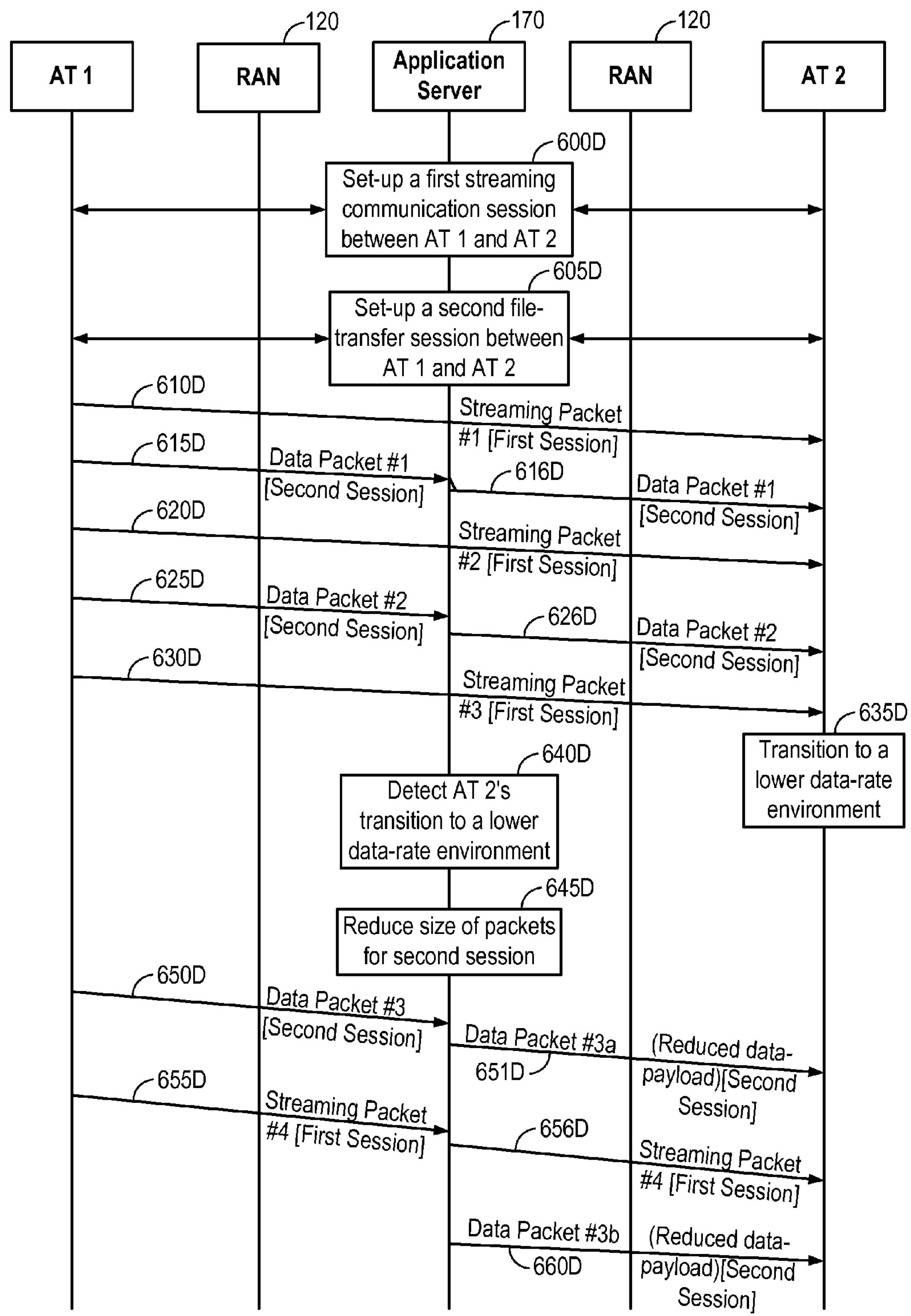
FIG. 6D illustrates an embodiment of the invention whereby the size of data packets for downlink non-streaming sessions, such as file-transfer sessions, are dynamically modified at an application server and/or an access network such that delays to packet transmissions of real-time or streaming sessions are reduced and/or avoided.

Accordingly, FIG. 6D illustrates an embodiment of the invention whereby the size of data packets for downlink non-streaming sessions, such as file-transfer sessions, are dynamically modified at the application server 170 and/or the RAN 120 such that delays to packet transmissions of real-time or streaming sessions are reduced and/or avoided entirely. Referring to FIG. 6D, 600D through 635D substantially correspond to 600C through 635C of FIG. 6C, respectively, and as such will not be described further for the sake of brevity.

Referring to FIG. 6D, after AT 2 transitions to the lower data-rate environment in 635D, the application server 170 detects AT 2's transition to the lower data-rate environment, 640D. For example, the detection at the application server 170 of AT 2's transition to the lower data-rate environment can correspond to (i) a notification from AT 2 or the RAN 120 regarding AT 2's current data-rate environment, (ii) a detection of performance degradation of the application server 170's connection to AT 2, (iii) a report of AT 2's current location, where the application server 170 has knowledge of data-rates associated with particular geographic regions or serving areas, and/or (iv) any other mechanism by which the application server 170 can infer performance characteristics of its link or connection to AT 2.

Upon determining that AT 2 has transitioned to a lower data-rate environment in 640D, the application server 170 reduces the payload of the individual data packets that the application server 170 is forwarding to AT 2 for the second session, 645D. For example, the payload-size reduction of 645D can be calculated based on a network to which AT 2 has transitioned (e.g., a first payload-size is used for file-transfer sessions over EV-DO networks, a second payload-size is used for file-transfer sessions over 1x networks, etc.). Alternatively, the payload-size reduction of 645D can be calculated based on any other type of estimation for the lower data-rate environment such that data packets of the second session will not cause delays or rescheduling of the streaming data packets of the first session. Alternatively, AT 2 can calculate the size that can be allocated to the next data packet without incurring delays to the next streaming data packet, and AT 2 can convey the acceptable data-packet size to the application server 170 (e.g., in an ACK packet, etc.).

Accordingly, AT 1 transmits data packet #3 for the second session with a normal or full-sized payload portion, 650D. Upon receiving data packet #3 from AT 1, the application server 170 reduces the payload-size of data packet #3 to generate data packet #3*a* having a reduced payload-portion, while buffering any data-payload that was excluded from data packet #3*a*. The application server 170 then sends data packet #3*a* to AT 2, 651D. Next, AT 1 transmits streaming packet #4 for the first session to the application server 170, 655D, and the application server 170 is able to send the streaming packet #4 to AT 2 without incurring the delays shown in FIG. 6C because the RAN 120 is able to transmit data packet #3*a* more quickly due to its decreased payload size, 656D. In 660D, the application server 170 transmits data packet #3*b* for the second session with the reduced payload-portion.

Accordingly, by prioritizing a streaming communication session over a file-transfer session, the application server 170 can reduce the occurrence of rescheduling or delaying real-time packets for the streaming communication session in the event that the target AT 2 transitions to a lower data-rate environment.

Further, while FIG. 6D illustrates a particular example whereby AT 2 transitions from a high data-rate environment or network to a low data-rate environment or network, it will be appreciated that FIG. 6D is more broadly representative of a dynamic rate control algorithm (DRCA). For example, the DRCA can schedule high priority, delay-sensitive streamed data at regular intervals (per the cadence of the application, as in the first session of FIG. 6D) and can transmit non-QoS data (e.g., the second session in FIG. 6D) in a volume-regulated manner in the time interval between successive transmissions of the streamed data. For example, depending on the network type, the amount of data of the non-QoS application can be limited to a fixed value.

Alternatively, the amount of data of the non-QoS application (i.e., the second session from FIG. 6D) can be adjusted in every successive time-interval based on one adaptive or probing algorithms such as starting with a conservative value, increasing the MTU size if the voice/QoS packet is not impacted by the delay and reducing the amount of data transmitted if the voice packet is impacted by some delay. For example, learning algorithms such as reward-penalty algorithms can be used. In another alternative example, the amount of data of the non-QoS application (i.e., the second session from FIG. 6D) can be adjusted in every successive time-interval based on precise information with regard to the number of slots required to transmit QoS streaming data as well as past non-QoS streaming data, in which case the amount of data scheduled for the next time-interval can be calculated by the application server 170 (e.g., or the handset, which can then convey this information to the application server 170). Thus, while FIG. 6D explicitly shows data payload 'reduction' upon entry into a lower data-rate environment, the manner in which the data payload is adjusted in other embodiments could increase the payload (e.g., upon entry into a higher data-rate environment) and many different mechanisms of computing the actual payload for the next non-QoS packet could be used.

Also, while FIG. 6D illustrates the application server 170 performing the dynamic payload reduction for the non-QoS or non-real-time session, it will be appreciated that these operations can be performed by AT 2's RAN 120 in other embodiments of the invention. In this case, the application server 170 would forward the data packets for the first and second sessions to the RAN 120, where the RAN 120 would be responsible for dynamically reducing the payload size of the streaming packets to ensure that the transmission of the non-streaming packets does not incur delays to the streaming session.

Figure 7A:
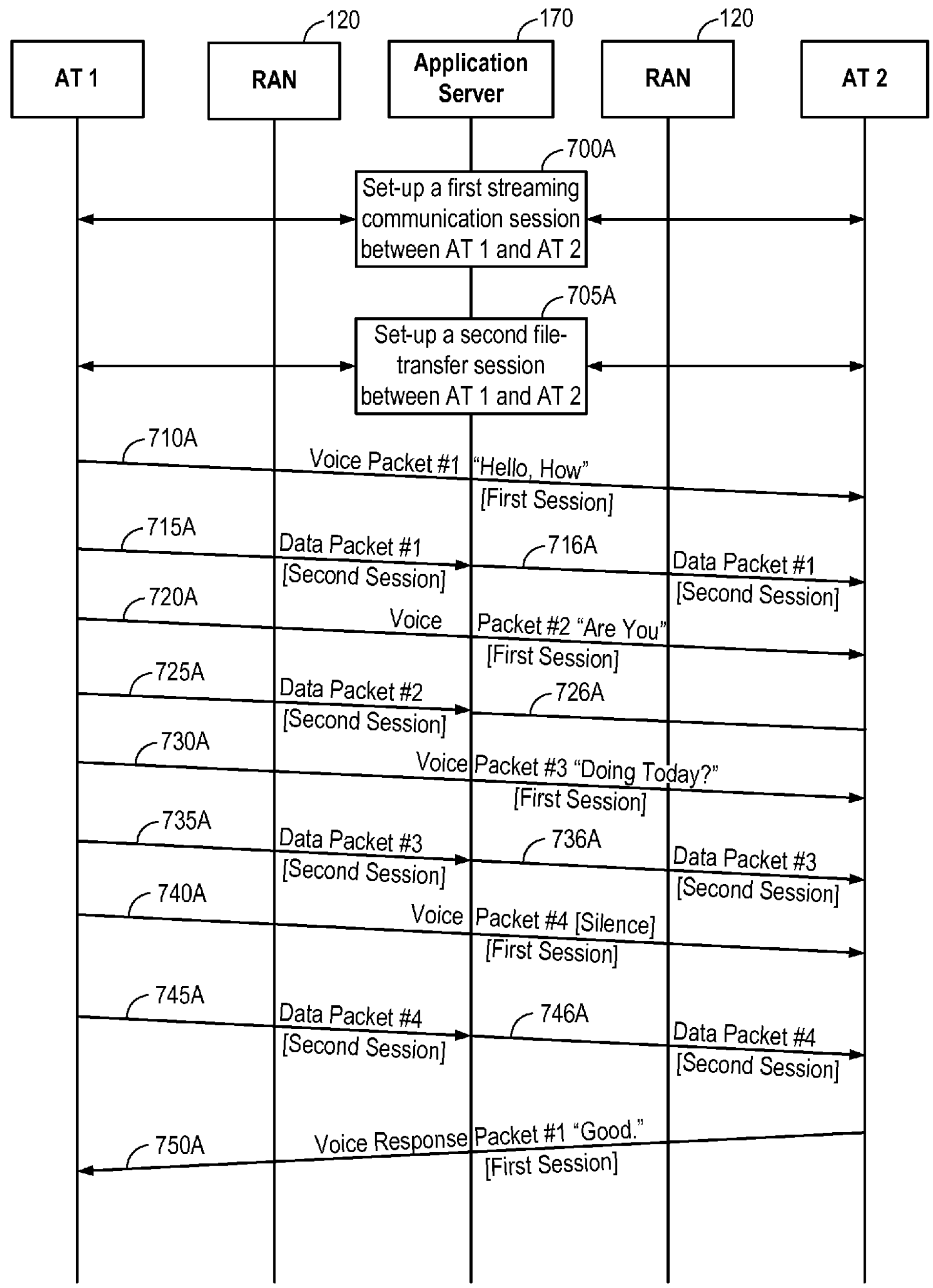
FIG. 7A illustrates a conventional mechanism of supporting a file-transfer session concurrently with a streaming or real-time communication session.

FIG. 7A illustrates a conventional mechanism of supporting a file-transfer session concurrently with a streaming or real-time communication session. Accordingly, referring to FIG. 7A, assume that the application server 170 sets up a first session corresponding to a streaming voice communication session (e.g., a VoIP session) between AT 1 and AT 2, 700A, and that the application server 170 then sets-up a second session corresponding to a file-transfer session to facilitate the transfer of one or more files from AT 1 to AT 2, 705A. It may be further assumed that the first session of 700A has a higher degree of Quality of Service (QoS) as compared to the second session of 705A (e.g., which may have no QoS at all). In particular, FIG. 7A is described whereby a user of AT 1 is transferring the spoken question "Hello, how are you doing today?" to AT 2 and a user of AT 2 responds to the user of AT 1's question by indicating "Good.". During this verbal exchange of the first session, assume that AT 1 is also sending data packets for the second session to AT 2.

Accordingly, AT 1 voice packet #1 ("Hello, How") for the first session, 710A, and AT 1 then transmits data packet #1 for the second session, 715A and 716A. AT 1 then transmits voice packet #2 ("Are You") for the first session, 720A, and AT 1 then transmits data packet #2 for the second session, 725A and 726A. AT 1 then transmits voice packet #3 ("Doing Today?") for the first session, 730A, and AT 1 then transmits data packet #3 for the second session, 735A and 736A.

At this point, assume that a user of AT 1 stops talking into a microphone of AT 1. As such, AT 1 transmits a silence packet as voice packet #4, where a silence packet corresponds to a voice packet that only includes silence frames, 740A. Silence packets include a relatively small data payload and generally contain only background 'comfort' noise, but are treated on the network with the same QoS as a 'real' voice packet. As will be appreciated, in the concurrent voice and media context, these silence packets are packets where data for the file-transfer session or second session could have been sent instead. Thereafter, AT 1 sends data packet #4 for the second session, 745A and 746A, and eventually AT 2 responds to AT 1's question by responding with its own voice response packet #1 ("Good."), 750A.

As will be appreciated, in FIG. 7A, AT 1 sends its silence packet even though little to no actual voice-data is contained therein. Accordingly, for concurrent sessions where a file-transfer is taking place at the same time that a voice (or other multimedia) session is taking place, silence packets can be suppressed and data packets for the file-transfer session can be sent in their place, as will be described next with respect to FIG. 7B.

Figure 7B:
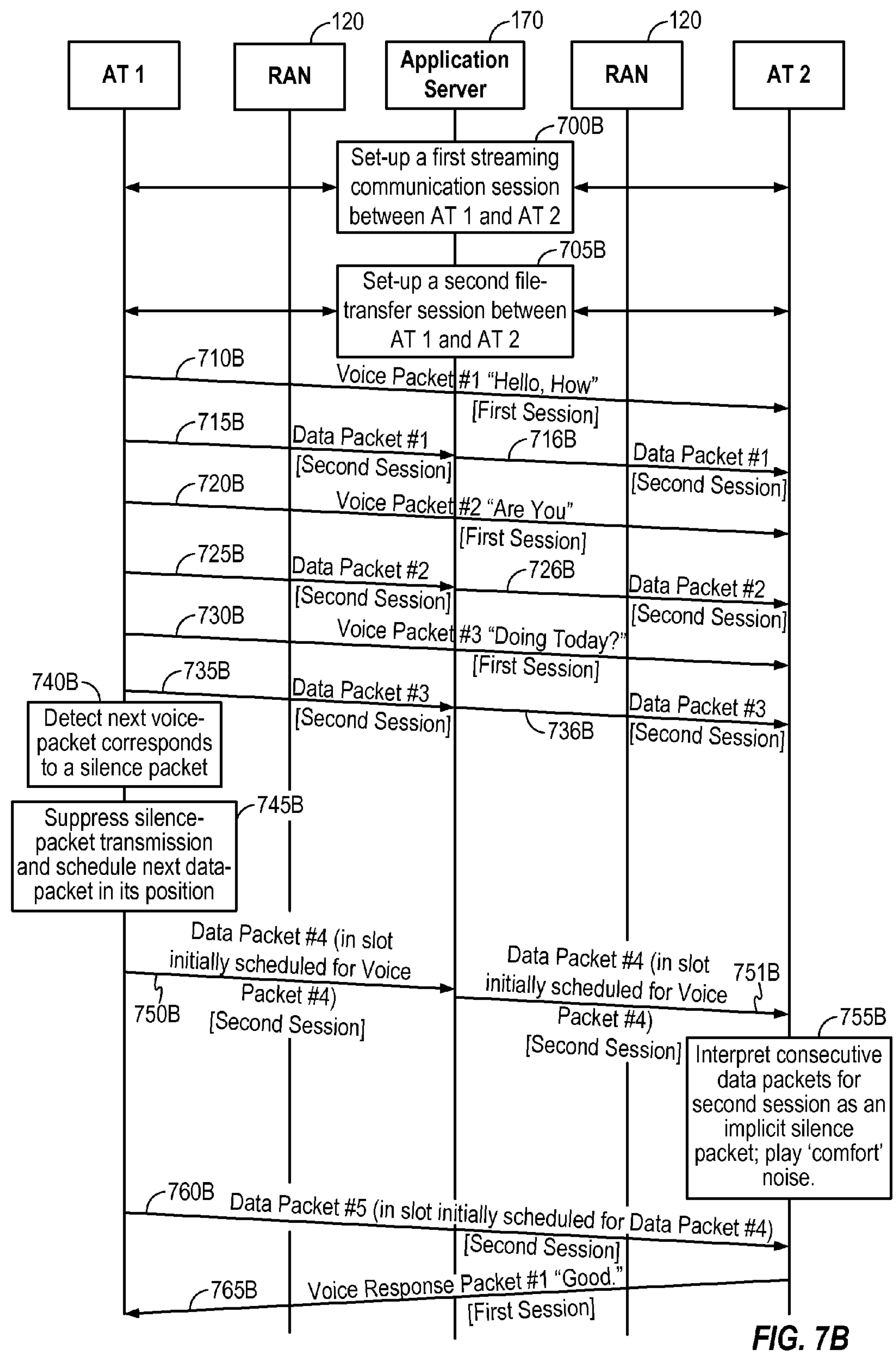
FIG. 7B illustrates an embodiment of the invention whereby silence frames for a streaming multimedia session are suppressed and an increased number of data packets for a low-Quality-of-Service (QoS) or non-QoS file-transfer session are transmitted.

Accordingly, FIG. 7B illustrates an embodiment of the invention whereby silence frames for a streaming multimedia session are suppressed and an increased number of data packets for a low-QoS or non-QoS file-transfer session are transmitted. Referring to FIG. 7B, 700B through 736B substantially correspond to 700A through 736A of FIG. 7A, respectively, and as such will not be described further for the sake of brevity.

After transmitting data packet #3 for the second session in 735B, AT 1 determines that the next queued streaming voice packet corresponds to a silence packet, 740B. As used herein, a silence packet can correspond to a series of silence frames. For example, if a series of silence frames amounting to a threshold time period (e.g., 100 ms) of silence is detected in 740B, this may constitute detection of a silence packet, because a next voice packet (e.g., RTP packet) will only include silence frames and will not include actual voice data (i.e., noise). In an example, EV-DO protocols specify 20 ms per silence frames, in which case AT 1 can count the number of 20 ms frames to be included in the next voice packet, and if each of these 20 ms frames are silence frames, AT 1 determines that the next voice packet is a silence packet.

Further, silence frames can be relatively easy to detect because each silence frame is generally constructed in a standard fashion. Accordingly, AT 1 can compare each voice frame with a predetermined silence frame. By storing a single silence frame to use as a template, AT 1 can compare the template silence frame with its queued voice-packets to determine whether a particular voice-packet is carrying a silence frame.

After determining that the next queued streaming voice packet corresponds to a silence packet in 740B, AT 1 suppresses the silence-packet and schedules the next queued data-packet for the second session in the slot that was to carry the silence packet or voice packet #4, 745B. AT 1 then transmits the next queued data-packet (i.e., data packet #4) for the second session in the slot that was initially scheduled for voice packet #4 of the first session, 750B. AT 2 receives the unexpected data packet #4 in 751B and interprets the consecutive receipt of non-streaming or non-voice data packets for the second session as an indication that AT 1 suppressed a silence packet for the first session, and thereby plays 'comfort' noise as AT 2 would have if AT 1 had actually transmitted the silence packet including the series of silence frames, 755B.

AT 1 then transmits data packet #5 for the second session in the slot initially scheduled for transmission of data packet #4 before data packet #4 replaced the silence packet, 760B. At some later point in time, AT 2 responds to AT 1's question by responding with its own voice response packet #1 ("Good."), 765B. Accordingly, by suppressing silence packets when a streaming communication session is conducted concurrently with a file-transfer session, data packets for the file-transfer session, which typically have a lower-priority than voice packets of the streaming session, are sent in their place.

Figure 7C:
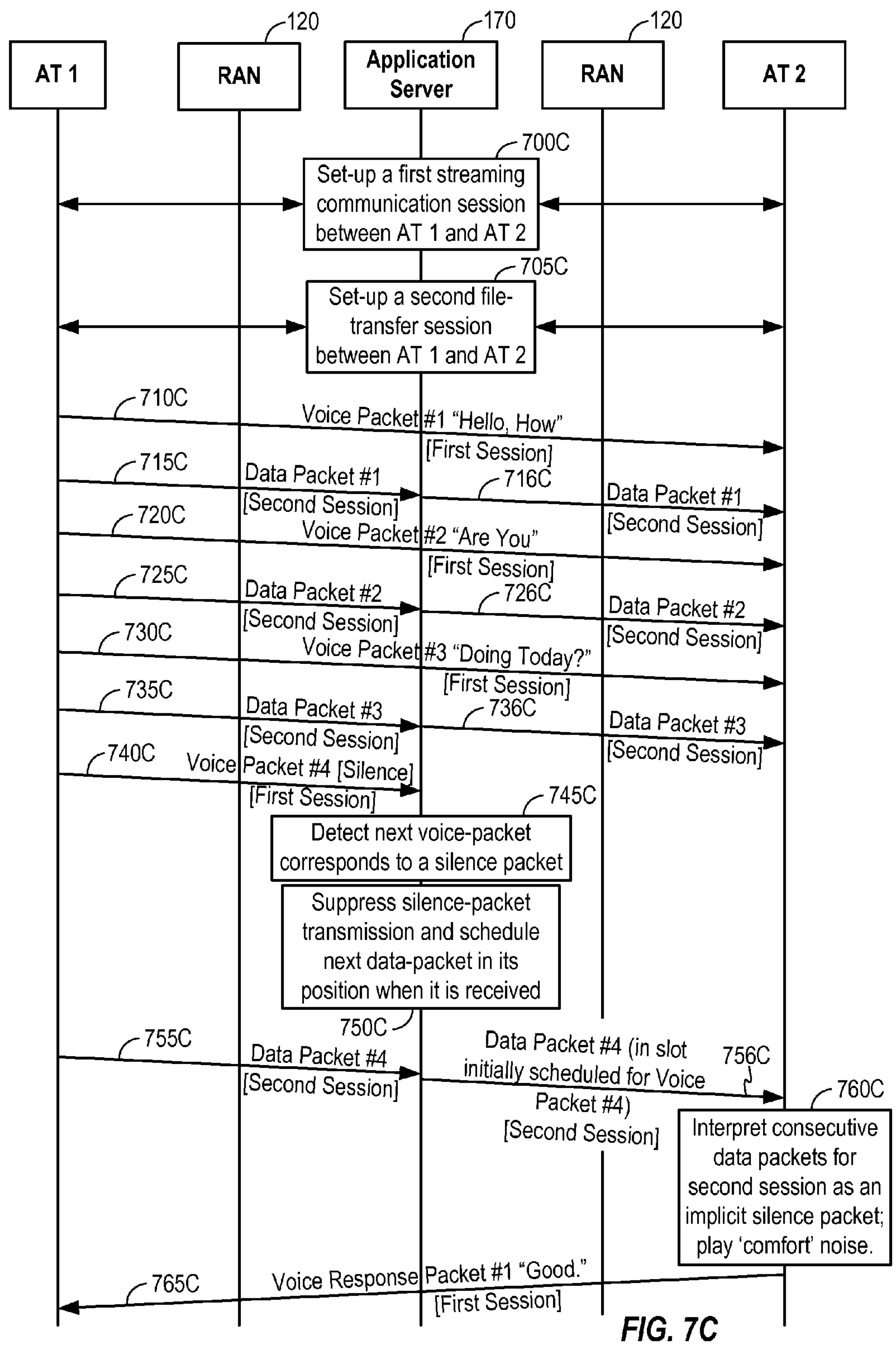
FIG. 7C illustrates another embodiment of the invention whereby silence frames for a streaming multimedia session are suppressed and an increased number of data packets for a low-QoS or non-QoS file-transfer session are transmitted.

FIG. 7C illustrates another embodiment of the invention whereby silence frames for a streaming multimedia session are suppressed and an increased number of data packets for a low-QoS or non-QoS file-transfer session are transmitted. In particular, FIG. 7C is similar in some respects to FIG. 7B, except the silence-packet suppression occurs at the application server 170 instead of the transmitting AT 1. Referring to FIG. 7C, 700C through 736C substantially correspond to 700A through 736A of FIG. 7A, respectively, and/or 700B through 736B of FIG. 7B, respectively, and as such will not be described further for the sake of brevity.

Referring to FIG. 7C, after transmitting data packet #3 for the second session in 735C and 736C, AT 1 transmits voice packet #4 to the application server 170 for the first session, 740C. In the embodiment of FIG. 7C, it may be assumed that voice packet #4 corresponds to a silence packet that includes a given number of silence frames. The application server 170 receives and evaluates voice packet #4 and determines that voice packet #4 is a silence packet, 745C. After determining that the next streaming voice packet #4 corresponds to a silence packet in 745C, the application server 170 suppresses the silence-packet and determines to schedule the next packet received from AT 1 for AT 2 (e.g., either a data packet for the second session or non-silence packet for the first session) instead of sending voice packet #4, 750C.

Accordingly, AT 1 then transmits the next queued data-packet (i.e., data packet #4) for the second session to the application server 170, 755C. In this example, data packet #4 is sent in its scheduled slot with no change at AT 1. The application server 170 receives data packet #4 and forwards data packet #4 to AT 2 in the slot that was initially scheduled for voice packet #4 of the first session, 756C. AT 2 receives the unexpected data packet #4 and interprets the consecutive receipt of non-streaming or non-voice data packets for the second session as an indication that the application server 170 suppressed a silence packet for the first session, and thereby plays 'comfort' noise as AT 2 would have if AT 1 had actually transmitted the silence packet including the series of silence frames, 760C.

At some later point in time, AT 2 responds to AT 1's question by responding with its own voice response packet #1 ("Good."), 765C. Accordingly, by suppressing silence packets when a streaming communication session is conducted concurrently with a file-transfer session, data packets for the file-transfer session, which typically have a lower-priority than voice packets of the streaming session, are sent in their place by the application server 170.

Figure 8A:
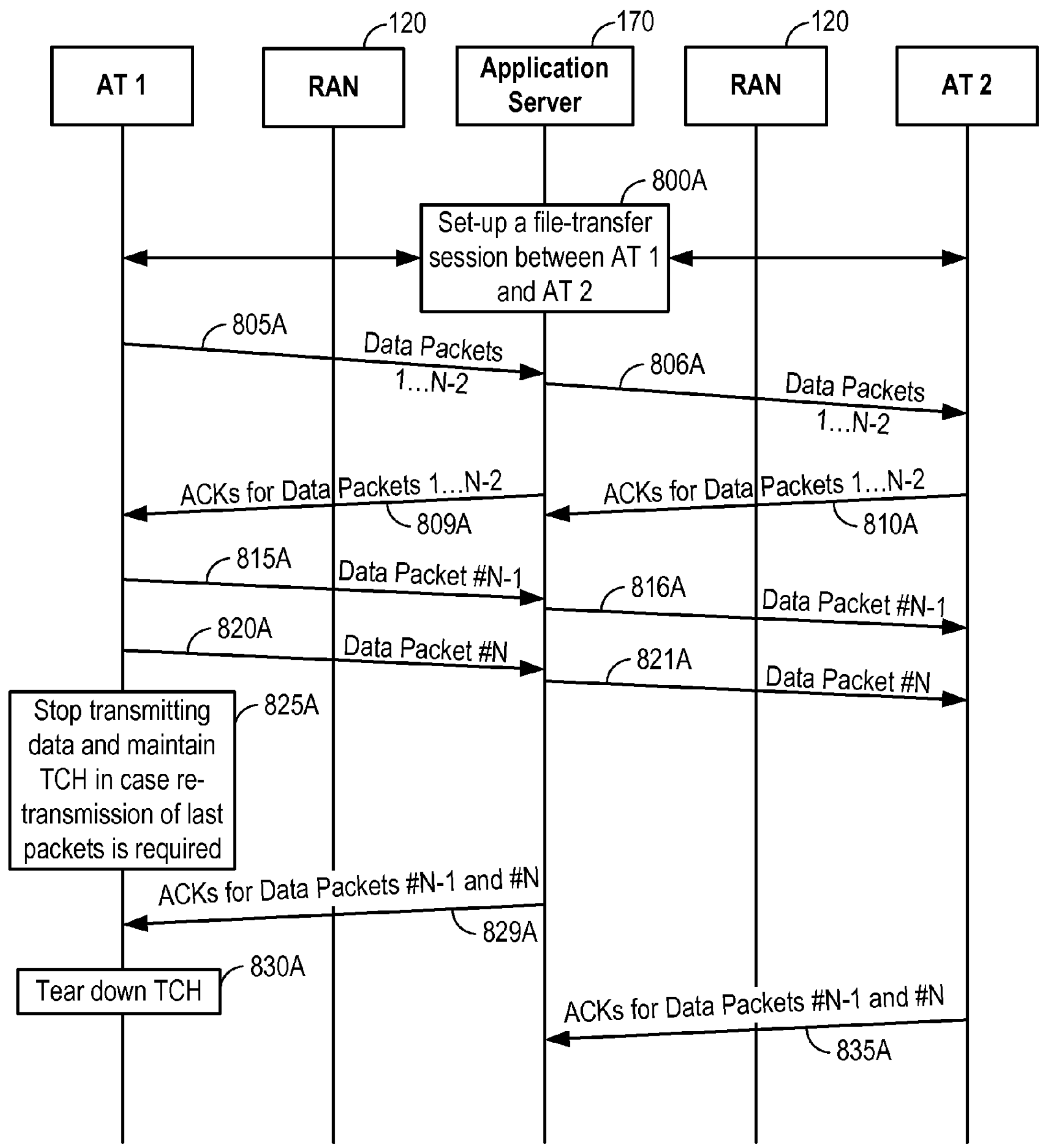
FIG. 8A illustrates a process that focuses on the end or completion of a conventional file-transfer session.

FIG. 8A illustrates a process that focuses on the end or completion of a conventional file-transfer session. Referring to FIG. 8A, the application server 170 sets-up a file-transfer session to facilitate the transfer of one or more files from AT 1 to AT 2, 800A. In the example of FIG. 8A, it may be assumed that the file-transfer session corresponds to a transfer of a plurality of data packets 1 . . . N, where N>=3. Accordingly, after the file-transfer session is set-up in 800A, AT 1 sends data packets 1 . . . N−2 for the file-transfer session to AT 2, 805A and 806A. The application server ACKs data packets 1 . . . N−2 in 809A. Assume that AT 2 receives each of data packets 1 . . . N−2, and thereby AT 2 also sends ACKs for each of data packets 1 . . . N−2 back to the application server 170, 810A. Next, AT 1 sends data packet N−1 and N, which are the last two packets for the file-transfer session, 815A and 816A, and 820A and 821A.

At this time, because AT 1 has transmitted all of its packets for the file-transfer session to AT 2, AT 1 stops transmitting data in 825A. However, also in 825A, because AT 1 has not yet received ACKs to all of its transmitted data packets (i.e., data packets N−1 and N), AT 1 retains its TCH because there is a possibility a NACK will be received for data packet N−1 and/or data packet N (or an ACK-timeout), in which case a packet retransmission will be required. The application server 170 ACKs data packets N−1 and N in 829A, after which AT 1 tears down the TCH, 830A. In this example, assume that AT 2 eventually also sends ACKs for both data packets N−1 and N, 835A.

Figure 8B:
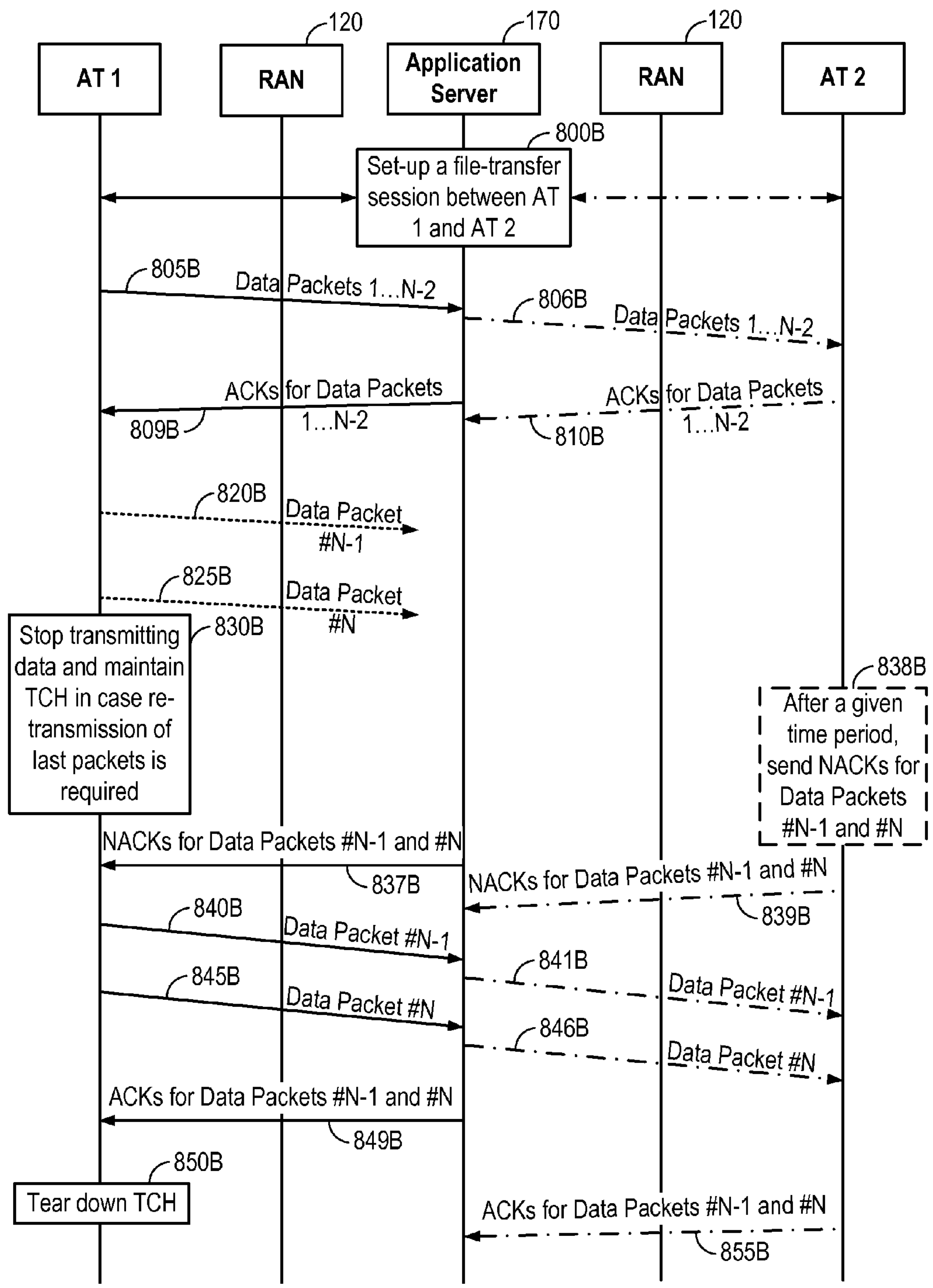
FIG. 8B another conventional process focuses on the signaling between a transmitting AT and the application server at the end of a file-transfer session, and as such signaling between a receiving AT and the application server is shown via a dotted line.

As will be appreciated, in the event that data packets N−1 and N are ACKed as shown in FIG. 8A, AT 1 unnecessarily holds onto its TCH for longer than is actually necessary for the file-transfer session. Also, in the event that a retransmission of data packets N−1 and/or N is required, the period from the initial transmission of these data packets to their eventual retransmission corresponds to 'wasted' time during which AT 1 has a TCH but is not actually transmitting data, as will be described next with respect to FIG. 8B. FIG. 8B another conventional process focuses on the signaling between AT 1 and the application server 170 at the end of a file-transfer session, and as such signaling between AT 2 and the application server 170 is shown via a dotted line.

Referring to FIG. 8B, 800B through 810B substantially correspond to 800A through 810A of FIG. 8A, respectively, and as such will not be described further for the sake of brevity. After receiving ACKs for data packets 1 . . . N−2, AT 1 attempts to transmit data packet N−1, 820B, and data packet N, 825B (e.g., although some of the ACKs from 815B could actually be received after one or more of these transmission attempts). In the embodiment of FIG. 8B, assume that the transmission attempts of both data packet N−1 and N fail in 820B and 825B, respectively.

In 830B, as in 825A of FIG. 8A, AT 1 stops transmitting data and retains its TCH. Next, the application server 170 sends NACKs for data packets N−1 and N to AT 1, 837B. Also, after a given period of time, AT 2 also determines to send NACKs for data packets N−1 and N to the application server 170, 839B, and the NACKs are sent from AT 2 to the application server 170 in 838B. Accordingly, AT 1 re-transmits data packets N−1 and N in 840B and 841B, and 845B and 846B, respectively. The application server 170 ACKs data packets N−1 and N from AT 1, 849B, after which AT 1 can tear down the TCH, 850B. AT 2 also ACKs data packets N−1 and N that are successfully received at AT 2 from the application server 170, 855B.

Figure 8C:
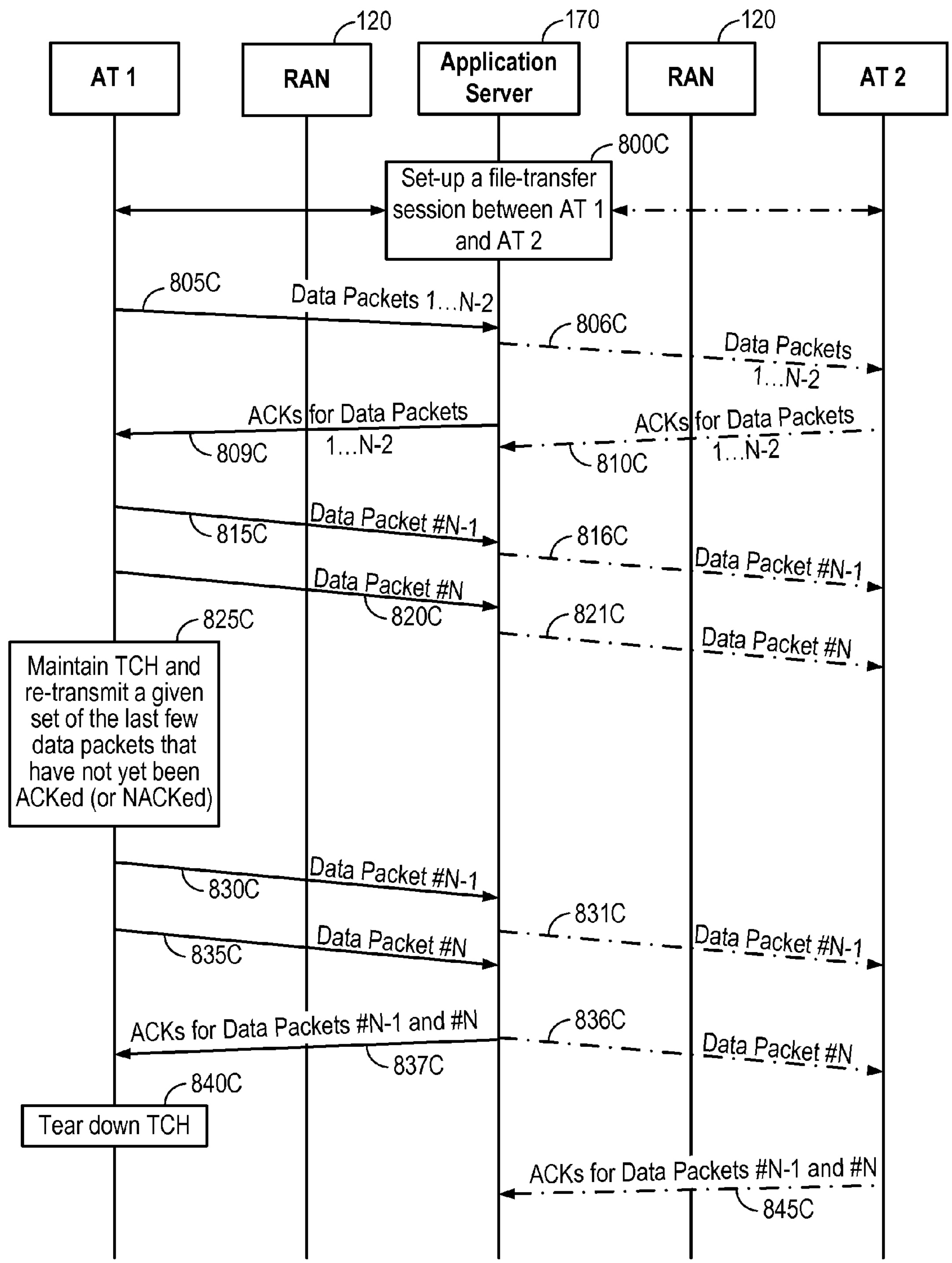
FIGS. 8C and 8D are each directed to a process related to an opportunistic or preemptive re-transmission of data packets during periods where a transmitting AT has a traffic channel (TCH) and is not transmitting data.
Figure 8D:
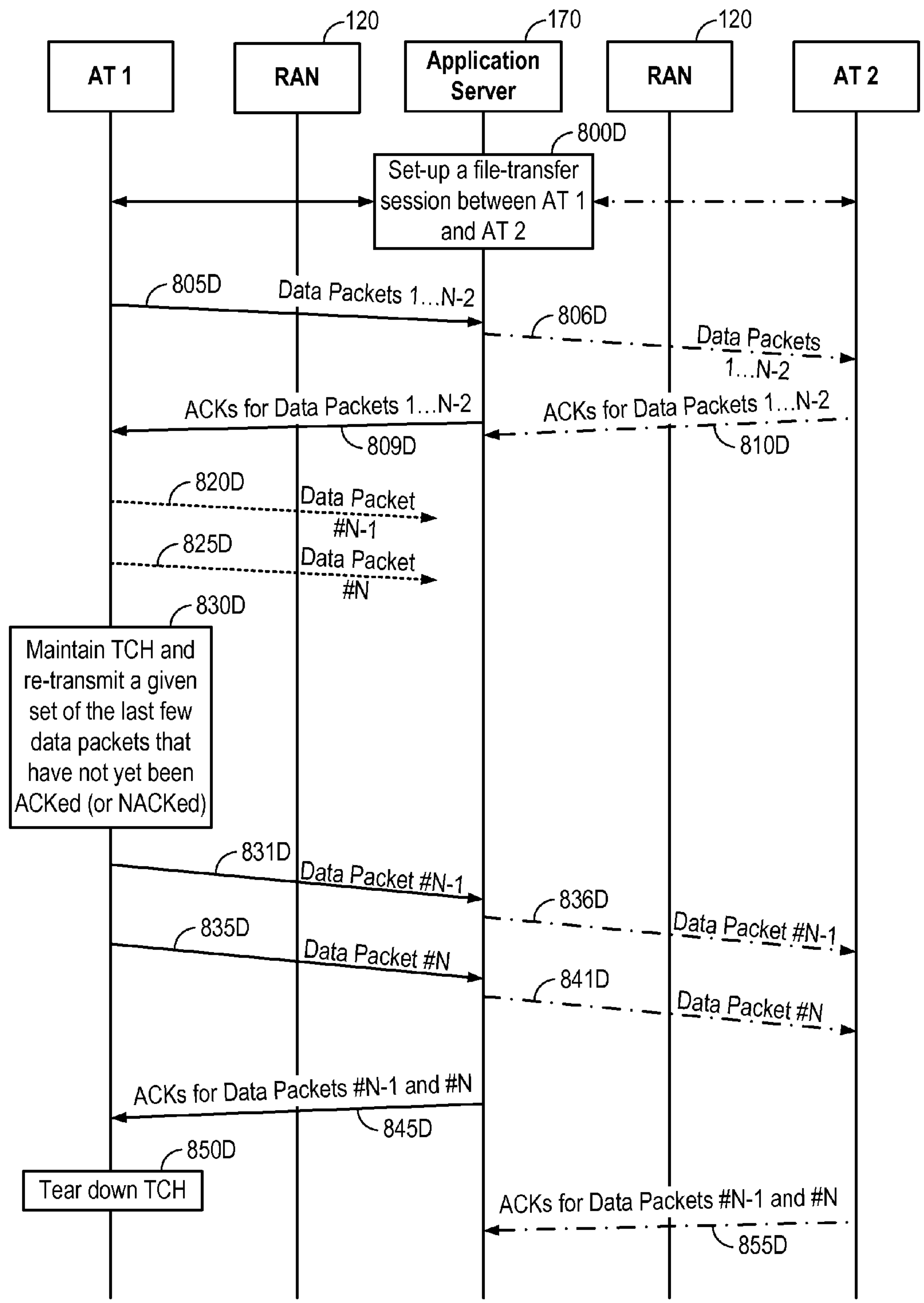

As will now be described with respect to FIGS. 8C and 8D, embodiments of the invention are directed to an opportunistic or preemptive re-transmission of data packets during periods where a transmitting AT has a TCH and is not transmitting data. FIGS. 8C and 8D, similar to FIG. 8B, each focus on the signaling between AT 1 and the application server 170, and as such signaling between AT 2 and the application server 170 is shown via a dotted line.

Referring to FIG. 8C, 800C through 821C substantially correspond to 800A through 821A of FIG. 8A, respectively, and as such will not be described further for the sake of brevity. After transmitting data packets N−1 and N in 815C and 816C, respectively, instead of simply holding onto the TCH and waiting for an ACK or a NACK from AT 2, AT 1 maintains its TCH and determines to preemptively re-transmit data packets N−1 and N before ACKs or NACKs to these data packets are actually received, 825C.

Accordingly, AT 1 re-transmits data packets N−1 and N to the application server 170 in 830C and 835C, and the application server 170 forwards data packets N−1 and N to AT 2 in 831C and 836C, respectively. The application server 170 ACKs data packets N−1 and N, 837C, after which AT 1 can tear down the TCH, 840C. Also, AT 2 ACKs data packets N−1 and N to the application server 170, 845C. It will be appreciated that the ACKs received in 837C at AT 1 can be either for the initial transmission of data packets N−1 and N in 815C through 820C, or for the re-transmission of data packets N−1 and N in 830C through 835C (or some combination, where at least one ACK is for an initial transmission and at least one ACK is for a re-transmission).

Further, while FIG. 8C shows a single re-transmission of data packets N−1 and N, it will be appreciated that AT 1 can simply continue to re-transmit data packets N−1 and N until an ACK or NACK is received from the application server 170, or for a given number of times (e.g., three retransmissions, etc.). Further, while FIG. 8C is directed to an example where re-transmissions are performed for the last two data packets in a stream of data packets for a file-transfer session (i.e., data packets N−1 and N), other embodiments can perform the above-described preemptive packet retransmission(s) for different numbers of packets, such as the last three packets, the last four packets, only the last packet, etc.

Referring to FIG. 8D, 800D through 825D substantially correspond to 800B through 825B of FIG. 8B, respectively, and as such will not be described further for the sake of brevity. After unsuccessfully attempting to transmit data packets N−1 and N in 820D and 825D, respectively, instead of simply holding onto the TCH and waiting for an ACK-timeout or a ACK or a NACK from the application server 170, AT 1 maintains its TCH and determines to preemptively re-transmit data packets N−1 and N before ACKs or NACKs, 830D.

Accordingly, AT 1 re-transmits data packets N−1 and N to the application server 170 in 831D and 836D, and the application server 170 forwards data packets N−1 and N to AT 2 in 836D and 841D, respectively. At some later point in time, assume that AT 1 receives ACKs for data packets N−1 and N from the application server 170, 845D (e.g., in an example, NACKs to earlier transmissions of data packets N−1 and N from 831D and 835D may also be received at AT 1, but it is assumed in this case that one of the retransmissions is successfully sent to the application server 170). It will be appreciated that the ACKs received in 845D at AT 1 are for the re-transmission of data packets N−1 and N in 831D and 835D (e.g., because the initial transmissions of these data packets is assumed to be unsuccessful). At this point, AT 1 can tear down the TCH, 850D. At some later point in time, AT 2 can also ACK its receipt of data packets N−1 and N to the application server 170, 855D.

Further, while FIG. 8D shows a single re-transmission of data packets N−1 and N, it will be appreciated that AT 1 can simply continue to re-transmit data packets N−1 and N until an ACK-timeout is determined or an ACK or NACK is received from the application server 170, or for a given number of times (e.g., three retransmissions, etc.). Further, while FIG. 8D is directed to an example where re-transmissions are performed for the last two data packets in a stream of data packets for a file-transfer session (i.e., data packets N−1 and N), other embodiments can perform the above-described preemptive packet retransmission(s) for different numbers of packets, such as the last three packets, the last four packets, only the last packet, etc.

Further, while FIGS. 8C and 8D each show examples by which a preemptive re-transmission of data packets occurs near the expected end-point of a file-transfer session, it will be appreciated that other conditions could be used to trigger a preemptive re-transmission of packets where a TCH is maintained by an AT and is not used continuously. For example, the sender could be measuring the exact network conditions and, if the network conditions are determined to be poor and it is more likely that there is loss, then the sender can optimistically retransmit the last window of packets. Alternatively, the sender (i.e., AT 1) could employ a given type of 'learning' algorithm that measures how many packets were lost over the course of the connection (available from ACK and retransmits) and makes an educated guess as to when to perform preemptive retransmissions. The learning algorithm could be even more complicated and extend to the life of particular calls to particular targets, location, time of the day, etc. In an example, not only could the learning algorithm predict when to preemptively retransmit data packets, but the learning algorithm could also predict the order or which packets to retransmit based on the likelihood of loss.

Figure 8E:
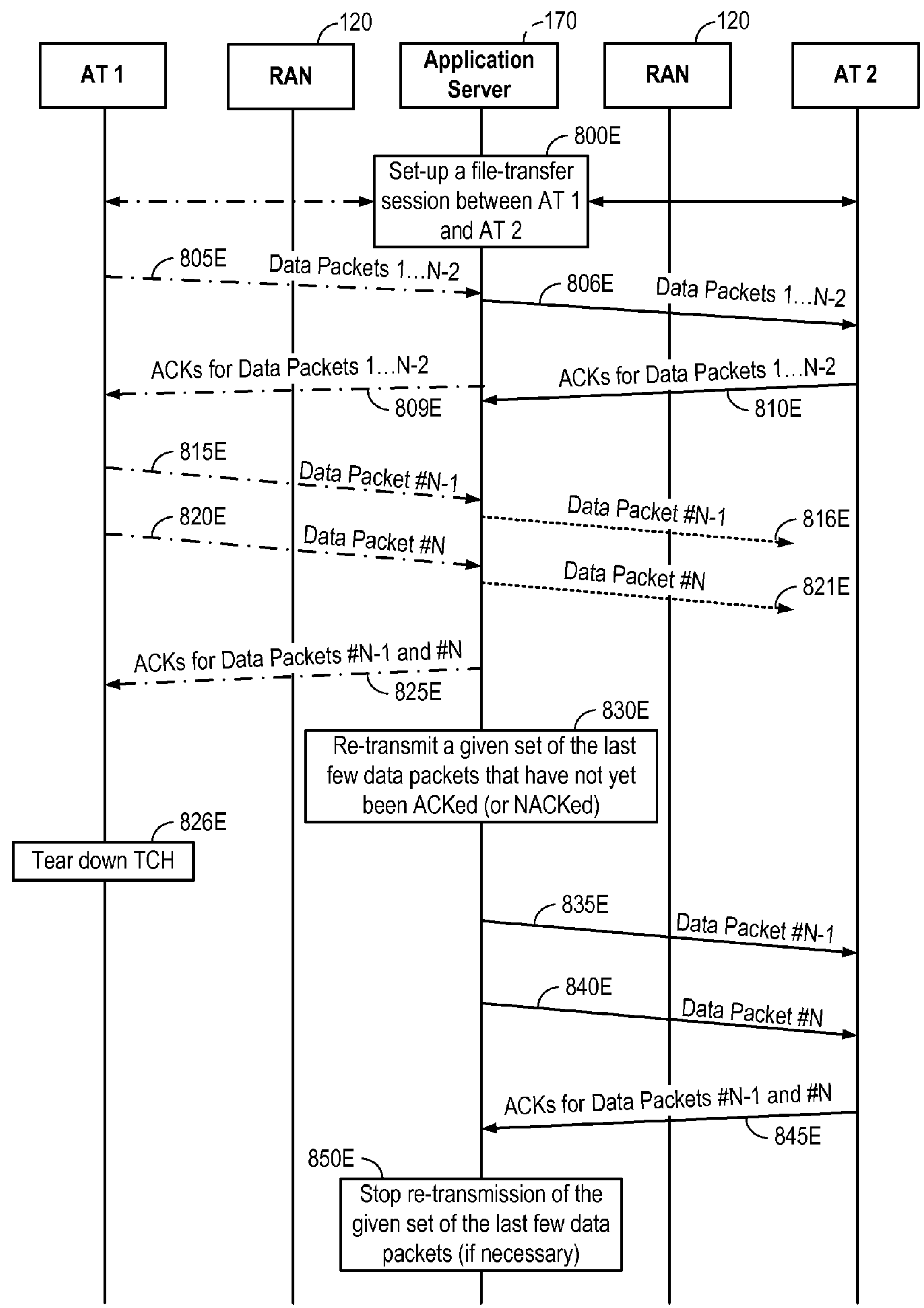
FIG. 8E is directed to another process related to opportunistic or preemptive re-transmission of data packets during periods where a transmitting AT has a TCH and is not transmitting data in accordance with an embodiment of the invention.

FIG. 8E is directed to another an opportunistic or preemptive re-transmission of data packets during periods where a transmitting AT has a TCH and is not transmitting data in accordance with an embodiment of the invention. Unlike FIGS. 8C and 8D, FIG. 8E is directed to an implementation whereby the opportunistic or preemptive re-transmission is triggered or originated from the application server 170 instead of the transmitting AT 1. Accordingly, FIG. 8E focuses on the signaling between AT 2 and the application server 170, and as such signaling between AT 1 and the application server 170 is shown via a dotted line.

Referring to FIG. 8E, 800E through 810E substantially correspond to 800D through 810D of FIG. 8D, respectively, and as such will not be described further for the sake of brevity. Unlike FIG. 8C, in 815 and 820E, AT 1 successfully sends data packets N−1 and N to the application server 170. However, the application server 170 is unable to successfully transmit data packets N−1 and N to AT 2 in 816E and 821E, respectively.

The application server 170 ACKs data packets N−1 and N in 825E, after which AT 1 can tear down its TCH, 826E. In 830E, instead of simply forwarding one instance of data packets N−1 and N, the application server 170 determines to preemptively re-transmit data packets N−1 and N before ACKs or NACKs to these data packets are actually received from AT 2. In an example, the determination of 830E can be based on the application server 170's knowledge that data packets N−1 and N correspond to the last two packets for the communication session, in an example.

Accordingly, the application server 170 re-transmits data packets N−1 and N to AT 2 in 835E and 840E, respectively. At some later point in time, assume that the application server 170 receives ACKs for data packets N−1 and N from AT 2, 845E. At this point, the application server 170 can stop its re-transmission of data packets N−1 and N (if the application server 170 has not done so already), 850E.

Further, while FIG. 8E shows a single re-transmission of data packets N−1 and N, it will be appreciated that the application server 170 can simply continue to re-transmit data packets N−1 and N until an ACK or NACK is received from AT 2, or for a given number of times (e.g., three retransmissions, etc.). Further, while FIG. 8E is directed to an example where re-transmissions are performed for the last two data packets in a stream of data packets for a file-transfer session (i.e., data packets N−1 and N), other embodiments can perform the above-described preemptive packet retransmission(s) for different numbers of packets, such as the last three packets, the last four packets, only the last packet, etc.

Embodiments of content-based processes will now be described with respect to FIGS. 9A through 9D. As used herein, in the context of a display on an AT, a window corresponds to object(s) configured to be viewable on the display and is associated with a particular application executing on the AT. For example, assume that the AT corresponds to a cellular telephone, the AT is executing a mobile web browsing application and a particular web-page is being displayed to the user on the display. In this case, the window corresponds to a graphical construct used by the mobile web browsing application to present the particular web-page to the AT's user on the display. While windows as used herein are configured to be viewable on the display of the AT, it will be appreciated that each window need not be viewable on the display of the AT at all times. For example, a particular window that would otherwise be viewable on the display of the AT may be minimized or overlapped by another window and thereby, for a period of time, would not be viewable on the display of the AT.

In another example, different windows on a display of an AT can be associated with different objects that a user of the AT has requested for download. In the case of the mobile web browsing application, the different objects can include a set of objects to be displayed and/or presented to the AT's user in association with the particular web page of the window. However, less than all of these windows may be 'active' at a given time. For example, a given user of the AT can request that four (4) different websites be loaded on the AT via the mobile web browsing application, but the given user can set one of the four websites to an 'active' or viewable status on the AT. Alternatively, multiple windows can be viewable but one particular window is presented more prominently than the others (i.e., the 'active' window, such as when the active window is completely viewable on the display of the AT and other windows are partially and/or fully overlapped by or covered up by the active window). As will be appreciated, this suggests that the user is interested in viewing the active website before the other websites. However, the server from which the objects of the four websites are downloaded conventionally is unaware of which window the given user has established as active. Accordingly, FIG. 9A illustrates a process of selectively downloading file objects to an AT in accordance with a content-based priority scheme in an embodiment of the invention.

Figure 9A:
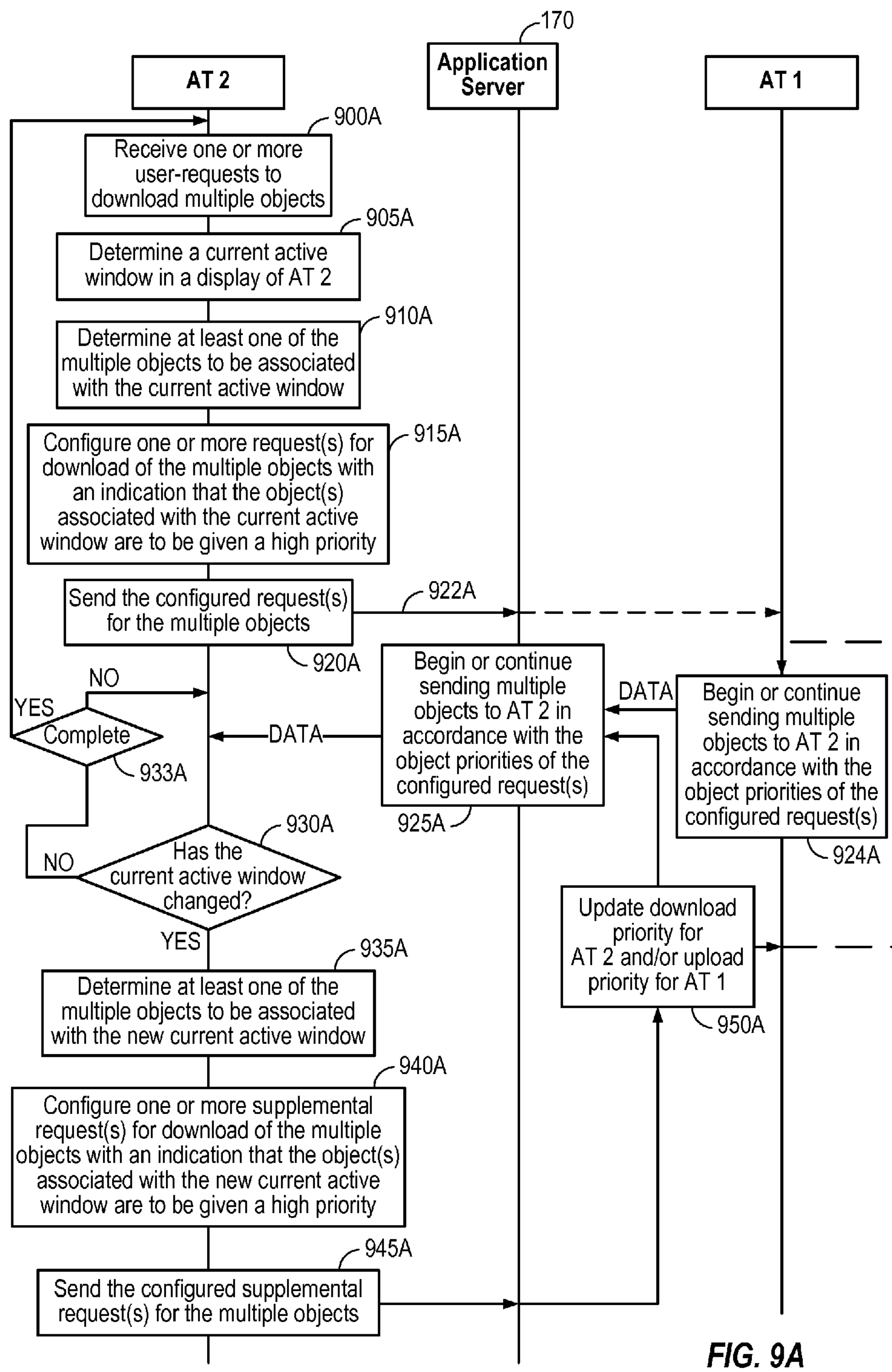

Referring to FIG. 9A, a given AT ("AT 2") receives one or more user requests to download multiple objects, 900A. In an example, the request(s) of 900A can correspond to a user of AT 2 requesting the download, or a message received from AT 1 that indicates a user of AT 1 is requesting to send the multiple objects to AT 2, or a combination thereof. As noted above, the request of 900A could correspond to a request to load content associated with different websites in multiple windows of a web-browser. In 905A, AT 2 determines which window on AT 2 is currently 'active'. As noted above, an 'active' window can correspond to which browser window (or windows) is most prominently on AT 2, as opposed to 'hidden' windows that are not currently selected by a user of AT 2. Next, AT 2 determines at least one of the multiple objects from 900A to be associated with the current active window, 910A. For example, if the user requests in 900A to load a sports web-site and also to load a news-website, and a window in which the sports web-site is to be displayed is most prominently displayed on AT 2, then the files or objects determined to be associated with the current active window in 910A are the objects associated with the sports web-site.

In 915A, AT 2 configures one or more download requests to request a download of the multiple objects from the application server 170, and further configures the request(s) to indicate which objects are associated with the current active window of AT 2, 915A. As will be appreciated, the indication of which objects are associated with the current active window of AT functions to prioritize the associated objects over the non-associated objects. In 920A, AT 2 sends the configured request(s) to the application server 170, 920A. The application server 170 then forwards the configured request to AT 1, 922A. Responsive to the configured request(s) received in 920A, AT 1 begins sending the multiple objects to AT 2 in accordance with the object priorities indicated in the configured request(s) that was forwarded to AT 1 in 922A, 924A. For example, AT 1 can provide objects that are associated with AT 2's current active window first, followed by non-associated objects. Likewise, the application server 170 receives the objects from AT 1 in 924A, and then begins to provide the multiple objects to AT 2 in accordance with the object priorities of the configured request(s), 925A.

During the download of the multiple objects, AT 2 determines whether its current active window has changed, 930A. If not, AT 2 determines whether the download is complete, 933A. If the download completes, the process returns to 900A where AT 2 waits for a next object download request. Otherwise, if the current active window has not changed and the download is not yet complete, AT 2 continues to monitor the download of the multiple objects. However, if AT 2 determines its current active window has changed in 930A (e.g., if a user transitions AT 2 to a different active window), then AT 2 determines at least one of the multiple objects from 900A to be associated with its new current active window, 935A.

In 940A, AT 1 configures one or more supplemental download requests to request a download of the multiple objects from the application server 170, and further configures the supplemental request(s) to indicate which objects are associated with AT 2's new current active window. In 945A, AT 2 sends the configured supplemental request(s) to the application server 170. Responsive to the configured supplemental request(s) received in 945A, the application server 170 updates the download priority for providing the multiple objects to AT 2 from the application server 170 and also updates the upload priority by which AT 1 uploads the multiple objects to the application server 170 (e.g., at least for 1-to-1 communication sessions between AT 1 and AT 2 only), 950A. Also in 950A, the application server 170 can send a message to AT 1 that requests AT 1 modify its upload order to conform with the new or updated object priorities based on AT 2's window-change. In an example, the upload and download orders or priorities can be set to be the same. For example, for files A, B, C and D, the download order may be [A,B,C,D] and the upload order may also be [A,B,C,D]. In an alternative embodiment, however, the upload and download orders need not be the same. For example, the download order may be [A,B,C,D] and the upload order may be [A,C,D] if file B is already accessible at the application server 170.

Thereafter, the AT 1 continues to send the multiple objects to the application server 170 in accordance with the object priorities indicated in the configured supplemental request(s), and the application server 170 likewise continues to send the multiple objects to AT 2 in accordance with the object priorities indicated in the configured supplemental request(s).

As will be appreciated, FIG. 9A describes a process by which a user's content priorities are inferred based on which window the user has set to be active, and the inferred user-priority is then conveyed to the download server (or application server 170). In another example, the user can explicitly establish its priorities for downloading objects, such that inferring a user's expected priorities from the behavior of the user need not be performed.

Figure 9B:
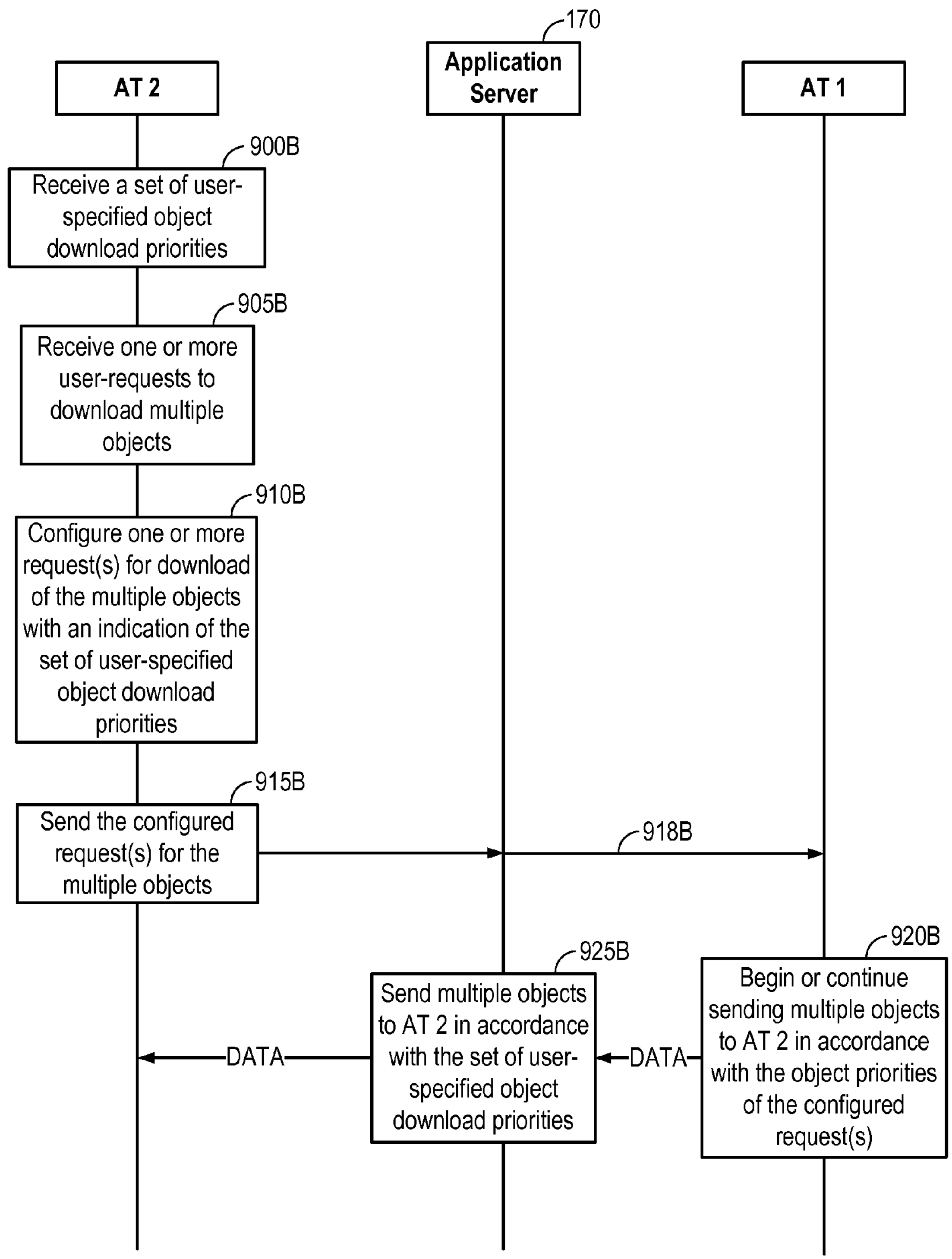

As such, referring to FIG. 9B, AT 2 receives a set of user-specified object download priorities, 900B. The set of user-specified object download priorities could be configured in a number of different ways.

For example, the set of user-specified object download priorities could be configured to prioritize certain mime types over other mime types (e.g., to prioritize text over graphical images, to prioritize video over audio, to prioritize audio over graphics, etc.). For example, AT 2 can track a frequency at which objects with a plurality of different mime types have been downloaded historically, and can then allocate a higher priority to more-frequently downloaded mime types. In another example, a z-index of different layers using cascading style sheets (CSS) can be generated, as is popular with many websites, whereby the z-index can convey the priority within a given page. Thus, if a particular website is a music-related website, audio may be prioritized over other forms of media (e.g., text, images, video, etc.). In another example, if a particular website is related to graphic still images or art, then images may be prioritized over other forms of media (e.g., text, audio, etc.). In a further example, the z-indices of different websites may be used to establish priorities between the websites, such that if AT 2 is attempting to load multiple websites at the same time the objects of the respective websites can be downloaded in accordance with their relative priority levels. In another example, a webpage that includes CSS elements (e.g., a background template, navigation bars, body text, and/or other javascript widgets) could organize the z-index in a particular order (e.g., body text, navigation bars, background template, and javascript widgets, in order) to enhance the user experience.

In another embodiment, the set of user-specified object download priorities could be to prioritize files for certain applications over other applications. In an example, the type of application may be indicative of its importance or urgency, such that the more important or more urgent application is given priority, such that a web-browsing session is prioritized over a passive OS update, for example. In another example, AT 2 may track information related to how frequently applications are used or executed. The historical usage information for the applications can then be used to establish relative priorities among the applications, such that more frequency used applications are prioritized over less frequency used applications.

In another example, each time a user of AT 2 requests a file download (e.g., each time a user navigates and clicks on a URL, etc.), a time stamp associated with the file download request can be stored at AT 2. The relative times at which the user of AT 2 requests respective file downloads can then be used to establish relative priorities between the file downloads. For example, more recently initiated file download requests can be prioritized over earlier or older file download requests. At some later point in time, AT 2 receives one or more user requests to download multiple objects, 905B. The request of 905B could correspond to a request to load content associated with one or more websites, in an example, or to receive a file transfer from another AT during a communication session. In 910B, AT 2 configures one or more download requests to request a download of the multiple objects from the application server 170, and further configures the request(s) to indicate which the set of user-specified object download priorities from 900B. In 915B, AT 2 sends the configured request(s) to the application server 170, 915B. The application server 170 then forwards the configured request to AT 1, 918B. Responsive to the configured request(s), AT 1 begins sending the multiple objects to the application server 170 in accordance with the set of user-specified object download priorities indicated in the configured request(s), 920B, and the application server 170 likewise sends the multiple objects to AT 2 in accordance with the object priorities indicated in the configured request(s), 925B. As will be appreciated, from the perspective of AT 1, the object priorities can be construed as an upload priority instead of a download priority. In any case, the order in which files are uploaded form AT 1 is maintained consistent with the order in which files are downloaded to AT 2 from the application server 170.

In another embodiment, with respect to FIG. 9B, AT 2 may be representative of a plurality of ATs that are receiving objects from AT 1. In this case, it will be appreciated that not all of the plurality of ATs may be permitted to affect the file-order in which AT 1 is transmitting the objects to the plurality of ATs. In an example, the application server 170 may forward the first-requested user-specified object download priority from the plurality of ATs, and may thereafter deny later-requested user-specified object download priorities. In an alternative example, the application server 170 may forward a later-requested user-specified object download priority to AT 1, whereby AT 1 will conform with a most-recently forwarded user-specified object download priority, but only if the later-requested user-specified object download priority is received at the application server 170 from a higher-priority AT as compared to the first-requested or earlier-requested user-specified object download priority. In another example, in the case that AT 2 is representative of a plurality of ATs, the application server 170 can performing a weighing or averaging of different requested user-specified object download priorities from the respective ATs. For example, the application server 170 may only act upon a particular set of user-specified object download priorities when a threshold number of percentage of ATs request the same set of user-specified object download priorities, the application server 170 may determine common elements across multiple requested user-specified object download priorities and then only act upon the common elements, and so on.

In another embodiment, with respect to FIG. 9B, AT 1 may be representative of a plurality of ATs that are transferring objects to AT 2. In this case, the set of user-specified object download priorities can be configured to prioritize objects from certain ATs over other ATs. In this case, in an example, the configured requests for the multiple objects in 915B can be queued by AT 2 and then be sent successively to the plurality of ATs in order of highest-priority to lowest-priority after each AT completes its respective object transfer. Alternatively, AT 2 may notify the application server 170 of the ATs' respective priorities for AT 2. In this case, the configured requests for the multiple objects in 915B can be sent to each of the plurality of ATs, and the application server 170 can then attempt to buffer the objects received from the plurality of ATs so as to deliver the objects to AT 2 in an order corresponding to AT 2's set of user-specified object download priorities.

In another example, as will be described next with respect to FIG. 9C, a given user of AT 2 can navigate between windows that are associated with different communication sessions (e.g., such as a streaming video conference session and a file-transfer session). Depending on which window is active, all or a portion of the media of the session that is not associated with the active window can be de-prioritized (at least until the given user navigates back to the window of the other session). For example, assume that, due to the layering of windows on AT 2, only partial video is displayed. In this case, only the portion of the window that is shown can be sent as part of the video. AT 2 can convey some indicator of the displayed video portion from which the application server 170 can filter the non-viewable portion.

Figure 9C:
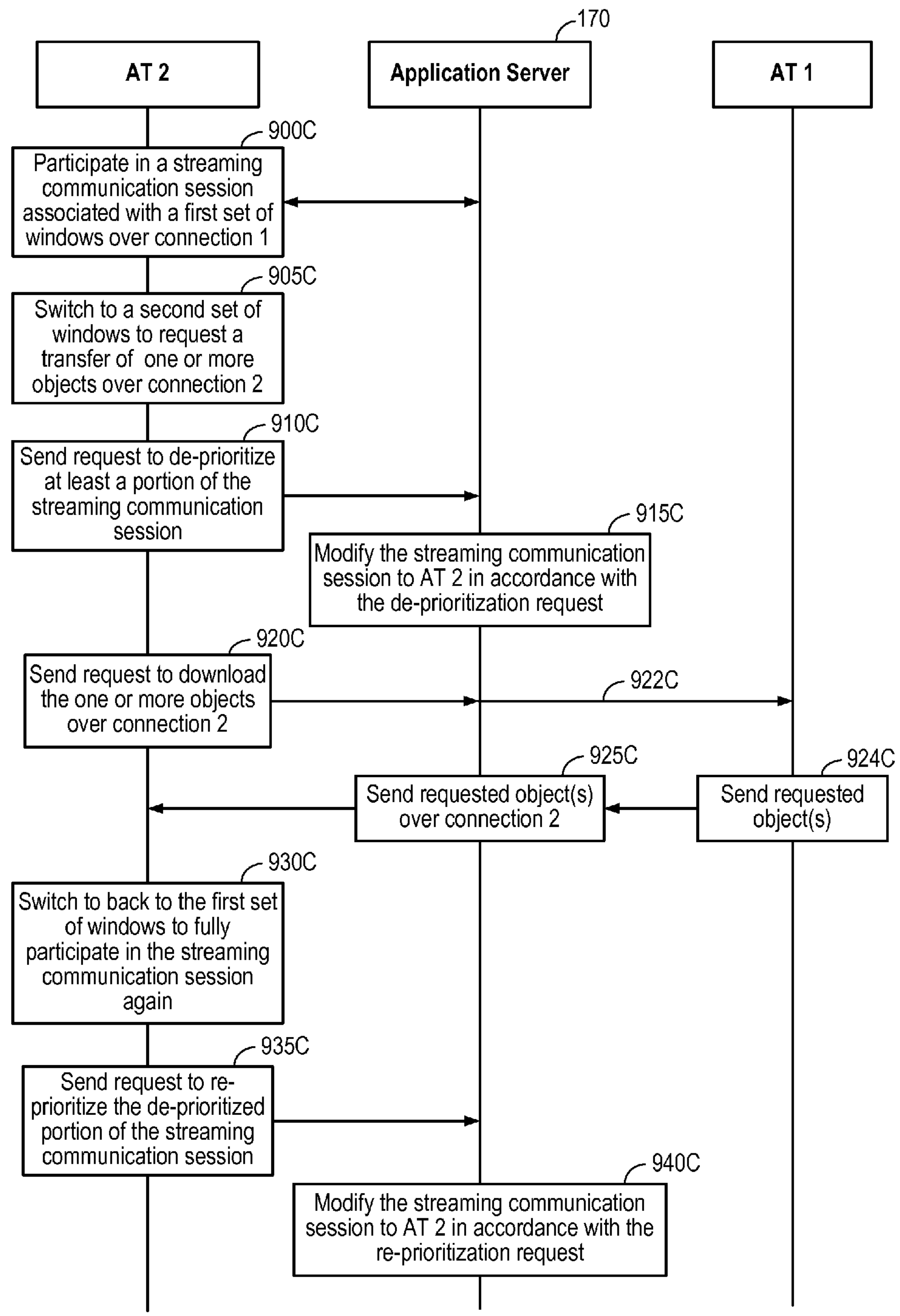

Referring to FIG. 9C, assume that AT 2 is participating in a streaming communication session associated with a first set of windows over a first connection, 900C. In an example, the first connection (or connection 1) can correspond to a single connection that carries a single media type or multiple media types (e.g., video and audio). In another example, the first connection can correspond to a plurality of different connections with each type of streaming media being allocated to a different one of the connections (e.g., audio is received over 1x and video is received over EV-DO, video and audio are received on different ports within an EV-DO network, etc.). Also, the streaming communication session could be between AT 2 and a server, AT 1 or some other AT, and as such AT 1 is not explicitly illustrated as part of the streaming communication session in FIG. 9C, although this is a possible implementation.

Next, AT 2 switches to a second set of windows in order to initiate a file-transfer session to transfer one or more objects over a second connection from a transmitting AT 1, 905C. For example, the streaming communication session can correspond to a video conference supported by a high QoS connection (i.e., the first connection), and the file-transfer session can be supported by a low QoS connection or even a connection that is not guaranteed any degree of QoS.

Because AT 2 has switched its current active window from a window associated with the streaming communication session to a window associated with the file-transfer session, AT 2 sends a request to de-prioritize at least a portion of the streaming communication session in 910C. In an example, if the streaming communication session corresponds to a video-only session, the de-prioritization request can request that the video-feed no longer be sent to AT 2 because AT 2 is not even watching the window that would display the video. In a further example, if the streaming communication session corresponds to feed containing video and audio, the de-prioritization request can request that the video-feed no longer be sent to AT 1 while still requesting the audio-feed or portion of the streaming communication session to be sent to AT 1 (e.g., because even though the video is not viewable in this instance, the user could still listen to the audio-portion of the session during the user's navigation to the other window). In this example, if the first connection includes different connections for audio and video, the de-prioritization request can be configured to request that a rate at which the video frames are conveyed to AT 2 be reduced, or alternatively that the video connection be temporarily suspended or shut-down. Accordingly, in 915C, the application server 170 modifies the streaming communication session to AT 1 in accordance with the de-prioritization request from 910C.

In 920C, AT 1 requests to download one or more objects over the second connection of the file-transfer session, and the application server 170 forwards the download request to AT 1, 922C. AT 1 begins sending the requested objects to the application server 170, 924D, and the application server 170 sends the requested object(s) from AT 1 to AT 2 over the second connection, 925C. In an example, AT 2 can download a photo that is emailed to AT 2 from a session participant of the streaming communication session (e.g., AT 1), such as a diagram that is being discussed. Alternatively, the file-transfer session need not be directly associated with the streaming communication session.

At this point, assume AT 2 switches back to the streaming communication session such that the first set of windows are again activated and AT 2 can again fully participate in the streaming communication session, 930C. Accordingly, AT 1 sends a 're'-prioritization request to request that the de-prioritized portion of the streaming communication session again be given a high level of priority, 935C. For example, the re-prioritization request can request that a discontinued video-feed of a video-conference be resumed. Accordingly, in 940C, the application server 170 modifies the streaming communication session to AT 1 in accordance with the re-prioritization request from 935C.

In the embodiment of FIG. 9C, a given transport protocol (e.g., TCP, etc.) can be used to adjust the manner in which a particular set of windows is advertised to the application server 170 and/or AT 1 in association with a particular TCP connection. For example, a first TCP connection can be associated with the first set of windows and a second TCP connection can be associated with the second set of windows. Thereby, the de-prioritization request of 910C can correspond to a configuration of a smaller advertised window for the first TCP connection of the first set of windows to reflect the lower-priority of the first set of windows, and the re-prioritization request of 935C can correspond to a configuration of a larger advertised window for the second TCP connection of the second set of windows to reflect the higher-priority of the second set of windows. While the first and second set of windows are described above as each being related to TCP connections, it will be appreciated that, in other embodiments of the invention, at least one of the connections need not be TCP, but could rather be UDP or some other windowless transport protocol.

While FIGS. 9A through 9C illustrate examples by which the objects or media are selectively provided AT 2 based on either an inferred or explicit priority of the content, it is generally assumed in FIGS. 9A through 9C that any data actually provided to AT 2 is conveyed at a full-quality level. In an alternative embodiment, described below with respect to FIG. 9D, if AT 2 is positioned in a limited environment, AT 2 can prompt a download of objects that are re-formatted to conform with the limited environment.

As used herein, a 'limited environment' is defined as any condition, qualitative metric and/or quantitative metric that is expected to be associated with performance degradation for a download request of AT 2. For example, the limited environment can correspond to as a bandwidth-limited environment where AT 2 is operating in a high-interference zone, a 1x network and/or where AT 2's resources are strained such as when AT 2 is concurrently participating in multiple sessions. In another example, AT 2 can be deemed to be in a limited environment if AT 2 is connected to an EV-DO network and T2P of EV-DO falls below a given threshold or a bandwidth measurement using CapProbe or CapProbe-like program falls beneath a predetermined threshold.

Figure 9D:
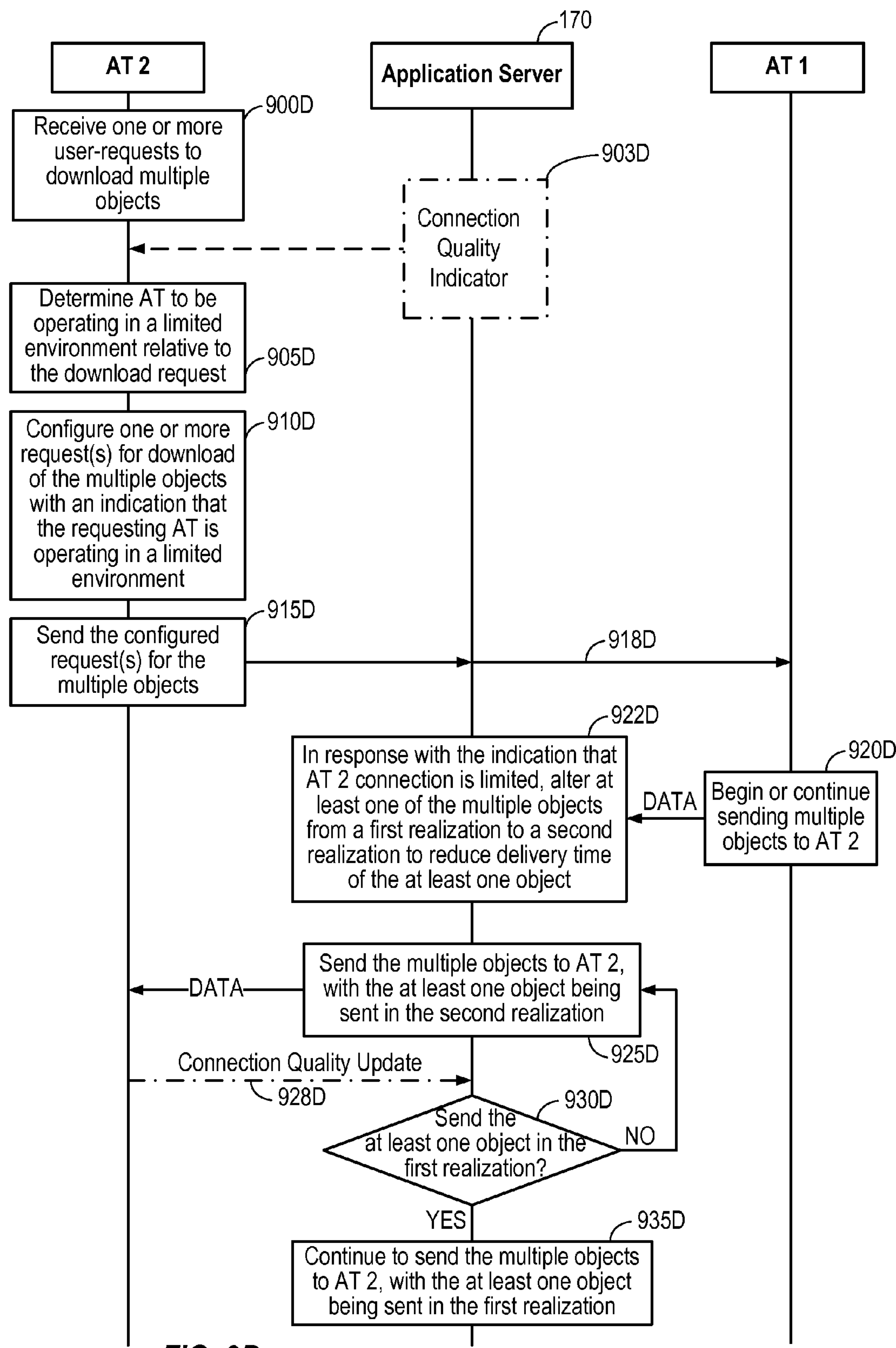

Referring to FIG. 9D, AT 2 receives at least one request to download multiple objects, 900D. As noted above, the multiple-object download request can correspond to a request to load a website, in an example, or to receive a file transfer from another AT during a communication session. In another example, the multiple-object download request can correspond to a photo-slideshow. In 905D, AT 2 determines if AT 2 is currently operating in a limited environment that is expected to be limited relative to the download request.

As will be appreciated, there are a number of different manners by which AT 2 can determine if its current operating environment is a 'limited environment' (e.g., limited relative to the download request). For example, an environment can be limited relative to the download request if the ratio of the amount of data requested to the time in which a reasonable user expects to receive that amount of data would take longer than a predetermined amount. This ratio can be preconfigured on respective ATs or UEs, in an example. Thus, being connected to a 1x network is not a limited environment if the AT is requested download of a 10 kilobyte (KB) file, but the 1x network could be a limited environment if the requested download is for a 10 megabyte (MB) file. Likewise, being connected to a 4g network is not a limited environment if the AT is requested download of a 10 MB file, but even the 4G network could be a limited environment if the requested download is for a 10 gigabyte (GB) file.

In another example, if AT 2 is operating in a 1x network, AT 2 may simply assume its environment is limited. In another example, AT 2 can evaluate a data-rate obtained in a recent communication session, and if the data-rate is relatively low or below a threshold then AT 2 can determine its environment to be-limited.

In another example, the application server 170 (or the RAN 120) can send a connection quality indicator to AT 2 that indicates a level of AT 2's current connection quality, as shown in 903D. For example, the connection quality indicator can be indicative of network delay, congestion or loss associated with AT 2's current serving network as measured by the application server 170. As will be appreciated, as bandwidth increases and latency decreases, there will eventually be a point at which there are diminishing returns in terms of user-experience or user-perception, such that changes in bandwidth and/or latency can be evaluated to determine whether a particular operating environment is limited. In a further example, if AT 2 already has a connection established with the application server 170, the connection quality indicator can be conveyed to AT 2 within an ACK packet or data packet sent by the application server 170 to AT 2. For example, the application server 170 may have special knowledge related to a connection quality of AT 2's current network, which can be based on part on AT 2's geographic location for example. The application server 170 can then configure a header portion (e.g., a DSCP field) of a packet to AT 2 with a code or bit-setting to convey the special knowledge.

It may be assumed in 905D that AT 2 determines its environment to be a limited environment. Accordingly, AT 2 configures one or more download requests to request a download of the multiple objects from the application server 170, and further configures the request(s) to indicate that AT 2 is operating in a limited environment, 910D. In 915D, AT 2 sends the configured request(s) to the application server 170, and the application server 170 forwards the configured request(s) to AT 1. Responsive to the configured request(s), AT 1 begins sending the requested objects via its own connection to the application server 170, 920B. Upon receiving the multiple objects from AT 1, the application server 170 alters or modifies at least one of the multiple-objects from a first 'realization' to a second 'realization' in order to reduce a delivery time of the at least one object to be altered or modified, 922D. In an example, for a graphic object (e.g., a JPEG, TIFF, bitmap, etc.), the modification of 922D can correspond to a resolution reduction (e.g., normal-resolution to thumbnail image, etc.) of the graphic object (e.g., or for multiple graphic objects in the case of a photo-slideshow). In another example, for an audio object (e.g., a way file, MP3, etc.) the modification of 922D can correspond to a quality reduction of the audio object. After the modification of 922D, the application server 170 begins sending the multiple objects to AT 2 such that any modified objects are sent in place of their non-modified versions, 925D.

In 930D, at some later point in time, the application server 170 determines whether to send the at least one object to AT 2 in their first or non-modified format. In an example, the application server 170 can determine to send the at least one object in its 'full' quality first format after all other multiple objects are sent to AT 2, in response to a message that AT 2 is no longer operating in a limited environment (e.g., via a connection quality update message in 928D, for instance), after a threshold period of time, etc. If AT 2 determines not to transmit the at least one object in its first format, the process returns to 925D and the application server 170 continues to send the multiple objects to AT 2 (without sending all of the objects to AT 1 in their first realization). Otherwise, if AT 2 determines to transmit the at least one object in its first format to AT 2, the application server 170 continues to send the multiple objects to AT 1 while sending the objects modified in 920D to AT 2 in their original or unmodified, first realization, 935D.

In FIG. 9D, it is possible that the download request 900D corresponds to real-time or streaming media. In this case, it will be appreciated that if a low-resolution video, for example, is sent to a user, there is little value in sending the higher-resolution video to the user when the user re-connects to a higher-performing network or its connection otherwise improves. In this case, blocks 930D and 935D can potentially be omitted for streaming or real-time sessions in an embodiment of the invention, where 'old' files have less value than more recent files, even if the older files were sent with lower quality.

While FIGS. 9A through 9D are described as separate processes above, it will be appreciated that two or more of FIGS. 9A through 9D can be implemented in a coordinated manner in other embodiments of the invention. For example, the prioritization-focused embodiments of FIG. 9A, FIG. 9B and/or FIG. 9C can be implemented in conjunction with the limited environment-focused embodiment of FIG. 9D. In this case, in addition and/or in place of modifying the realizations of the multiple objects in 922D, the transition of AT 2 to the limited environment may cause the object transfer priorities of FIG. 9A, FIG. 9B and/or FIG. 9C to be modified. In another example, FIG. 9A, FIG. 9B and/or FIG. 9C may simply be executed in parallel with FIG. 9D but may not actually be directly affected by FIG. 9D. For example, the multiple objects that are described as transferred from AT 1 to AT 2 in FIG. 9D may be provided in an order based on the respective object transfer priorities of FIG. 9A, FIG. 9B and/or FIG. 9C.

Further, while each of FIGS. 9A through 9D are directed to embodiments whereby objects are transferred from AT 1 to AT 2, it will be appreciated either of AT 1 and/or AT 2 may be representative of multiple ATs. In other words, the objects arriving at AT 2 in FIGS. 9A through 9D can alternatively originate from multiple ATs instead of a single AT 1. Also, the objects sent from AT 1 in FIGS. 9A through 9D can alternatively be sent to multiple target ATs instead of a single AT 2.

In the case of AT 2 being one of a plurality of ATs that are receiving the objects from AT 1, with respect to FIGS. 9A through 9C, it will be appreciated that each AT receiving the objects from AT 1 can be associated with its own respective object transfer priority. Thus, the processes of FIGS. 9A through 9C can be executed for each respective receiving AT, potentially resulting in the objects from AT 2 being delivered to the respective receiving ATs in different orders. With respect to FIG. 9D, it will be appreciated that the entry of one of the receiving ATs to a limited environment need not limit the objects transferred to other receiving ATs that are not in a limited environment. Thus, the execution of FIG. 9D may affect less than all of the receiving ATs.

Further, in any of FIGS. 9A through 9D, one or more of the objects being transferred may be associated with an expiration time whereby, after the expiration time, a value associated with the one or more objects is decreased and/or eliminated entirely. Accordingly, during object transfer, a given entity can check a current time against the associated expiration times for the one or more objects to determine whether to dynamically de-prioritize the one or more objects and/or drop the one or more objects entirely. In an example, this operation may occur at AT 1 during 924A of FIG. 9A, 920B of FIG. 9B, 924C of FIG. 9C and/or 920D of FIG. 9D. Alternatively, this operation may occur at the application server 170 during 925A of FIG. 9A, 925B of FIG. 9B, 925C of FIG. 9C and/or 925D of FIG. 9D.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of exchanging data between a first access terminal and a second access terminal in a communications system, comprising:

exchanging, between the first and second access terminals, higher priority data in association with a communication session of a first type and also lower priority data in association with a communication session of a second type, the communication sessions of the first and second types being arbitrated by an application server;

determining a transition of the first access terminal to a lower data-rate environment; and reducing, responsive to the determination, a size of data packets exchanged between the first access terminal and the application server for the communication session of the second type, wherein the exchanging, the determining and the reducing are each performed by the application server.

2. The method of claim 1, wherein the reducing reduces the size of the data packets, received from the second access terminal, that are transmitted by the application server to the first access terminal on a downlink.

3. The method of claim 1, wherein the determination of the transition by the application server is based upon (i) a notification from the first access terminal or a serving network of the first access terminal regarding the first access terminal's data-rate environment, (ii) a detection of performance degradation of the application server's connection to the first access terminal, and/or (iii) a report of the first access terminal's current geographic location and/or serving area.

4. The method of claim 1, wherein the communication session of the first type corresponds to a streaming or real-time communication session and the communication session of the second type corresponds to a file-transfer session.

5. The method of claim 1, wherein the determination is based upon the transition of the first access terminal being to a network of a given type.

6. The method of claim 5, wherein the network of the given type corresponds to a 1x network, a General Packet Radio Service (GPRS) network and/or an Evolution-Data Optimized (EV-DO) Rel. 0 Network or Rev. A network.

7. The method of claim 1, wherein a given size of data packets exchanged between the first access terminal and the application server for the communication session of the first type is not reduced in response to the determination.

8. The method of claim 1, wherein the determination of the transition of the first access terminal to the lower data-rate environment is based upon detection of the first access terminal completing a handoff from a first communications network with a first radio access technology (RAT) type to a second communications network with a second RAT type, wherein the second communications network is expected to support lower data rates as compared to the first communications network based on their associated RAT types.

9. The method of claim 1, wherein the determination of the transition of the first access terminal to the lower data-rate environment is based upon detection of one or more deteriorating conditions on a current serving communications network without the first access terminal undergoing a handoff.

10. The method of claim 1, wherein the size-reduced data packets correspond to media packets for the communication session of the second type.

11. An application server configured to exchange data between a first access terminal and a second access terminal in a communications system, comprising:

means for exchanging, between the first and second access terminals, higher priority data in association with a communication session of a first type and also lower priority data in association with a communication session of a second type, the communication sessions of the first and second types being arbitrated by the application server;

means for determining a transition of the first access terminal to a lower data-rate environment; and means for reducing, responsive to the determination, a size of data packets exchanged between the first access terminal and the application server for the communication session of the second type.

12. The application server of claim 11, wherein the means for reducing reduces the size of the data packets, received from the second access terminal, that are transmitted by the application server to the first access terminal on a downlink.

13. The application server of claim 11, wherein the determination of the transition by the application server is based upon (i) a notification from the first access terminal or a serving network of the first access terminal regarding the first access terminal's data-rate environment, (ii) a detection of performance degradation of the application server's connection to the first access terminal, and/or (iii) a report of the first access terminal's current geographic location and/or serving area.

14. The application server of claim 11, wherein the communication session of the first type corresponds to a streaming or real-time communication session and the communication session of the second type corresponds to a file-transfer session.

15. The application server of claim 11, wherein the determination is based upon the transition of the first access terminal being to a network of a given type.

16. The application server of claim 15, wherein the network of the given type corresponds to a 1x network, a General Packet Radio Service (GPRS) network and/or an Evolution-Data Optimized (EV-DO) Rel. 0 Network or Rev. A network.

17. The application server of claim 11, wherein a size of data packets exchanged between the first access terminal and the application server for the communication session of the first type is not reduced in response to the determination.

18. The application server of claim 11, wherein the determination of the transition of the first access terminal to the lower data-rate environment is based upon detection of the first access terminal completing a handoff from a first communications network with a first radio access technology (RAT) type to a second communications network with a second RAT type, wherein the second communications network is expected to support lower data rates as compared to the first communications network based on their associated RAT types.

19. The application server of claim 11, wherein the determination of the transition of the first access terminal to the lower data-rate environment is based upon detection of deteriorating conditions on a current serving communications network without the first access terminal undergoing a handoff.

20. The application server of claim 11, wherein the size-reduced data packets correspond to media packets for the communication session of the second type.

21. An application server configured to exchange data between a first access terminal and a second access terminal in a communications system, comprising:

a processor coupled to memory and configured to:

exchange, between the first and second access terminals, higher priority data in association with a communication session of a first type and also lower priority data in association with a communication session of a second type, the communication sessions of the first and second types being arbitrated by the application server;

determine a transition of the first access terminal to a lower data-rate environment; and reduce, responsive to the determination, a size of data packets exchanged between the first access terminal and the application server for the communication session of the second type.

22. The application server of claim 21, wherein the processor is configured to reduce the size of the data packets, received from the second access terminal, that are transmitted by the application server to the first access terminal on a downlink.

23. The application server of claim 21, wherein the determination of the transition by the application server is based upon (i) a notification from the first access terminal or a serving network of the first access terminal regarding the first access terminal's data-rate environment, (ii) a detection of performance degradation of the application server's connection to the first access terminal, and/or (iii) a report of the first access terminal's current geographic location and/or serving area.

24. The application server of claim 21, wherein the communication session of the first type corresponds to a streaming or real-time communication session and the communication session of the second type corresponds to a file-transfer session.

25. The application server of claim 21, wherein the determination is based upon the transition of the first access terminal being to a network of a given type.

26. The application server of claim 25, wherein the network of the given type corresponds to a 1x network, a General Packet Radio Service (GPRS) network and/or an Evolution-Data Optimized (EV-DO) Rel. 0 Network or Rev. A network.

27. The application server of claim 21, wherein a given size of data packets exchanged between the first access terminal and the application server for the communication session of the first type is not reduced in response to the determination.

28. The application server of claim 21, wherein the determination of the transition of the first access terminal to the lower data-rate environment is based upon detection of the first access terminal completing a handoff from a first communications network with a first radio access technology (RAT) type to a second communications network with a second RAT type, wherein the second communications network is expected to support lower data rates as compared to the first communications network based on their associated RAT types.

29. The application server of claim 21, wherein the determination of the transition of the first access terminal to the lower data-rate environment is based upon detection of deteriorating conditions on a current serving communications network without the first access terminal undergoing a handoff.

30. The application server of claim 21, wherein the size-reduced data packets correspond to media packets for the communication session of the second type.

31. A non-transitory computer-readable storage medium containing instructions stored therein, which, when executed by an application server configured to exchange data between a first access terminal and a second access terminal in a communications system, cause the application server to perform operations, the instructions comprising:

program code to exchange, between the first and second access terminals, higher priority data in association with a communication session of a first type and also lower priority data in association with a communication session of a second type, the communication sessions of the first and second types being arbitrated by the application server;

program code to determine a transition of the first access terminal to a lower data-rate environment; and program code to reduce, responsive to the determination, a size of data packets exchanged between the first access terminal and the application server for the communication session of the second type.

32. The non-transitory computer-readable storage medium of claim 31, wherein the program code to reduce is configured cause the application server to reduce the size of the data packets, received from the second access terminal, that are transmitted by the application server to the first access terminal on a downlink.

33. The non-transitory computer-readable storage medium of claim 31, wherein the determination of the transition by the application server is based upon (i) a notification from the first access terminal or a serving network of the first access terminal regarding the first access terminal's data-rate environment, (ii) a detection of performance degradation of the application server's connection to the first access terminal, and/or (iii) a report of the first access terminal's current geographic location and/or serving area.

34. The non-transitory computer-readable storage medium of claim 31, wherein the communication session of the first type corresponds to a streaming or real-time communication session and the communication session of the second type corresponds to a file-transfer session.

35. The non-transitory computer-readable storage medium of claim 31, wherein the determination is based upon the transition of the first access terminal being to a network of a given type.

36. The non-transitory computer-readable storage medium of claim 35, wherein the network of the given type corresponds to a 1x network, a General Packet Radio Service (GPRS) network and/or an Evolution-Data Optimized (EV-DO) Rel. 0 Network or Rev. A network.

37. The non-transitory computer-readable storage medium of claim 31, wherein a given size of data packets exchanged between the first access terminal and the application server for the communication session of the first type is not reduced in response to the determination.

38. The non-transitory computer-readable storage medium of claim 31, wherein the determination of the transition of the first access terminal to the lower data-rate environment is based upon detection of the first access terminal completing a handoff from a first communications network with a first radio access technology (RAT) type to a second communications network with a second RAT type, wherein the second communications network is expected to support lower data rates as compared to the first communications network based on their associated RAT types.

39. The non-transitory computer-readable storage medium of claim 31, wherein the determination of the transition of the first access terminal to the lower data-rate environment is based upon detection of deteriorating conditions on a current serving communications network without the first access terminal undergoing a handoff.

40. The non-transitory computer-readable storage medium of claim 31, wherein the size-reduced data packets correspond to media packets for the communication session of the second type.

* * * * *